US012809230B2

(12) United States Patent
Hong et al.

(10) Patent No.: US 12,809,230 B2
(45) Date of Patent: Nov. 24, 2026

(54) LIGHT-PASSABLE HOLE MODULE, CAMERA MODULE AND ELECTRONIC DEVICE

(71) Applicant: LARGAN PRECISION CO., LTD., Taichung City (TW)

(72) Inventors: Zheng-Zhi Hong, Taichung City (TW); Heng Yi Su, Taichung City (TW); Ming-Ta Chou, Taichung City (TW); Te-Sheng Tseng, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 134 days.

(21) Appl. No.: 19/008,921

(22) Filed: Jan. 3, 2025

(65) Prior Publication Data

US 2026/0023300 A1 Jan. 22, 2026

Related U.S. Application Data

(60) Provisional application No. 63/672,932, filed on Jul. 18, 2024.

(51) Int. Cl.
*G03B 9/06* (2021.01)
*G03B 30/00* (2021.01)

(52) U.S. Cl.
CPC ............... *G03B 9/06* (2013.01); *G03B 30/00* (2021.01)

(58) Field of Classification Search
CPC ........... G03B 9/06; G03B 30/00; H04N 23/56
See application file for complete search history.

(56) References Cited

U.S. PATENT DOCUMENTS 10,969,653 B2 * 4/2021 Kim ......................... G03B 9/06
11,598,974 B2 * 3/2023 Hu ......................... G02B 5/005
(Continued)

FOREIGN PATENT DOCUMENTS

CN 108181775 A 6/2018
CN 108696677 B 10/2018
(Continued)

OTHER PUBLICATIONS

TW Office Action dated Jun. 17, 2025 as received in Application No. 113133442.
(Continued)

*Primary Examiner* — Twyler L Haskins
*Assistant Examiner* — Chriss S Yoder, III
(74) *Attorney, Agent, or Firm* — Maschoff Brennan

(57) ABSTRACT

A light-passable hole module includes a blade assembly and a lid element arranged sequentially along a central axis. The blade assembly has a plurality of blades forming a light-passable hole. The light-passable hole has a size variable by taking the central axis as a center. The lid element covers the blade assembly and has a through hole disposed corresponding to the light-passable hole. The lid element includes a plastic surface structure and a metal wall structure. The plastic surface structure faces towards one blade and is disposed corresponding to the one blade. In a direction parallel to the central axis, the plastic surface structure is located closer to the blades than the through hole and is disposed in sequence with the blades. The metal wall structure is disposed surrounding the through hole and extends from the plastic surface structure along a direction parallel to the central axis.

21 Claims, 51 Drawing Sheets

(56) References Cited

U.S. PATENT DOCUMENTS

| | | | | |
|---|---|---|---|---|
| 12,271,106 | B2 * | 4/2025 | Tseng | G03B 9/02 |
| 2023/0273504 | A1 * | 8/2023 | Chen | G03B 9/06<br>396/510 |
| 2024/0419054 | A1 * | 12/2024 | Kwon | G03B 9/06 |

FOREIGN PATENT DOCUMENTS

| | | | |
|---|---|---|---|
| CN | 108933886 | A | 12/2018 |
| CN | 109413306 | B | 3/2019 |
| CN | 110579925 | A | 12/2019 |
| CN | 110579926 | A | 12/2019 |
| CN | 110858048 | A | 3/2020 |
| CN | 112099225 | A | 12/2020 |
| CN | 112147772 | A | 12/2020 |
| CN | 112262566 | A | 1/2021 |
| CN | 113259545 | A | 8/2021 |
| CN | 114285242 | A | 4/2022 |
| CN | 118897431 | A | 11/2024 |
| EP | 4528373 | A1 | 3/2025 |
| JP | 2009195084 | A | 8/2009 |
| JP | 2014-228712 | A | 12/2014 |
| TW | 202409694 | A | 3/2024 |

OTHER PUBLICATIONS

GB Search and Examination Report dated Nov. 25, 2025 in application No. 2508888.1.

* cited by examiner

2

65

LIGHT-PASSABLE HOLE MODULE, CAMERA MODULE AND ELECTRONIC DEVICE

RELATED APPLICATIONS

This application claims priority to U.S. Provisional Application 63/672,932, filed on Jul. 18, 2024, which is incorporated by reference herein in its entirety.

BACKGROUND

Technical Field

The present disclosure relates to a light-passable hole module, a camera module and an electronic device, more particularly to a light-passable hole module applicable to a camera module and an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

Recently, camera modules are applied to electronic devices in more fields than ever, such as portable devices (e.g., smartphones, action cameras), augmented reality (AR) or virtual reality (VR) head-mounted devices and aerial cameras. Moreover, the hardware used in the camera modules are continuously upgraded, for example, larger image sensors and imaging lenses with better image quality. A larger image sensor provides better image quality, but the background in the picture may become blurry due to an overly shallow depth of field. Conventionally, a variable aperture stop can be used to change the depth of field for adjusting the blur degree of the background and controlling the amount of incident light, such that arranging a variable aperture stop in an optical system of an electronic device becomes a forward-looking subject. However, the conventional optical system is designed without considering the configuration space of the variable aperture stop, resulting in limited design flexibility, poor integration with the variable aperture stop, an overly large size of the optical system and complicated assembly processes, as well as some issues such as jumping of the variable aperture stop during its operation and low yield rates of the corresponding structure manufacturing. Therefore, how to improve the corresponding structure of the variable aperture stop for meeting the requirement of high-end-specification electronic devices is an important topic in this field nowadays.

SUMMARY

According to one aspect of the present disclosure, a light-passable hole module sequentially along a central axis includes a blade assembly and a lid element. The blade assembly has a plurality of blades. The plurality of blades form a light-passable hole. The light-passable hole has a size variable by taking the central axis as a center. The lid element covers the blade assembly. The lid element has a through hole disposed corresponding to the light-passable hole. The lid element includes a plastic surface structure and a metal wall structure. The plastic surface structure faces towards one of the plurality of blades and is disposed corresponding to the one of the plurality of blades. In a direction parallel to the central axis, the plastic surface structure is located closer to the plurality of blades than the through hole and is disposed in sequence with the plurality of blades. The metal wall structure is disposed surrounding the through hole. The metal wall structure extends from the plastic surface structure along a direction parallel to the central axis. When a thickness of the plastic surface structure along a direction parallel to the central axis is Tp, the following condition is satisfied: $0.0092\ mm < Tp \leq 0.735\ mm$.

According to another aspect of the present disclosure, a light-passable hole module sequentially along a central axis includes a blade assembly and a lid element. The blade assembly has a plurality of blades. The plurality of blades form a light-passable hole. The light-passable hole has a size variable by taking the central axis as a center. The lid element covers the blade assembly. The lid element has a through hole disposed corresponding to the light-passable hole. The lid element includes a plastic surface structure and a metal wall structure. The plastic surface structure faces towards one of the plurality of blades and is disposed corresponding to the one of the plurality of blades. In a direction parallel to the central axis, the plastic surface structure is located closer to the plurality of blades than the through hole and is disposed in sequence with the plurality of blades. The metal wall structure is disposed surrounding the through hole. The metal wall structure extends from the plastic surface structure along a direction parallel to the central axis. When a maximum diameter of the plastic surface structure along a direction perpendicular to the central axis is $\phi p$, and a maximum diameter of the metal wall structure along a direction perpendicular to the central axis is $\phi m$, the following condition is satisfied:

$$0.1 < \Phi p/\Phi m \leq 1.05.$$

According to another aspect of the present disclosure, a camera module includes one of the aforementioned light-passable hole modules and a lens assembly disposed corresponding to the light-passable hole along a direction parallel to the central axis.

According to another aspect of the present disclosure, an electronic device includes the aforementioned camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
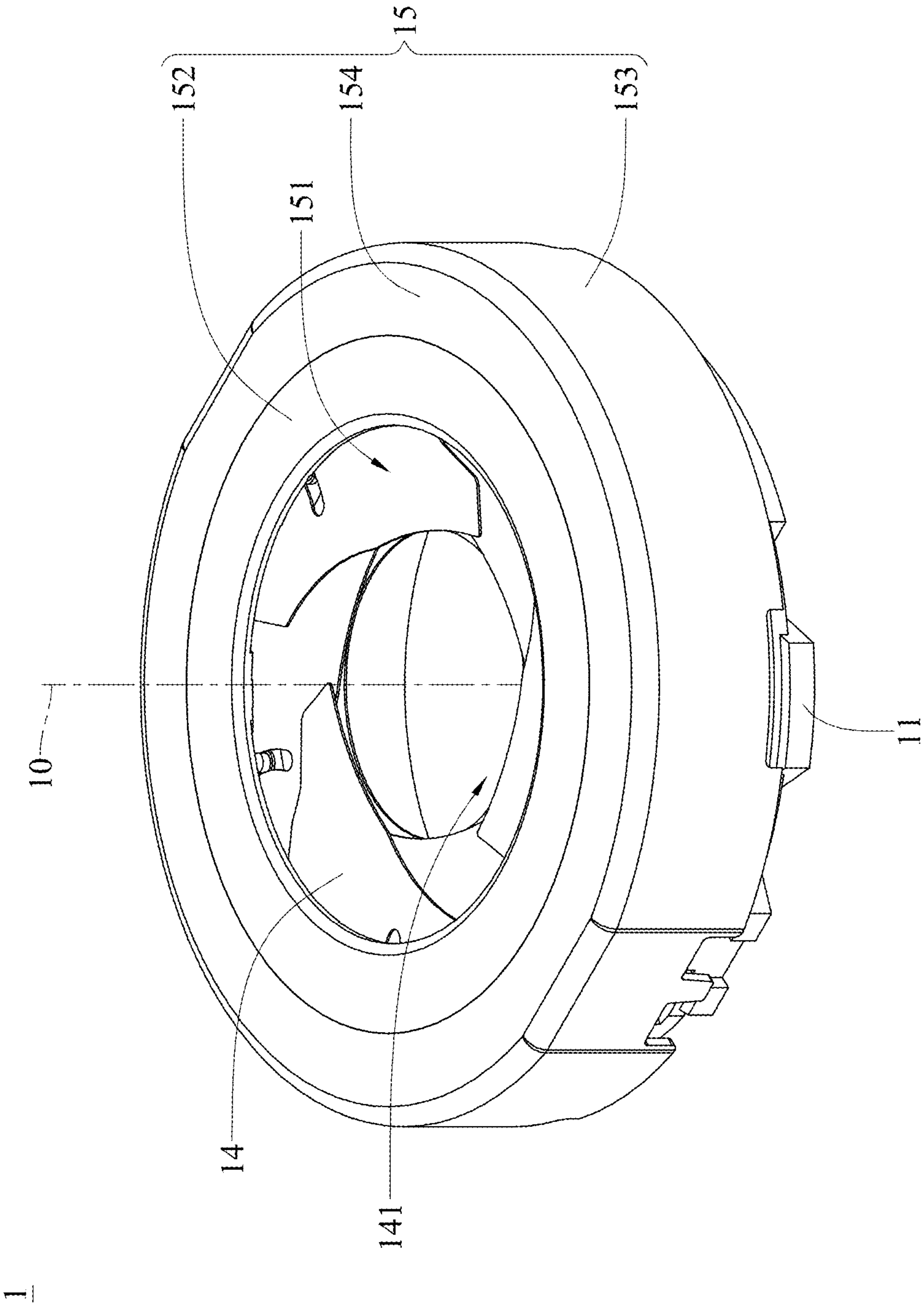
FIG. 1 is a perspective view of a light-passable hole module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A light-passable hole module provided in the present disclosure includes a blade assembly and a lid element that are arranged sequentially along a central axis.

The blade assembly has a plurality of blades forming a light-passable hole. The light-passable hole has a size variable by taking the central axis as a center.

The lid element covers the blade assembly. The lid element has a through hole disposed corresponding to the light-passable hole.

The lid element includes a plastic surface structure and a metal wall structure. With the design of the lid element, it is favorable for miniaturizing the overall size of the light-passable hole module and omitting the assembly process of the plastic surface structure and the metal wall structure, thereby significantly increasing the yield rate of manufacturing. Moreover, the lid element including the plastic surface structure and the metal wall structure can be made in one integrated piece. Moreover, the plastic surface structure can be made of plastic material, the metal wall structure can be made of metal material, and the plastic surface structure in plastic material and the metal wall structure in metal material can be manufactured by insert-molding. However, the present disclosure is not limited thereto.

The plastic surface structure can be disposed facing towards and corresponding to one of the plurality of blades. Therefore, it is favorable for reducing the floating of the blade during its rotation, so that a stable movement of the rotated blade can be ensured to accurately and precisely control the size variation of the light-passable hole. In a direction parallel to the central axis, the plastic surface structure can be located closer to the plurality of blades than the through hole and can be disposed in sequence with the plurality of blades. With the design of the plastic surface structure close to the blades, it is favorable for effectively reducing the jumping of the blades during their operation.

The plastic surface structure can be disposed surrounding the through hole. It can be also considered that the plastic surface structure can extend towards the through hole. The plastic surface structure can define the through hole. Therefore, it is favorable for having a specific effect in eliminating stray light, thereby effectively reducing excessive reflection of non-imaging light. Moreover, the plastic surface structure can be designed to have a relatively large area for facing towards the blades. Therefore, it is favorable for preventing unwanted bending of the blades caused by an impact during a drop testing of the light-passable hole module, thereby increasing product reliability of the light-passable hole module. Moreover, the plastic surface structure can have a protrusion facing towards the blades. With the design of the protrusion, it is favorable for arranging the plastic surface structure closer to the blades, thereby further reducing the jumping of the blades during their operation.

The metal wall structure is disposed surrounding the through hole. The metal wall structure extends from the plastic surface structure along a direction parallel to the central axis. Moreover, the metal wall structure can extend from an outer edge of the plastic surface structure along a direction parallel to the central axis.

The lid element can further include a metal surface structure. The metal surface structure can extend towards the through hole from the metal wall structure. It can also be considered that the metal surface structure can extend towards the central axis from the metal wall structure. The metal surface structure can define the through hole. Therefore, it is favorable for reducing the size of the plastic surface structure so as to speed up the injection molding.

According to the present disclosure, the light-passable hole module can further include a base. The base can be immovable with respect to the lid element. The base can have a first axial structure. The plurality of blades are movable within a specific range according to the first axial structure so as to control the size of the light-passable hole. It can be also considered that the blades can be moved close to or away from the central axis by changing the relative position between the blades and the first axial structure. Therefore, it is favorable for controlling the size of the light-passable hole. With the mechanical cooperation of the base and the lid element, it is convenient to perform automated assembly.

Moreover, each blade can have a first driving hole. The first driving holes can be disposed corresponding to the first axial structure, and the first axial structure can be disposed through the first driving holes. Each first driving hole can be a long hole. Therefore, it is favorable for reducing excessive impact between the driving holes and the axial structure during relative motion therebetween, such that the blades can still have good flatness after a durability testing. Moreover, the plastic surface structure can have a first recess structure. The first recess structure can be recessed along a direction away from the first axial structure and can be disposed corresponding to the first axial structure. Therefore, it is favorable for further reducing the jumping of the blades during their operation, and preventing unwanted deformation or bending of the blades caused by an impact with a surrounding hard object during the drop testing. Moreover, the first recess structure can be a circular hole. Moreover, the first recess structure can be a blind hole structure which is disposed through the plastic surface structure but not disposed through the lid element. Therefore, it is favorable for remaining the appearance of the light-passable hole module without any openings, ensuring the blades are not affected by external temperature and moisture.

According to the present disclosure, the light-passable hole module can further include a rotation element. The rotation element is rotatable about the central axis. The rotation element can have a second axial structure. The second axial structure can be coupled with the plurality of blades so as to vary the size of the light-passable hole. It can be also considered that the size of the light-passable hole can be varied by movement and/or rotation of blades driven by the rotation element with cooperation with the first axial structure.

Moreover, each blade can have a second driving hole. The second driving holes can be disposed corresponding to the second axial structure, and the second axial structure can be disposed through the second driving holes. Each second driving hole can be a circular hole. Therefore, it is favorable for collaborating with the first driving hole to significantly reduce relative motion between the driving holes and the axial structure and to significantly reduce warpage of blades, thereby maintaining good mechanical transmission accuracy. Moreover, the plastic surface structure can have a second recess structure. The second recess structure can be recessed along a direction away from the second axial structure and can be disposed corresponding to the second axial structure. Therefore, it is favorable for further reducing the jumping of the blades during their operation, and preventing unwanted deformation or bending of the blades caused by an impact with a surrounding hard object during the drop testing. Moreover, the second recess structure can be a long hole. Moreover, the second recess structure can be a blind hole structure which is disposed through the plastic surface structure but not disposed through the lid element. Therefore, it is favorable for remaining the appearance of the light-passable hole module without any openings, ensuring the blades are not affected by external temperature and moisture.

According to the present disclosure, the light-passable hole module can further include a plurality of rollable elements. The plurality of rollable elements can be disposed between the base and the rotation element so as to provide a rotational degree of freedom of the rotation element. It can be also considered that the rollable elements can guide the rotation element to rotate with respect to the base. Therefore, it is favorable for providing high rotation stability of the rotation element, thereby preventing unwanted slight shaking during its rotation. Therefore, the arrangement of the rollable elements is favorable for detecting the assembly process of the light-passable hole module, thereby effectively and accurately picking up and replacing defective components. Moreover, the rollable elements can be spherical, cylindrical, conical, etc., and the present disclosure is not limited thereto.

When a thickness of the plastic surface structure along a direction parallel to the central axis is Tp, the following condition can be satisfied: 0.0092 mm (millimeters) $<Tp\leq 0.735$ mm. Therefore, it is favorable for significantly increasing the yield rate by using the plastic portion of the one-piece lid element with appropriate thickness during automated assembly. Moreover, the following condition also be satisfied: 0.036 mm$<Tp\leq$0.58 mm. Therefore, it is favorable for providing a thinner plastic surface structure to have good molding quality under the production condition of the insert-molding.

When a maximum diameter of the plastic surface structure along a direction perpendicular to the central axis is $\phi p$, and a maximum diameter of the metal wall structure along a direction perpendicular to the central axis is $\phi m$, the following condition can be satisfied: $0.1<\phi p/\phi m\leq 1.05$. Therefore, it is favorable for effectively simplifying the mold design of the lid element so as to significantly increase success rate during product development, thereby effectively providing feasibility of mass production of miniaturized parts. Moreover, the following condition also be satisfied: $0.15\leq\phi p/\phi m<0.975$. Therefore, it is favorable for optimizing the size accuracy of the miniaturized parts.

When a height of the metal wall structure along a direction parallel to the central axis is Hm, the following condition can be satisfied: 0.042 mm$\leq Hm<$6.83 mm. Therefore, it is favorable for preventing an overly high metal wall structure so as to prevent interference with the mold, thereby providing good molding accuracy of the plastic surface structure and increasing success rate of the insert-molding.

When the thickness of the plastic surface structure along the direction parallel to the central axis is Tp, and the height of the metal wall structure along the direction parallel to the central axis is Hm, the following condition can be satisfied: $0.004\leq Tp/Hm<0.41$. Therefore, it is favorable for effectively maintaining consistency in size accuracy during mass production, thereby having good stability of pass production.

A camera module provided in the present disclosure includes the aforementioned light-passable hole module and a lens assembly disposed corresponding to the light-passable hole along a direction parallel to the central axis. Moreover, the light-passable hole can form an aperture of the camera module.

An electronic device provided in the present disclosure includes the aforementioned camera module.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
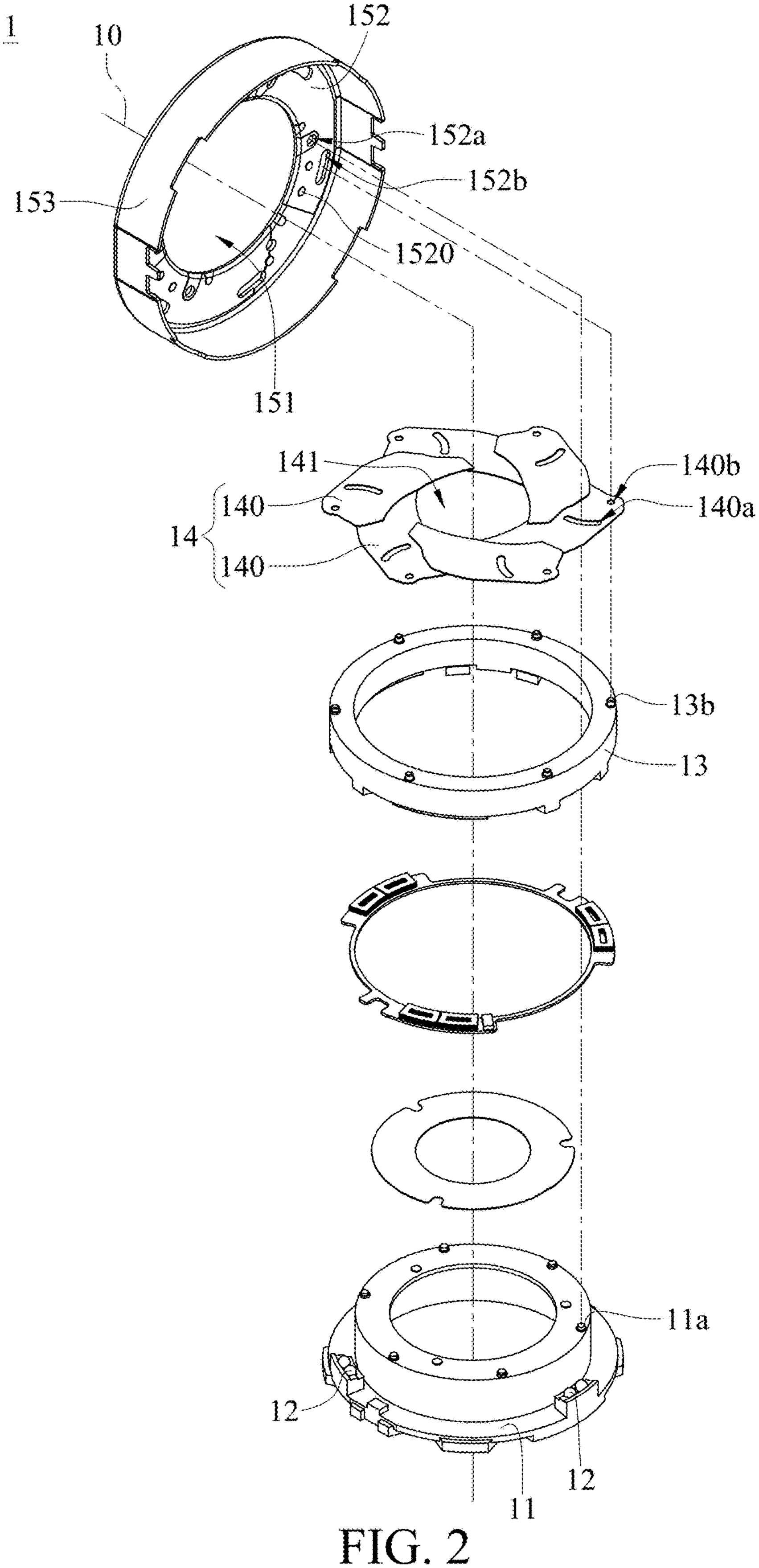
FIG. 2 is an exploded view of the light-passable hole module of FIG. 1.
Figure 3:
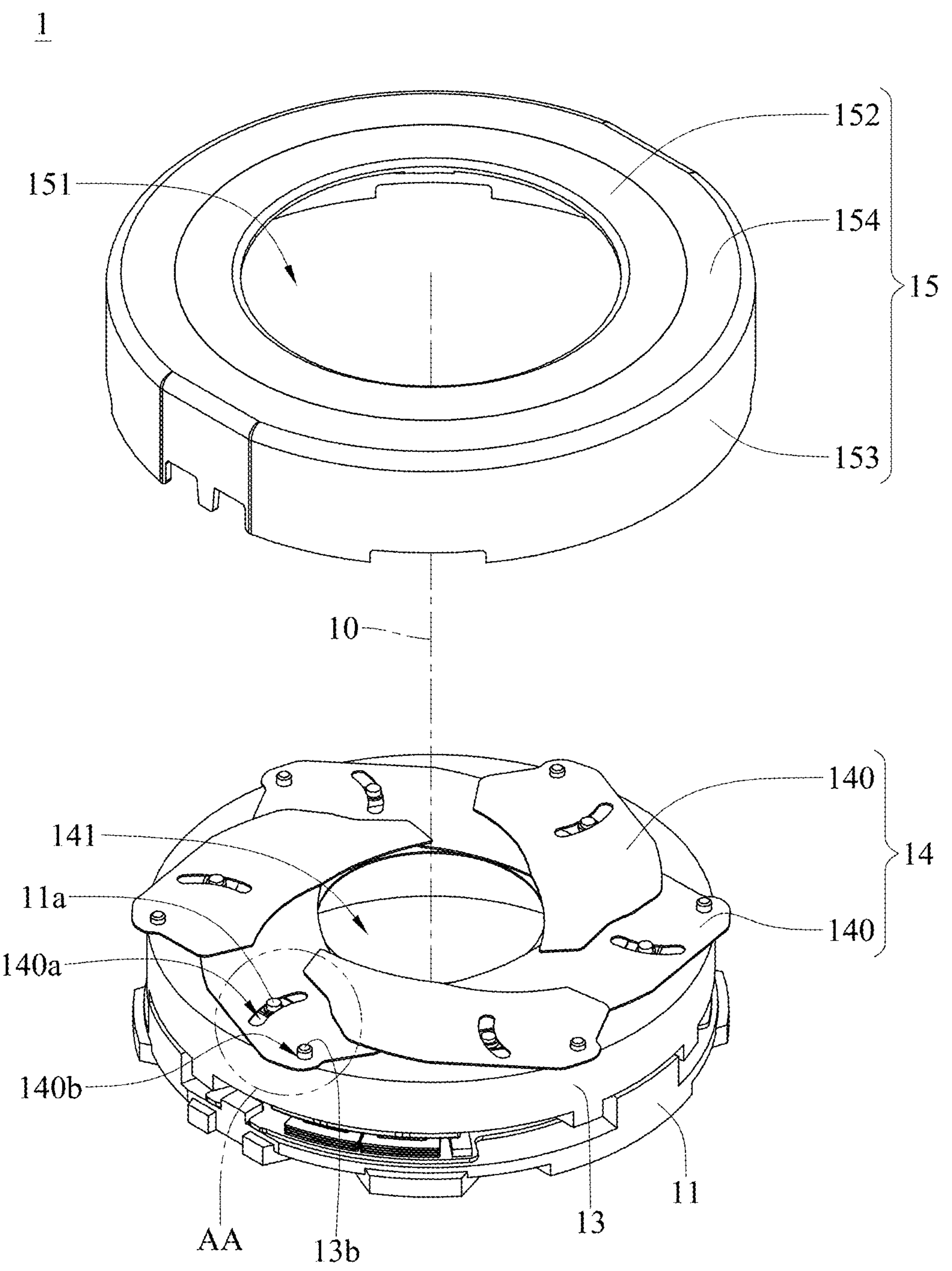
FIG. 3 is a schematic view showing a lid element being disassembled in the light-passable hole module of FIG. 1.
Figure 4:
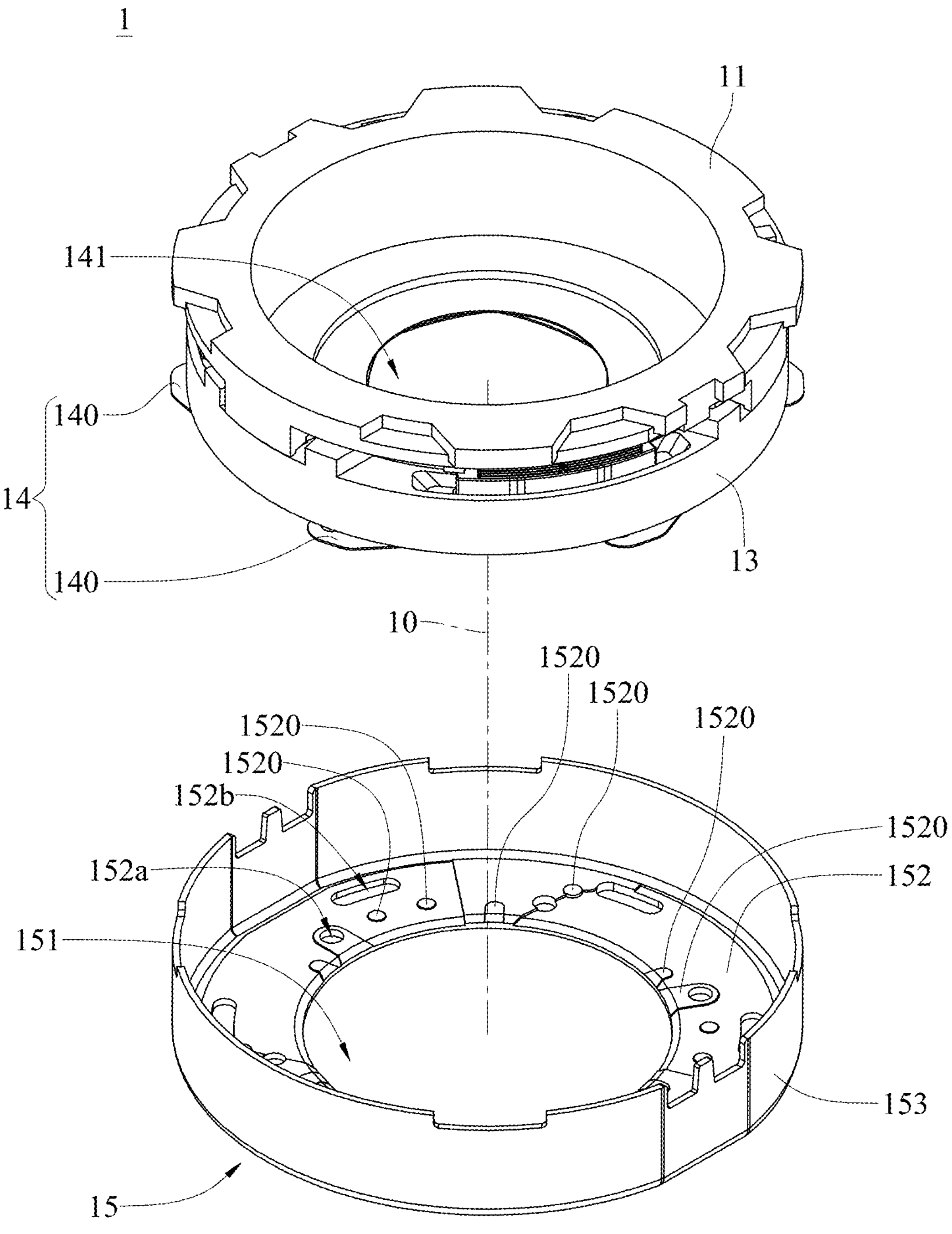
FIG. 4 is another schematic view showing the lid element being disassembled in the light-passable hole module of FIG. 1.
Figure 5:
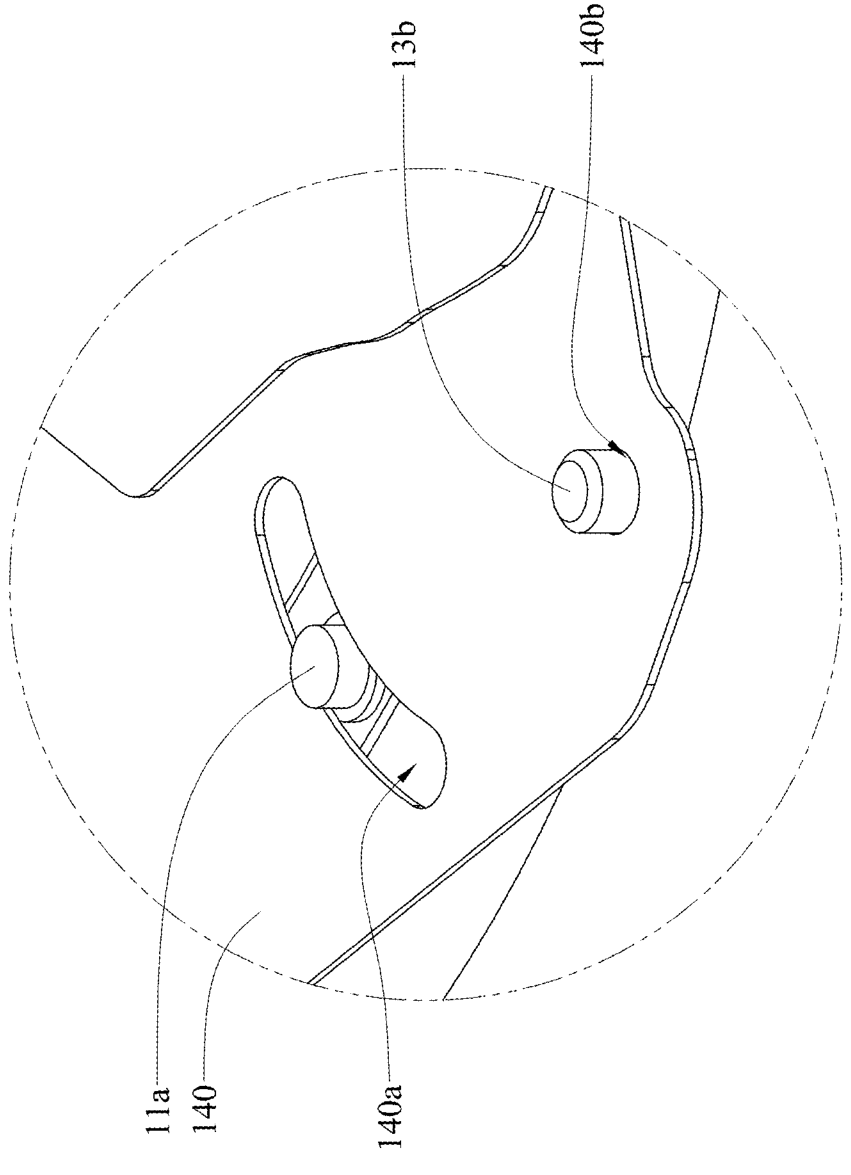
FIG. 5 is an enlarged view of AA region of the light-passable hole module of FIG. 3.
Figure 6:
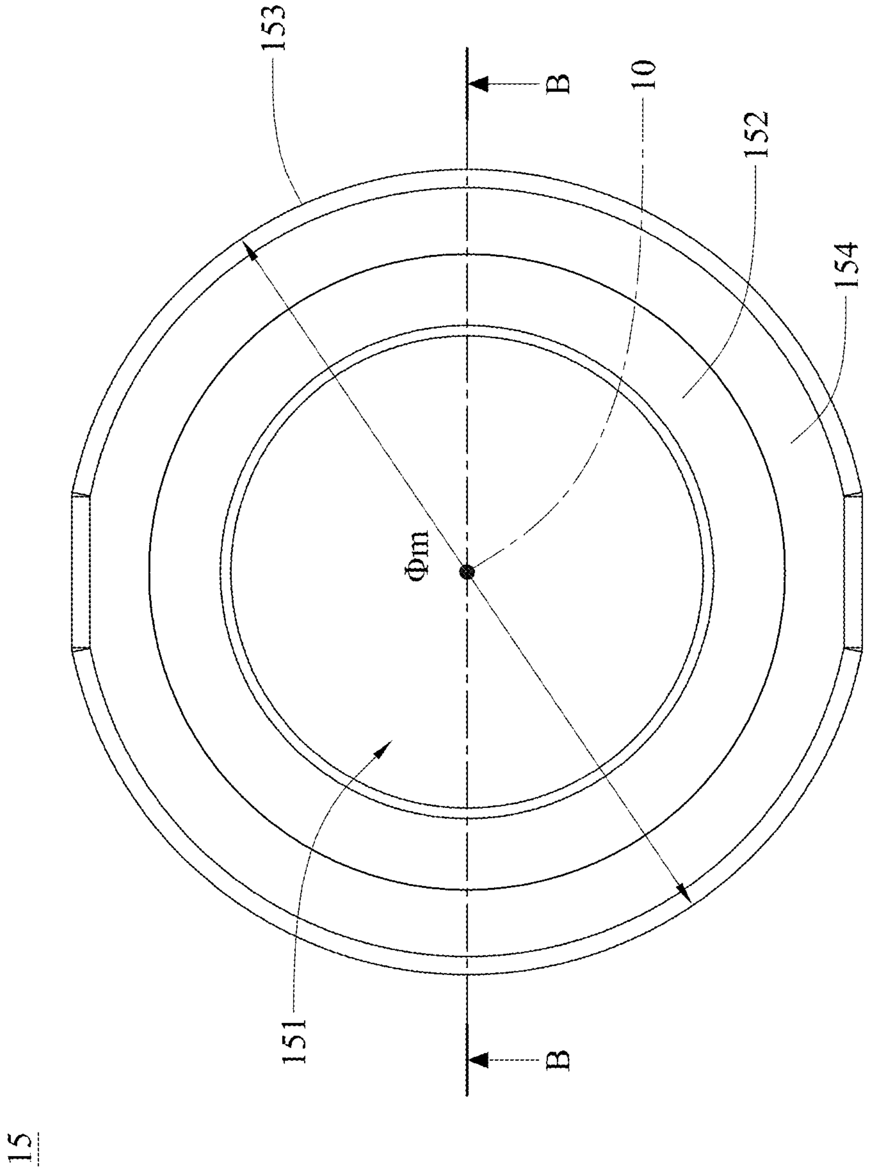
FIG. 6 is a top view of the lid element of the light-passable hole module of FIG. 1.
Figure 7:
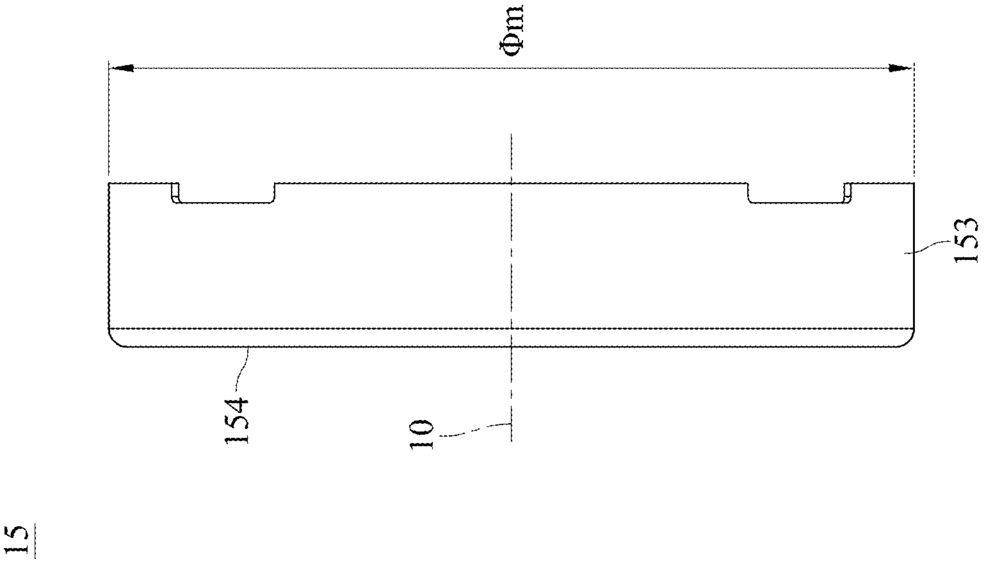
FIG. 7 is a side view of the lid element of the light-passable hole module of FIG. 1.
Figure 8:
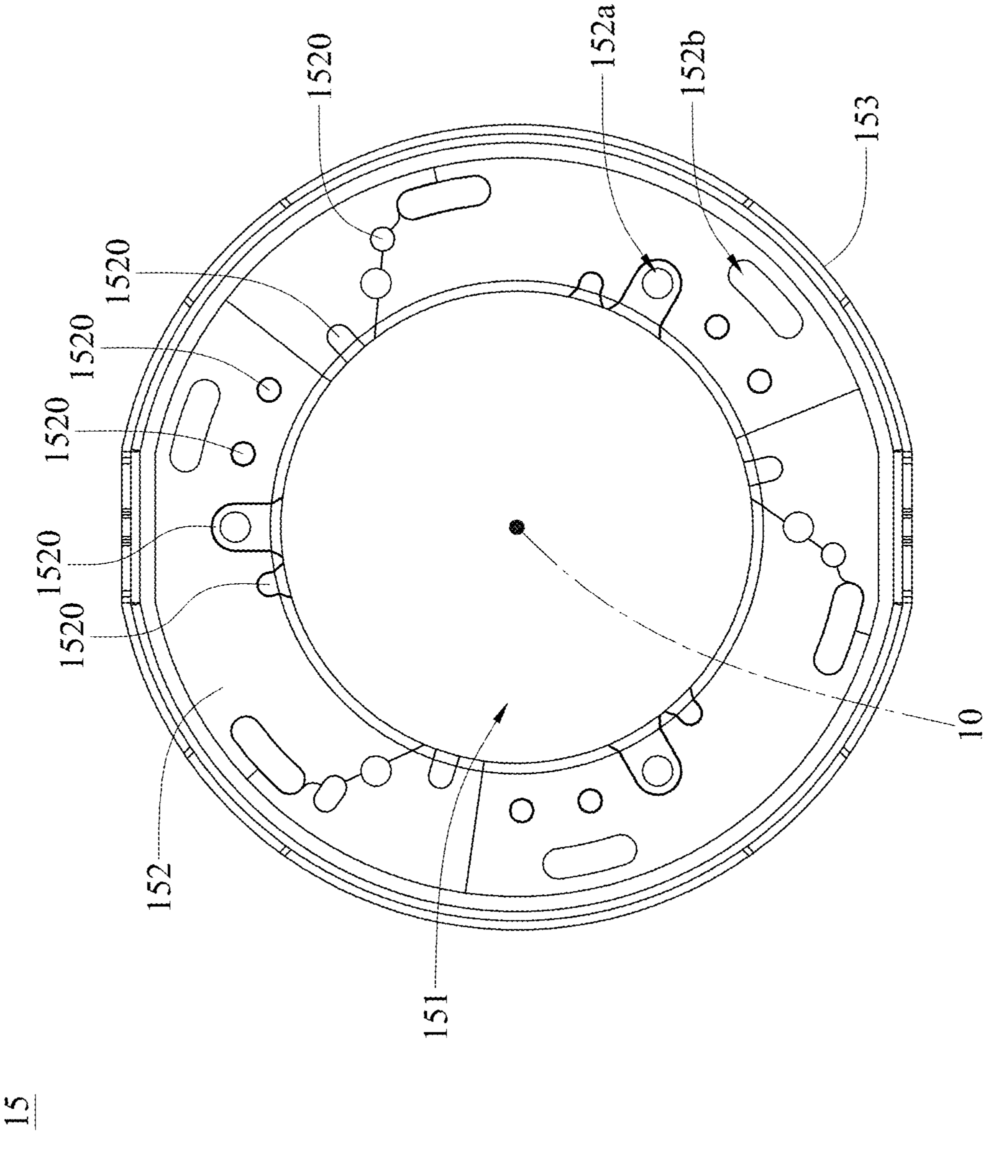
FIG. 8 is a bottom view of the lid element of the light-passable hole module of FIG. 1.
Figure 9:
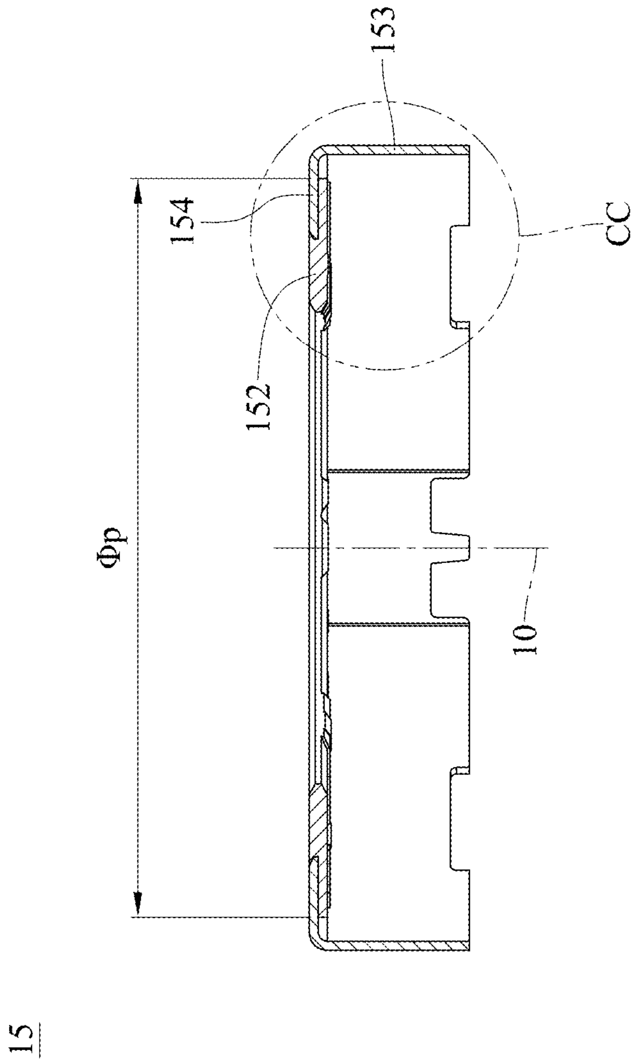
FIG. 9 is a cross-sectional view of the lid element sectioned along line B-B in the light-passable hole module of FIG. 6.
Figure 10:
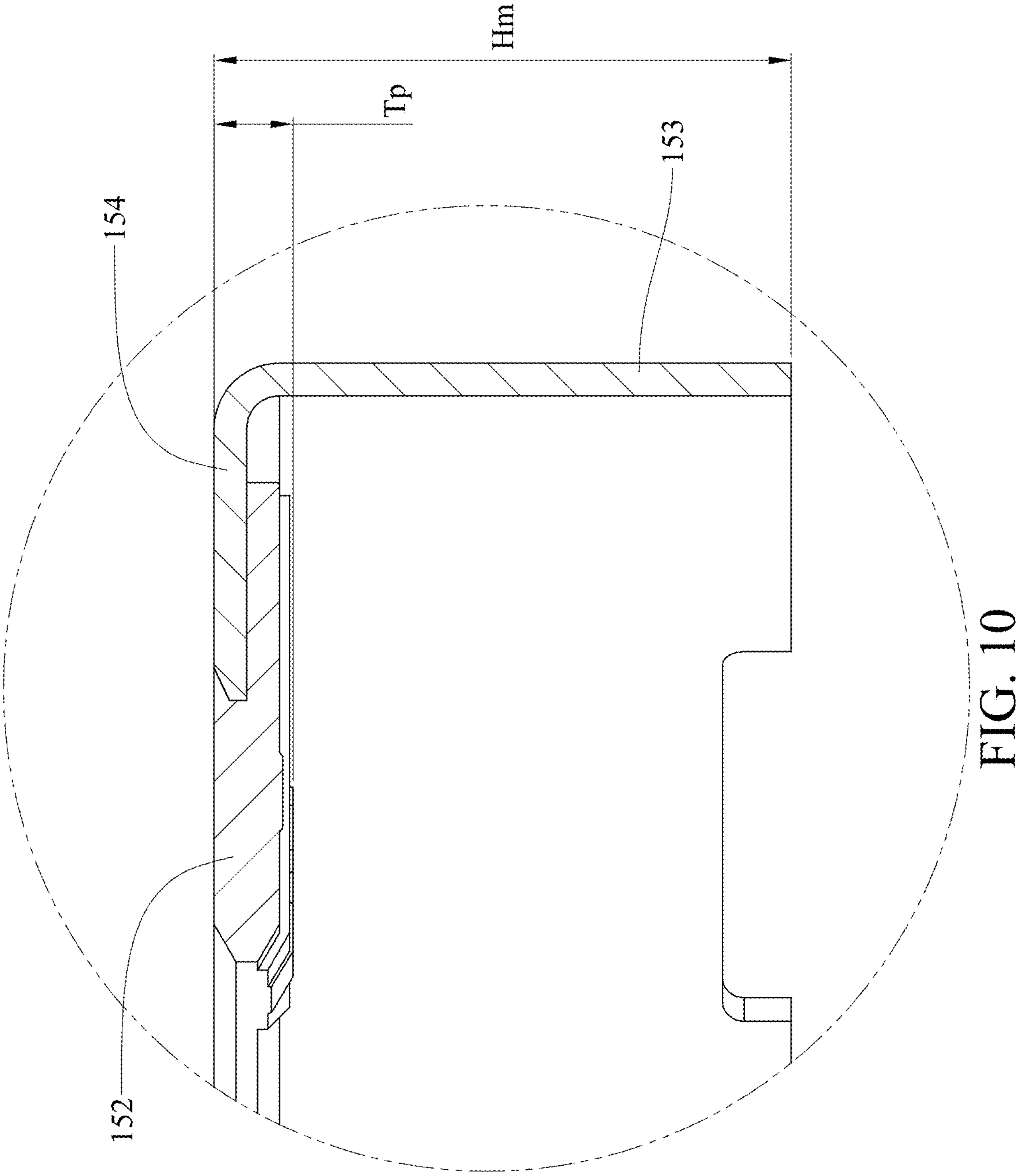
FIG. 10 is an enlarged view of CC region of the lid element of the light-passable hole module of FIG. 9.

Please refer to FIG. 1 to FIG. 10, where FIG. 1 is a perspective view of a light-passable hole module according to the 1st embodiment of the present disclosure, FIG. 2 is an exploded view of the light-passable hole module of FIG. 1, FIG. 3 is a schematic view showing a lid element being disassembled in the light-passable hole module of FIG. 1, FIG. 4 is another schematic view showing the lid element being disassembled in the light-passable hole module of FIG. 1, FIG. 5 is an enlarged view of AA region of the light-passable hole module of FIG. 3, FIG. 6 is a top view of the lid element of the light-passable hole module of FIG. 1, FIG. 7 is a side view of the lid element of the light-passable hole module of FIG. 1, FIG. 8 is a bottom view of the lid element of the light-passable hole module of FIG. 1, FIG. 9 is a cross-sectional view of the lid element sectioned along line B-B in the light-passable hole module of FIG. 6, and FIG. 10 is an enlarged view of CC region of the lid element of the light-passable hole module of FIG. 9.

A light-passable hole module 1 provided in this embodiment includes, sequentially along a central axis 10, a base 11, a plurality of rollable elements 12, a rotation element 13, a blade assembly 14 and a lid element 15.

The base 11 has a plurality of first axial structures **11*a* extending towards the rotation element 13, as shown in FIG. 2**.

The rollable elements 12 are balls disposed between the base 11 and the rotation element 13 so as to provide a rotational degree of freedom of the rotation element 13, as shown in FIG. 2.

The rotation element 13 is rotatable about the central axis 10. It can also be considered that the rotation element 13 is rotatable with respect to the base 11 by the guiding of the rollable elements 12. The rotation element 13 has a plurality of second axial structures **13*b* extending towards the blade assembly 14, as shown in FIG. 2**.

The blade assembly 14 is located between the rotation element 13 and the lid element 15. The blade assembly 14 has a plurality of blades 140 forming a light-passable hole 141. The light-passable hole 141 has a size variable by taking the central axis 10 as a center.

The lid element 15 covers the blade assembly 14 and is immovable with respect to the base 11. The lid element 15 has a through hole 151 disposed corresponding to the light-passable hole 141.

The lid element 15 is made in one piece. In specific, the lid element 15 includes a plastic surface structure 152, a metal wall structure 153 and a metal surface structure 154. The plastic surface structure 152 is made of plastic material, the metal wall structure 153 and the metal surface structure 154 are made of metal material, and the plastic surface structure 152, the metal wall structure 153 and the metal surface structure 154 are made by insert-molding.

The plastic surface structure 152 extends towards the through hole 151. In this embodiment, the plastic surface structure 152 is disposed in a loop to surround the through hole 151 on both the inner side and the outer side of the light-passable hole module 1, as shown in FIGS. 3, 4, 6 and 8. In this embodiment, the plastic surface structure 152 defines the through hole 151 on both the inner side and the outer side of the light-passable hole module 1, as shown in FIGS. 3, 4, 6 and 8. In this embodiment, the plastic surface structure 152 covers at least part of the metal surface structure 154 on the inner side of the light-passable hole module 1 along a direction parallel to the central axis 10 and exposes at least part of the metal surface structure 154 on the outer side of the light-passable hole module 1 along a direction parallel to the central axis 10, as shown in FIGS. 9 and 10.

The plastic surface structure 152 faces towards one of the plurality of blades 140 and is disposed corresponding to the one blade 140. The plastic surface structure 152 is located closer to the blades 140 than the through hole 151 along a direction parallel to the central axis 10 and is disposed in sequence with the blades 140 along a direction parallel to the central axis 10.

In this embodiment, the plastic surface structure 152 has a plurality of protrusions 1520 facing towards the blades 140, as shown in FIGS. 2 and 4.

The plastic surface structure 152 further has a plurality of first recess structures 152*a*. The first recess structures are recessed along a direction away from the first axial structures 11*a* and are disposed corresponding to the first axial structures 11*a*, as shown in FIG. 2. In this embodiment, each first recess structure 152*a* is a circular hole and a blind hole structure disposed through the plastic surface structure 152 but not disposed through the lid element 15.

The plastic surface structure 152 further has a plurality of second recess structures 152*b*. The second recess structures are recessed along a direction away from the second axial structures 13*b* and are disposed corresponding to the second axial structures 13*b*, as shown in FIG. 2. In this embodiment, each second recess structure 152*b* is a long hole and a blind hole structure disposed through the plastic surface structure 152 but not disposed through the lid element 15.

The metal wall structure 153 is disposed surrounding the through hole 151 and extends from the plastic surface structure 152 on the inner side of the light-passable hole module 1 along a direction parallel to the central axis 10.

The metal surface structure 154 extends towards the through hole 151 from the metal wall structure 153. It can also be considered that the metal surface structure 154 extends towards the central axis 10 from the metal wall structure 153.

When a thickness of the plastic surface structure 152 along a direction parallel to the central axis 10 is Tp, and a height of the metal wall structure 153 along a direction parallel to the central axis 10 is Hm, the following conditions are satisfied: Tp=0.363 mm; Hm=2.65 mm; and Tp/Hm=0.137, as shown in FIGS. 9 and 10.

When a maximum diameter of the plastic surface structure 152 along a direction perpendicular to the central axis 10 is ϕp, and a maximum diameter of the metal wall structure 153 along a direction perpendicular to the central axis 10 is ϕm, the following conditions are satisfied: ϕp=12.2 mm; ϕm=13.3 mm; and ϕp/ϕm=0.917, as shown in FIGS. 6, 7 and 9.

In the following, the operation of the blade assembly 14 would be illustrated. The blades 140 of the blade assembly 14 are movable within a specific range according to the first axial structures 11*a* and are coupled with the second axial structures 13*b* so as to vary the size of the light-passable hole 141. It can also be considered that with the movement and/or rotation of the blades 140 driven by the rotation element 13, the relative position between the blades 140 and the first axial structures 11*a* can be changed, such that the blades 140 can be moved close to or away from the central axis 10 so as to control the size of the light-passable hole 141.

In specific, each blade 140 has a plurality of first driving holes 140*a* corresponding to the first axial structures 11*a* and a plurality of second driving holes 140*b* corresponding to the second axial structures 13*b*. In this embodiment, the first driving holes 140*a* are long holes, and the second driving holes 140*b* are circular holes. The first axial structures 11*a* of the base 11 are disposed through the first driving holes 140*a* of the blade assembly 14 and are located in the first recess structures 152*a* of the lid element 15 immovable with respect to the base 11. The second axial structures 13*b* of the base 11 are disposed through the second driving holes 140*b* of the blade assembly 14 and are located in the second recess structures 152*b* of the lid element 15 immovable with respect to the base 11. With the first driving holes 140*a*, the second driving holes 140*b*, the first recess structures 152*a* and the second recess structures 152*b* designed in long holes or circular holes, the blades 140 of the blade assembly 14 are movable/rotatable between the base 11 and the lid element 15 immovable with respect to each other, such that the blades 140 can be moved close to or away from the central axis 10 for varying the size of the light-passable hole 141.

2nd Embodiment

Figure 11:
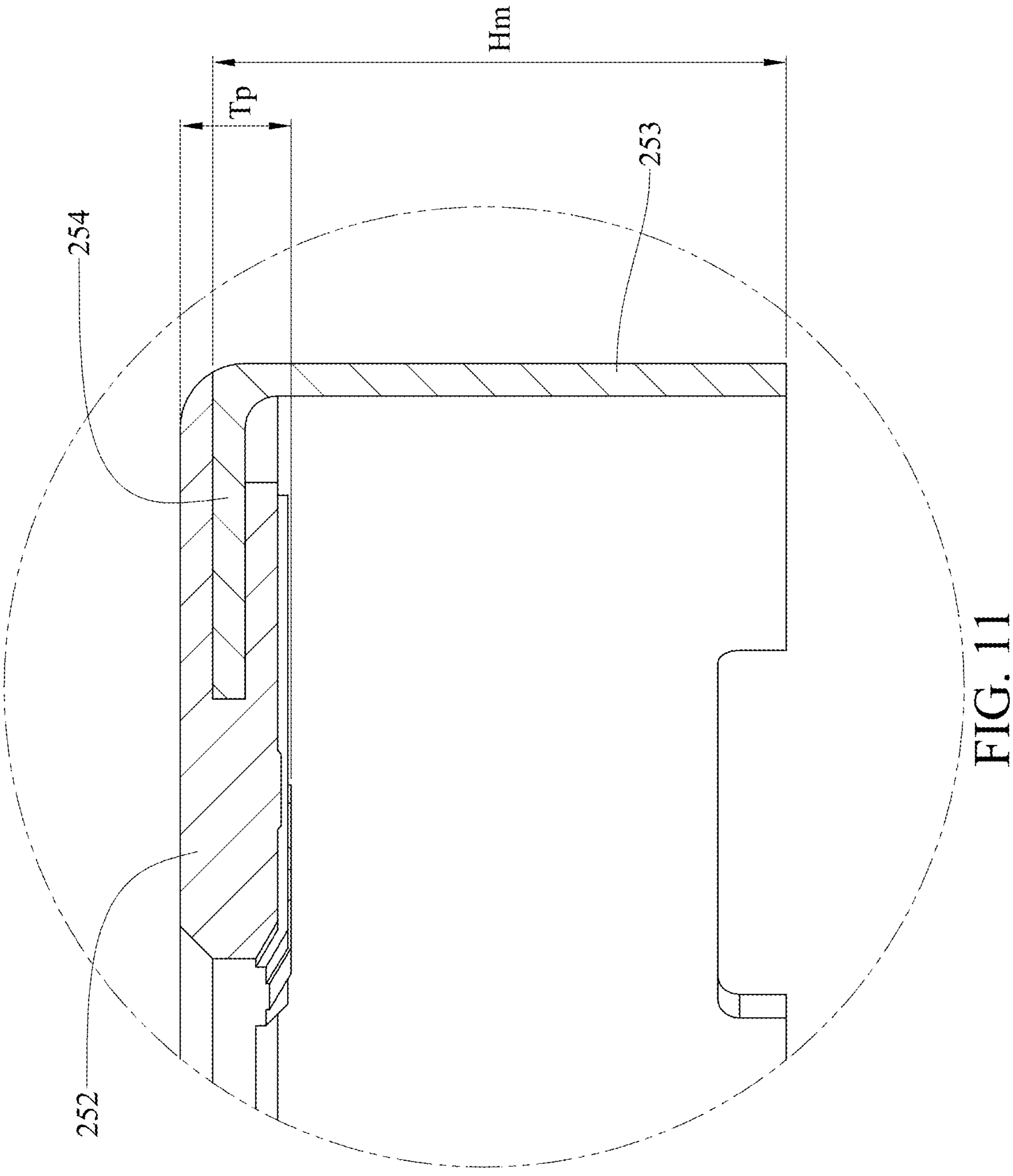
FIG. 11 is an enlarged view of a lid element of a light-passable hole module according to the 2nd embodiment of the present disclosure.

Please refer to FIG. 11, which is an enlarged view of a lid element of a light-passable hole module according to the 2nd embodiment of the present disclosure. The light-passable hole module 2 provided in this embodiment is similar to the light-passable hole module 1 of the 1st embodiment, and therefore only differences between this and the 1st embodiments, as well as necessary illustration, would be described.

In this embodiment, the plastic surface structure 252 covers at least part of the metal surface structure 254 on the inner side of the light-passable hole module 2 along a direction parallel to the central axis and covers the whole metal surface structure 254 on the outer side of the light-passable hole module 2 along a direction parallel to the central axis, as shown in FIG. 11.

When a thickness of the plastic surface structure 252 along a direction parallel to the central axis is Tp, and a height of the metal wall structure 253 along a direction parallel to the central axis is Hm, the following conditions are satisfied: Tp=0.513 mm; Hm=2.65 mm; and Tp/Hm=0.194, as shown in FIG. 11.

3rd Embodiment

Figure 12:
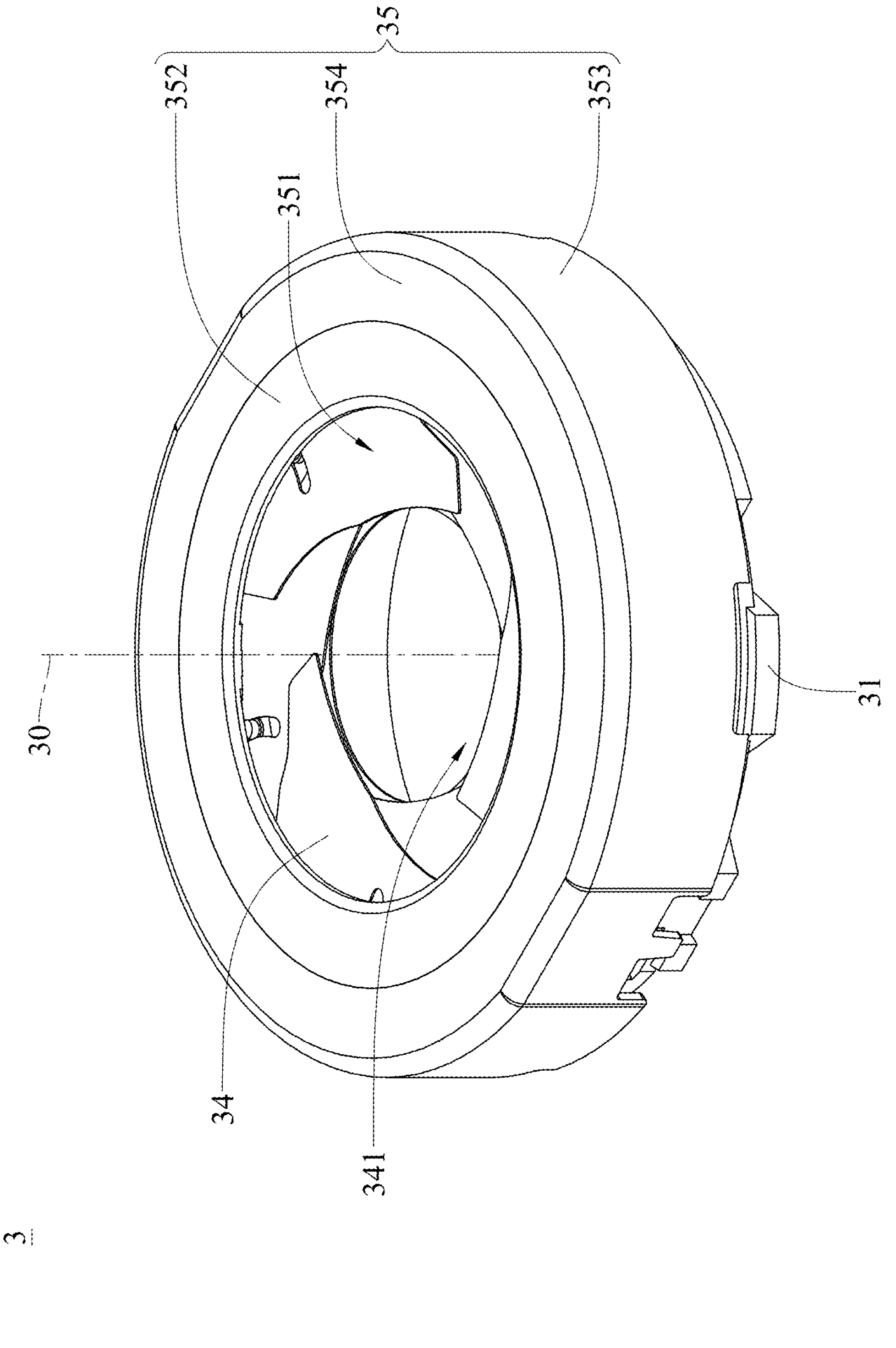
FIG. 12 is a perspective view of a light-passable hole module according to the 3rd embodiment of the present disclosure.
Figure 13:
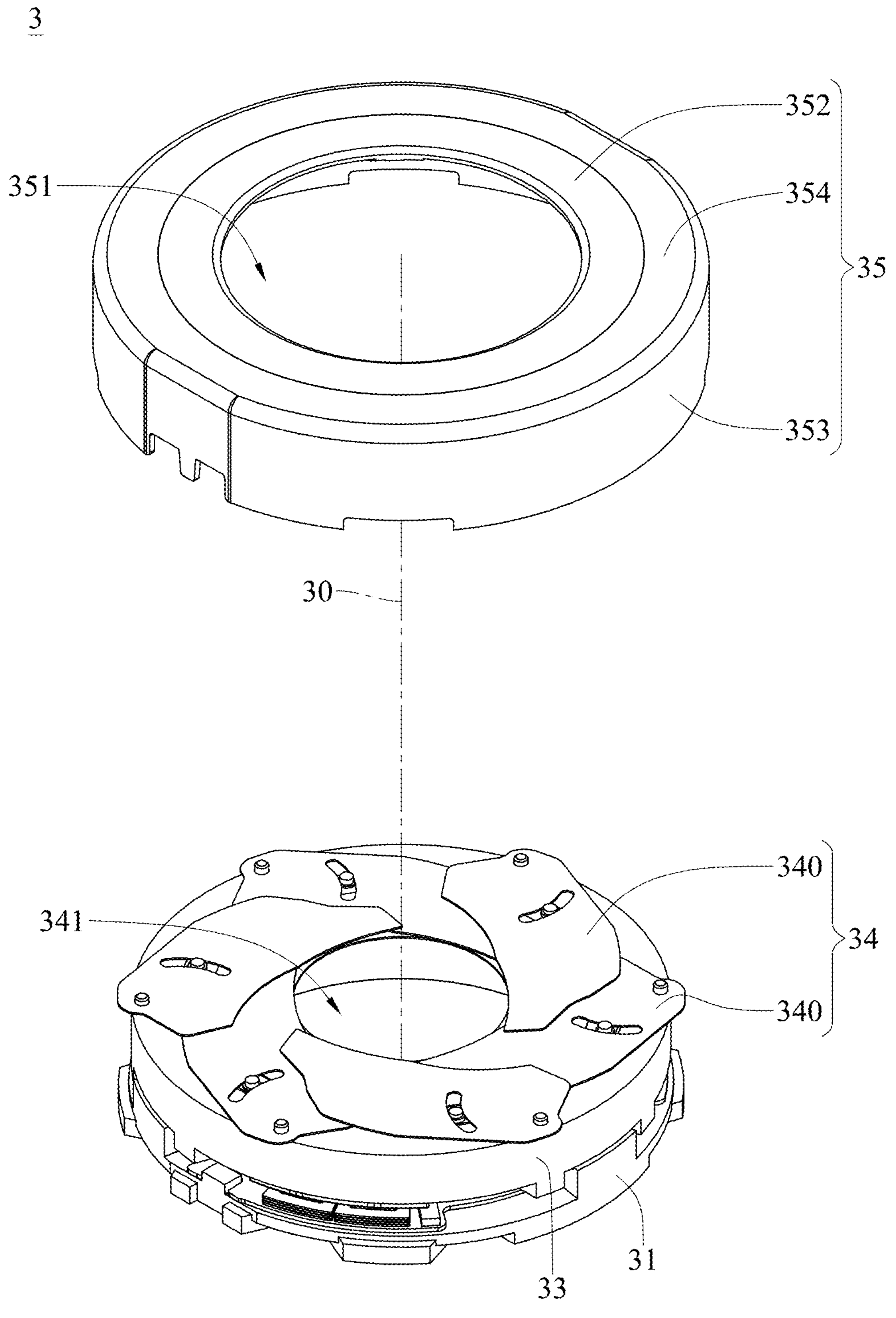
FIG. 13 is a schematic view showing a lid element being disassembled in the light-passable hole module of FIG. 12.
Figure 14:
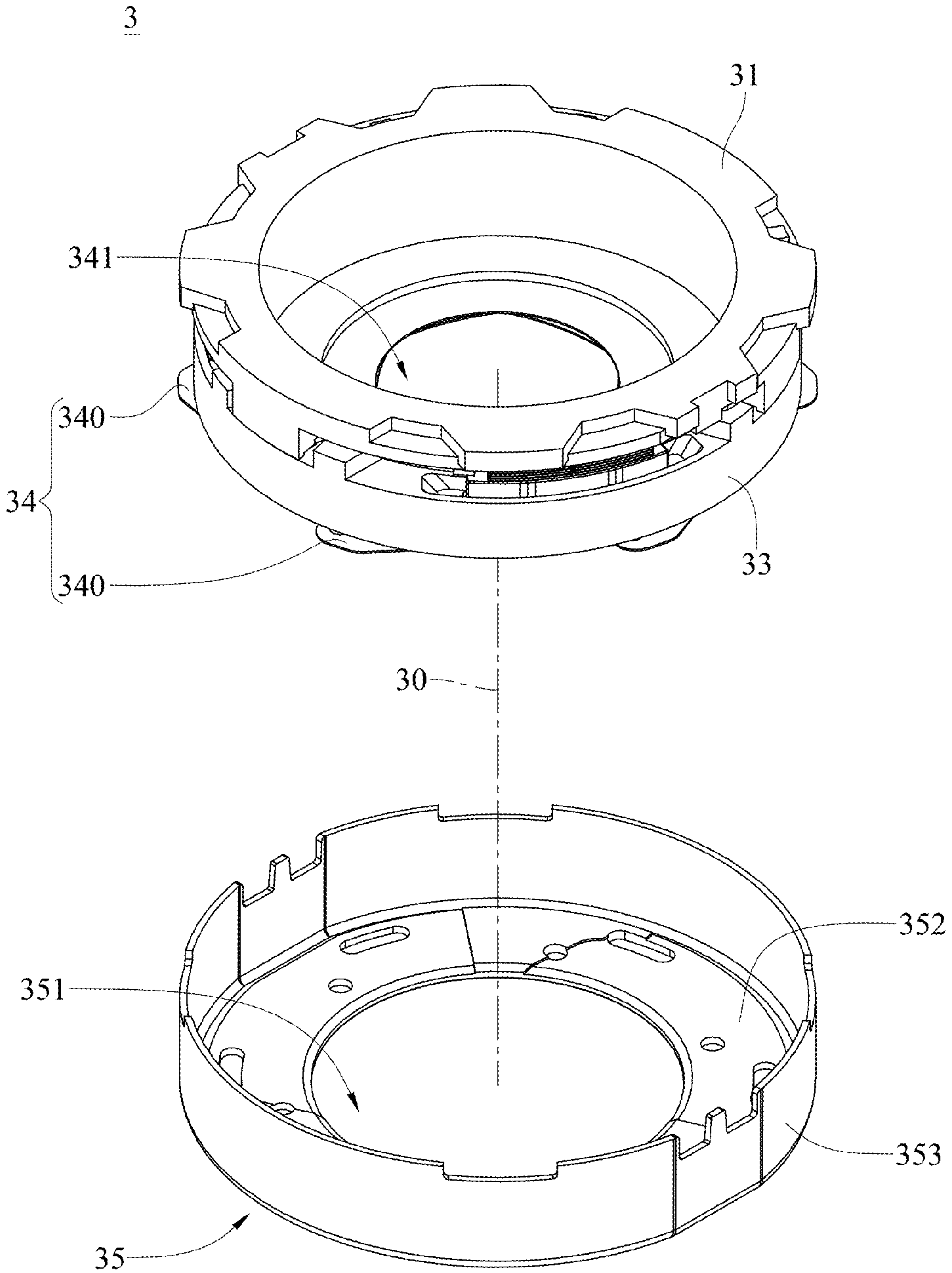
FIG. 14 is another schematic view showing the lid element being disassembled in the light-passable hole module of FIG. 12.
Figure 15:
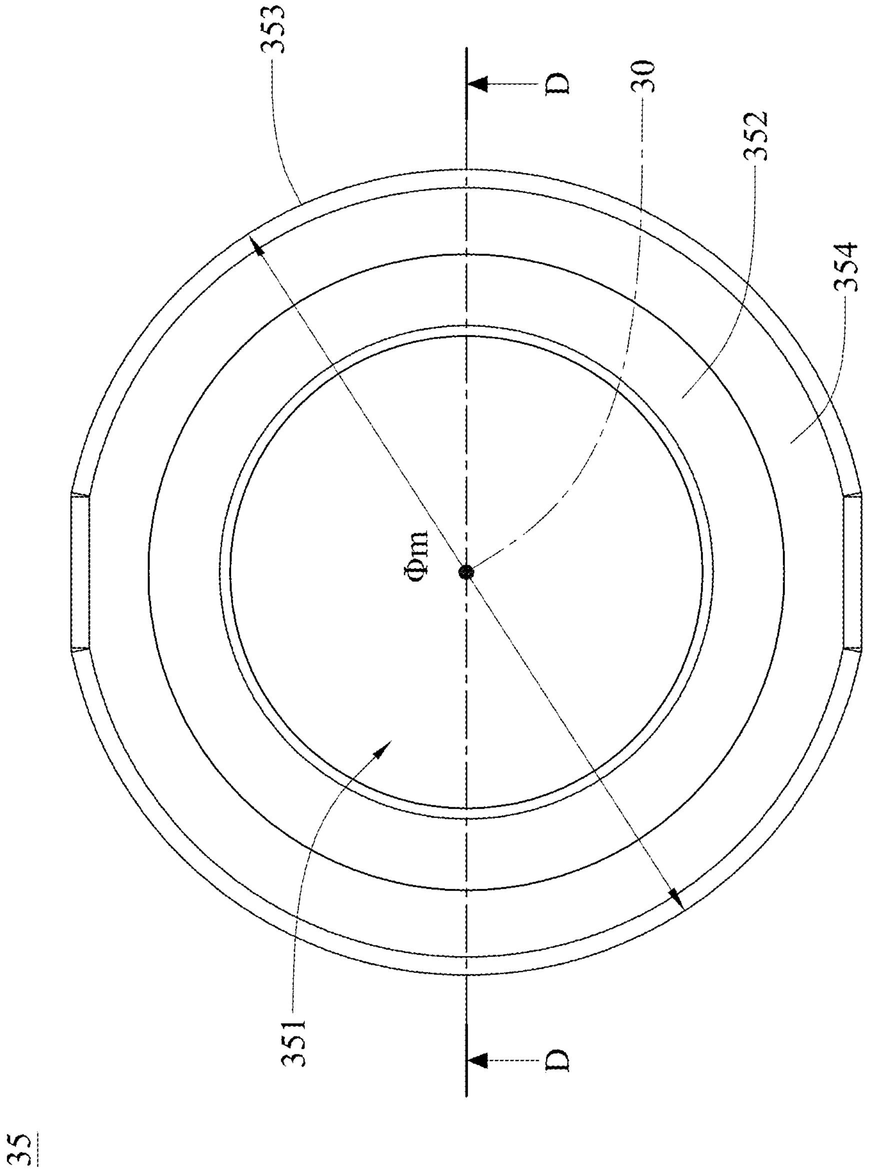
FIG. 15 is a top view of the lid element of the light-passable hole module of FIG. 12.
Figure 16:
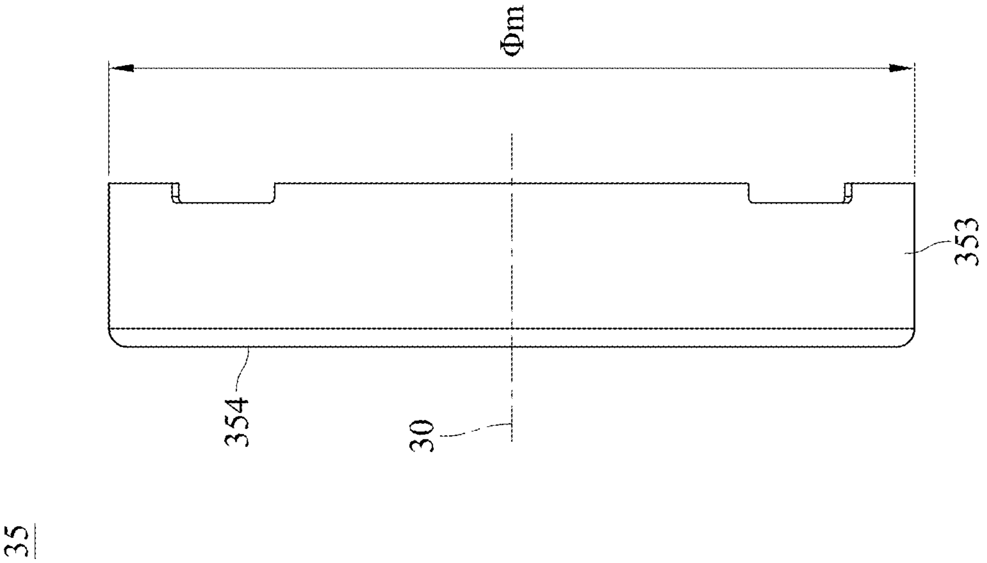
FIG. 16 is a side view of the lid element of the light-passable hole module of FIG. 12.
Figure 17:
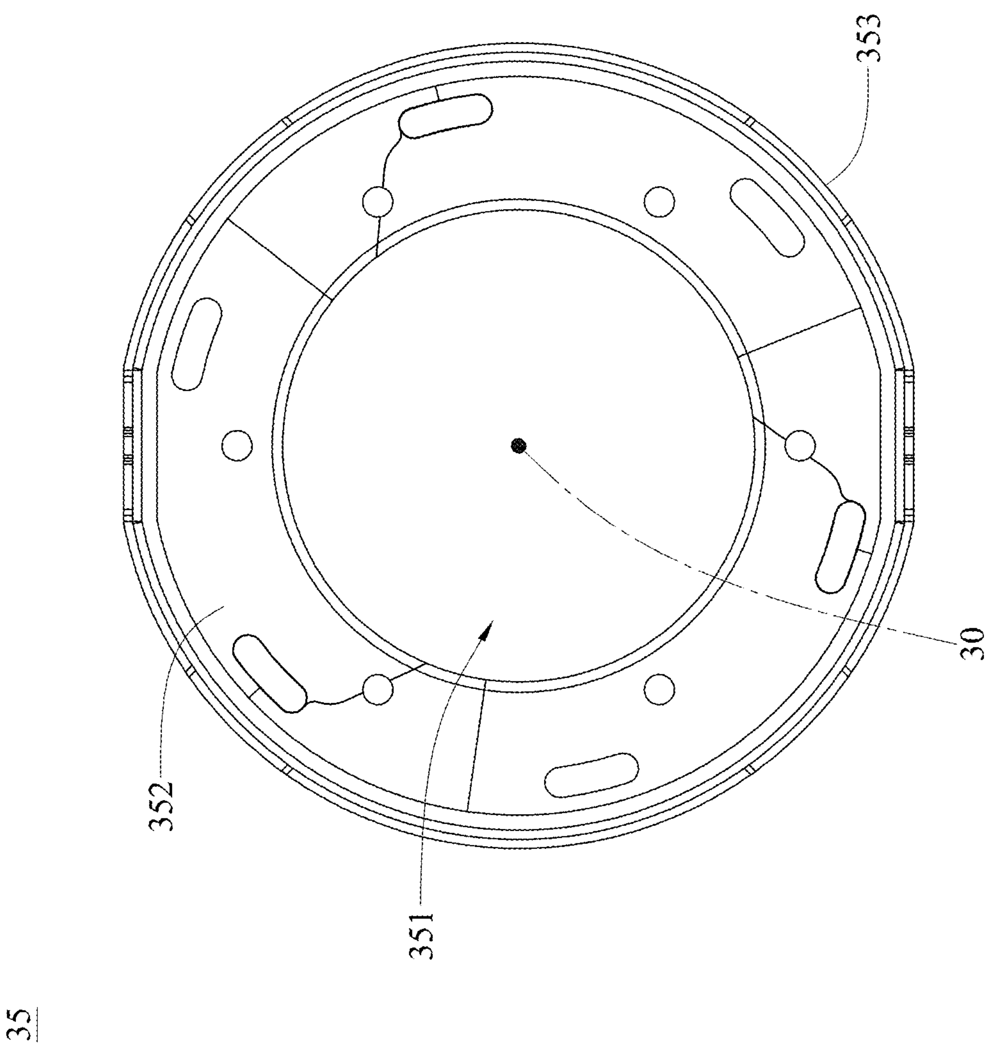
FIG. 17 is a bottom view of the lid element of the light-passable hole module of FIG. 12.
Figure 18:
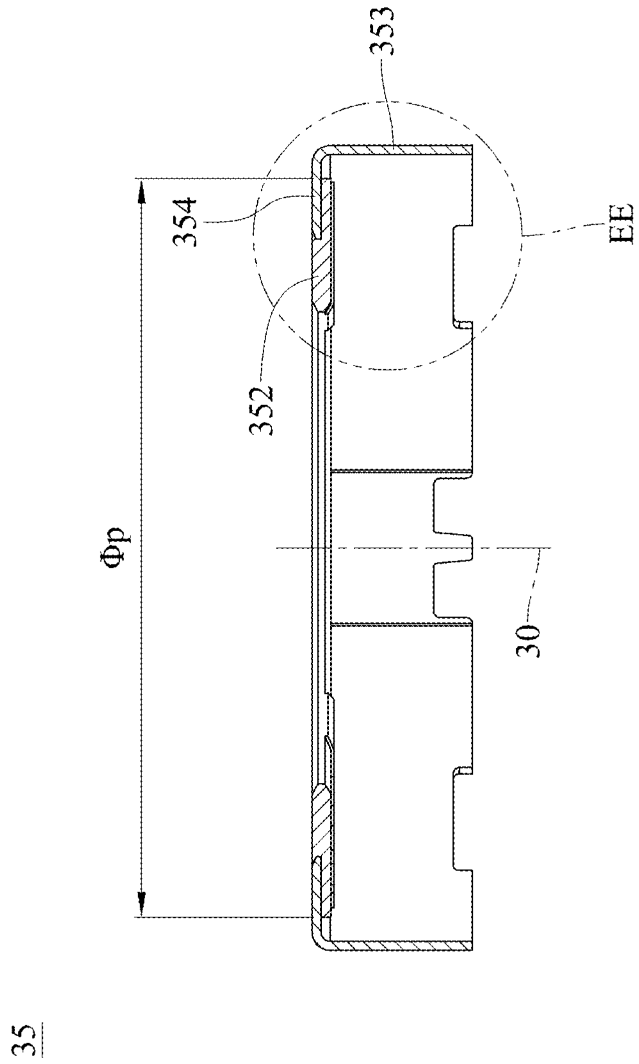
FIG. 18 is a cross-sectional view of the lid element sectioned along line D-D in the light-passable hole module of FIG. 15.
Figure 19:
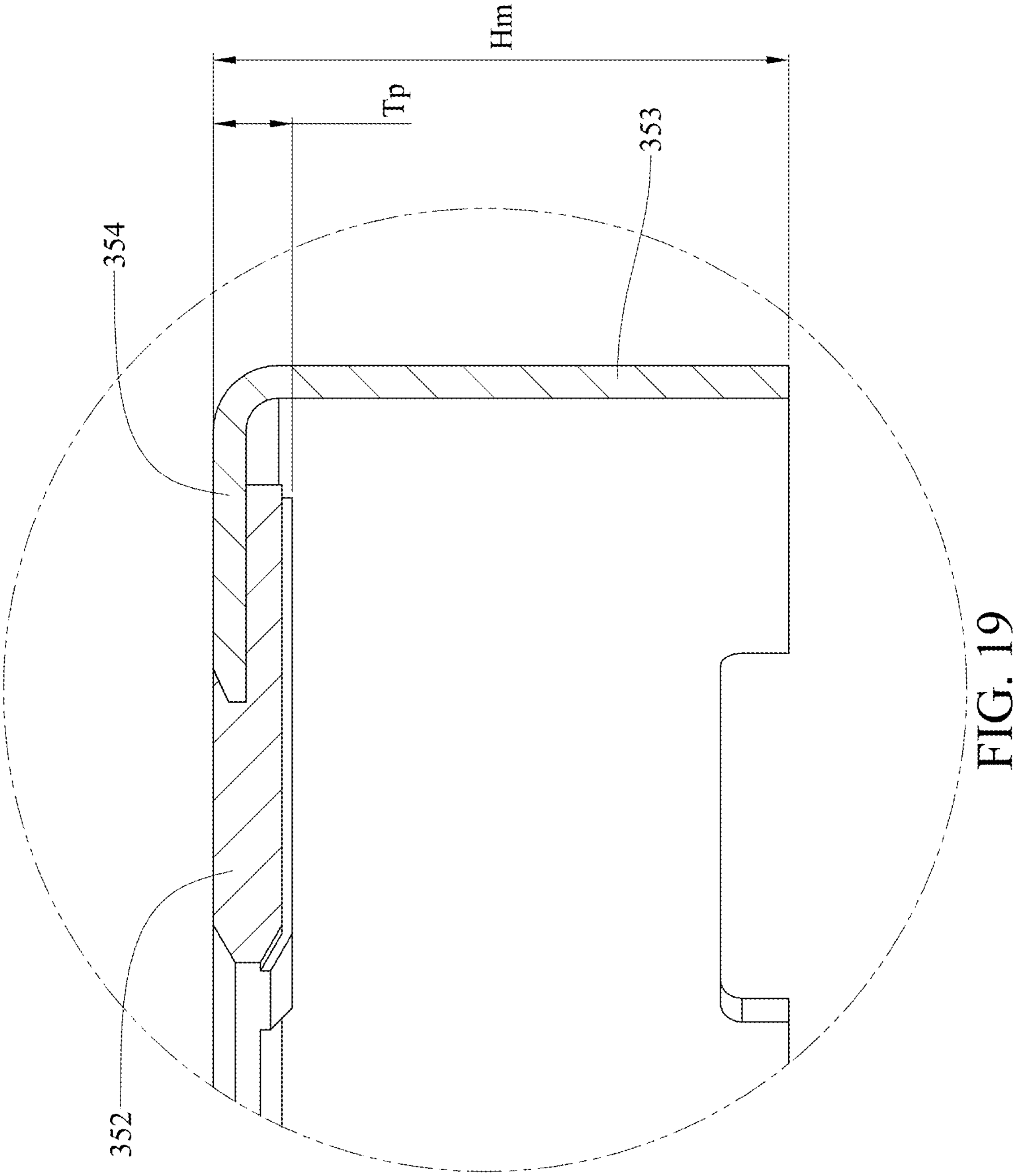
FIG. 19 is an enlarged view of EE region of the lid element of the light-passable hole module of FIG. 18.

Please refer to FIG. 12 to FIG. 19, where FIG. 12 is a perspective view of a light-passable hole module according to the 3rd embodiment of the present disclosure, FIG. 13 is a schematic view showing a lid element being disassembled in the light-passable hole module of FIG. 12, FIG. 14 is another schematic view showing the lid element being disassembled in the light-passable hole module of FIG. 12, FIG. 15 is a top view of the lid element of the light-passable hole module of FIG. 12, FIG. 16 is a side view of the lid element of the light-passable hole module of FIG. 12, FIG. 17 is a bottom view of the lid element of the light-passable hole module of FIG. 12, FIG. 18 is a cross-sectional view of the lid element sectioned along line D-D in the light-passable hole module of FIG. 15, and FIG. 19 is an enlarged view of EE region of the lid element of the light-passable hole module of FIG. 18.

A light-passable hole module 3 provided in this embodiment includes, sequentially along a central axis 30, a base 31, a rotation element 33, a blade assembly 34 and a lid element 35.

The rotation element 33 is rotatable about the central axis 30. It can also be considered that the rotation element 33 is rotatable with respect to the base 31. The rotatable arrangement of the rotation element 33 may, for example, be achieved by guiding of rollable elements, which is similar to that of the rotation element 13 of the 1st embodiment and would not be repeated again.

The blade assembly 34 is located between the rotation element 33 and the lid element 35. The blade assembly 34 has a plurality of blades 340 forming a light-passable hole 341. The light-passable hole 341 has a size variable by taking the central axis 30 as a center.

The lid element 35 covers the blade assembly 34 and is immovable with respect to the base 31. The lid element 35 has a through hole 351 disposed corresponding to the light-passable hole 341.

The lid element 35 is made in one piece. In specific, the lid element 35 includes a plastic surface structure 352, a metal wall structure 353 and a metal surface structure 354. The plastic surface structure 352 is made of plastic material, the metal wall structure 353 and the metal surface structure 354 are made of metal material, and the plastic surface structure 352, the metal wall structure 353 and the metal surface structure 354 are made by insert-molding.

The plastic surface structure 352 extends towards the through hole 351. In this embodiment, the plastic surface structure 352 is disposed in a loop to surround the through hole 351 on both the inner side and the outer side of the light-passable hole module 3, as shown in FIGS. 13, 14, 15 and 17. In this embodiment, the plastic surface structure 352 defines the through hole 351 on both the inner side and the outer side of the light-passable hole module 3, as shown in FIGS. 13, 14, 15 and 17. In this embodiment, the plastic surface structure 352 covers at least part of the metal surface structure 354 on the inner side of the light-passable hole module 3 along a direction parallel to the central axis 30 and exposes at least part of the metal surface structure 354 on the outer side of the light-passable hole module 3 along a direction parallel to the central axis 30, as shown in FIGS. 18 and 19.

The plastic surface structure 352 faces towards one of the plurality of blades 340 and is disposed corresponding to the one blade 340. In this embodiment, the plastic surface structure 352 has a relatively large flat surface facing towards the blades 340. The plastic surface structure 352 is located closer to the blades 340 than the through hole 351 along a direction parallel to the central axis 30 and is disposed in sequence with the blades 340 along a direction parallel to the central axis 30.

The metal wall structure 353 is disposed surrounding the through hole 351 and extends from the plastic surface structure 352 on the inner side of the light-passable hole module 3 along a direction parallel to the central axis 30.

The metal surface structure 354 extends towards the through hole 351 from the metal wall structure 353. It can also be considered that the metal surface structure 354 extends towards the central axis 30 from the metal wall structure 353.

When a thickness of the plastic surface structure 352 along a direction parallel to the central axis 30 is Tp, and a height of the metal wall structure 353 along a direction parallel to the central axis 30 is Hm, the following conditions are satisfied: Tp=0.363 mm; Hm=2.65 mm; and Tp/Hm=0.137, as shown in FIGS. 18 and 19.

When a maximum diameter of the plastic surface structure 352 along a direction perpendicular to the central axis 30 is ϕp, and a maximum diameter of the metal wall structure 353 along a direction perpendicular to the central axis 30 is ϕm, the following conditions are satisfied: ϕp=12.2 mm; ϕm=13.3 mm; and ϕp/ϕm=0.917, as shown in FIGS. 15, 16 and 18.

The operation of the blade assembly 34 is similar to that of the blade assembly 14 of the 1st embodiment, which may, for example, control the size of the light-passable hole 341 through the interaction between the first axial structures, the second axial structures, the first driving holes, the second driving holes, the first recess structures and the second recess structures and therefore would not be repeated again.

4th Embodiment

Figure 20:
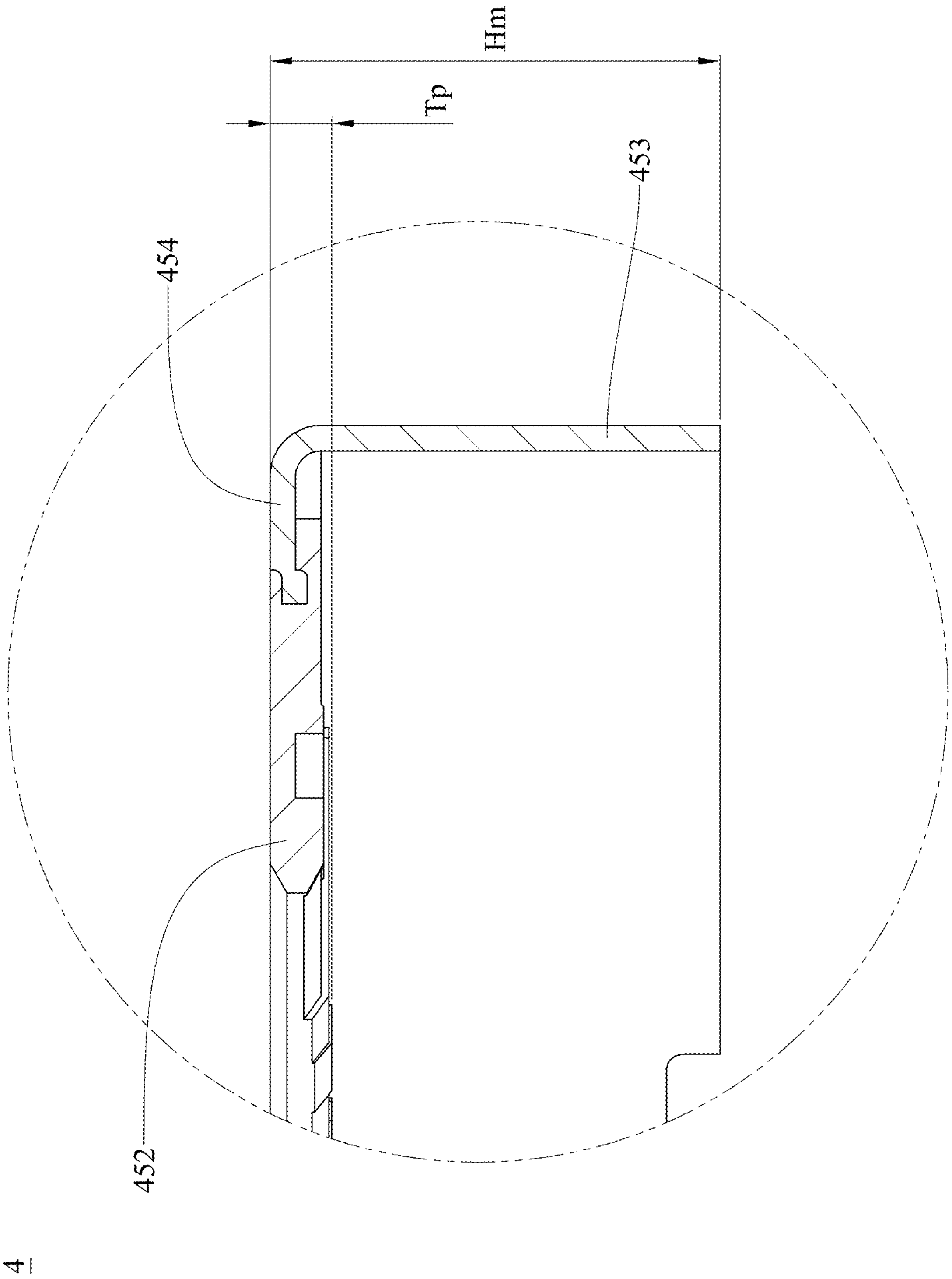
FIG. 20 is an enlarged view of a lid element of a light-passable hole module according to the 4th embodiment of the present disclosure.

Please refer to FIG. 20, which is an enlarged view of a lid element of a light-passable hole module according to the 4th embodiment of the present disclosure. The light-passable hole module 4 provided in this embodiment is similar to the light-passable hole module 3 of the 3rd embodiment, and therefore only differences between this and the 3rd embodiments, as well as necessary illustration, would be described.

In this embodiment, the plastic surface structure 452 covers at least part of the metal surface structure 454 on the inner side of the light-passable hole module 4 along a direction parallel to the central axis and also covers at least part of the metal surface structure 454 on the outer side of the light-passable hole module 4 along a direction parallel to the central axis, as shown in FIG. 20.

When a thickness of the plastic surface structure 452 along a direction parallel to the central axis is Tp, and a height of the metal wall structure 453 along a direction parallel to the central axis is Hm, the following conditions are satisfied: Tp=0.363 mm; Hm=2.65 mm; and Tp/Hm=0.137, as shown in FIG. 20.

5th Embodiment

Figure 21:
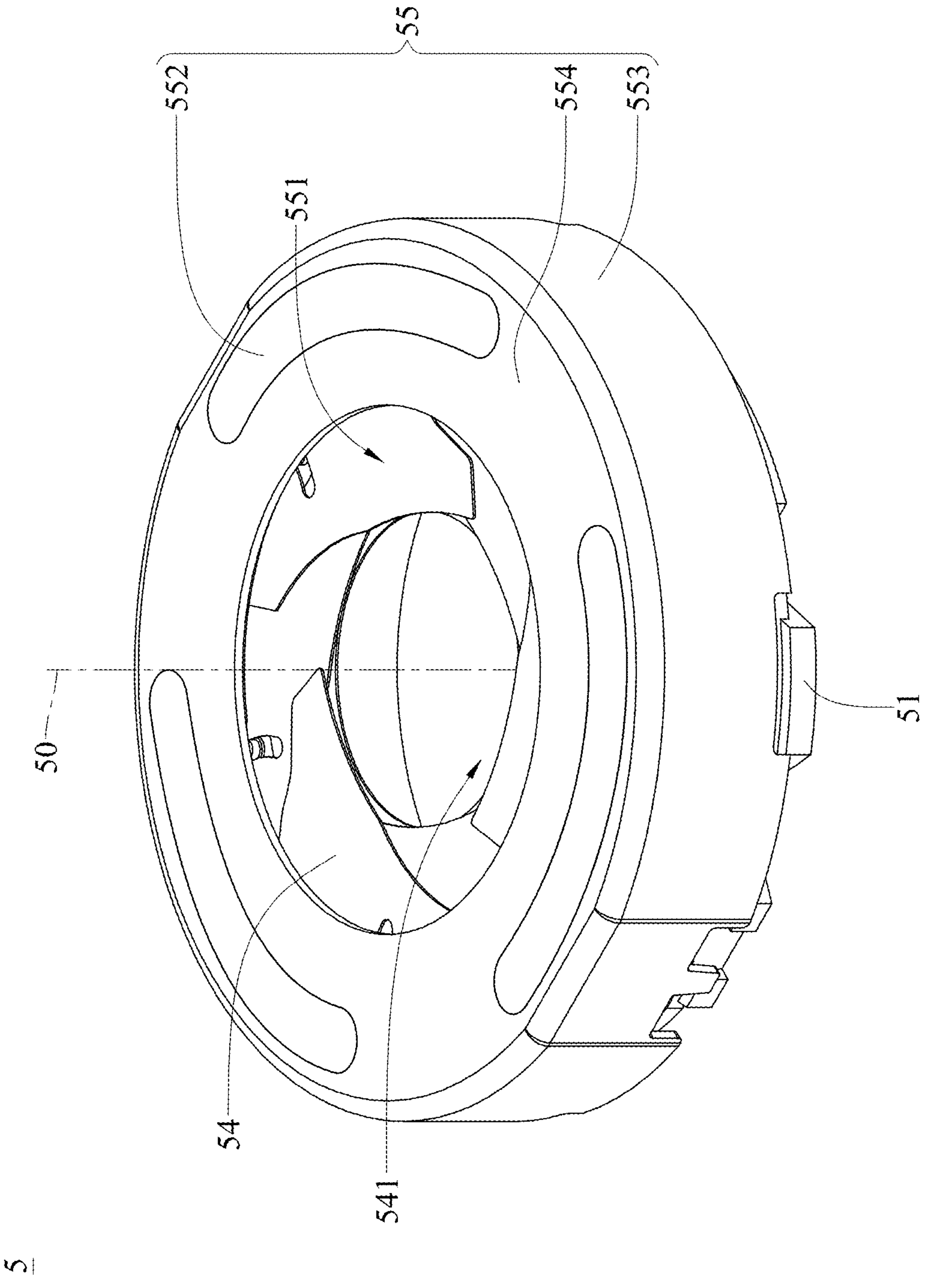
FIG. 21 is a perspective view of a light-passable hole module according to the 5th embodiment of the present disclosure.
Figure 22:
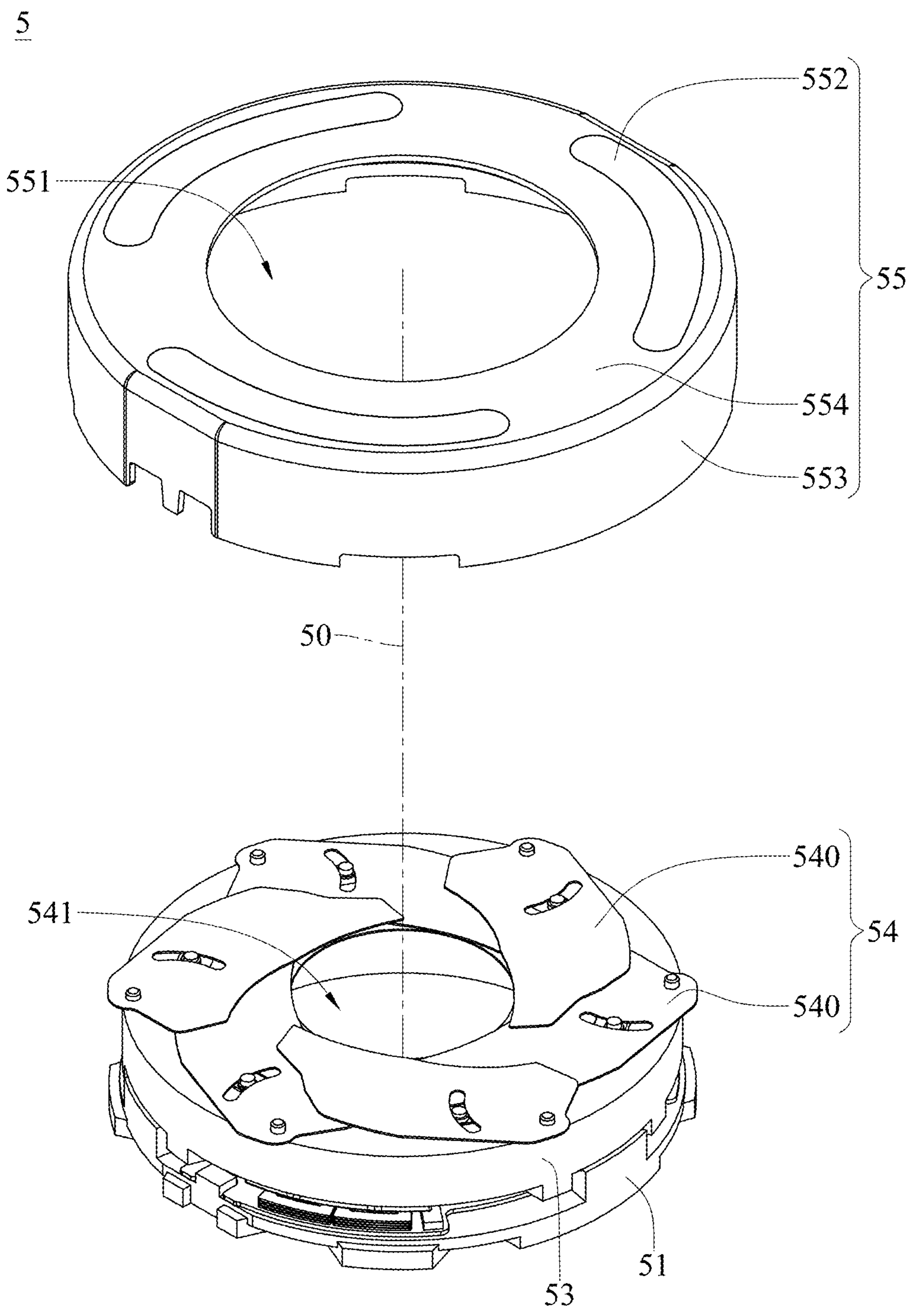
FIG. 22 is a schematic view showing a lid element being disassembled in the light-passable hole module of FIG. 21.
Figure 23:
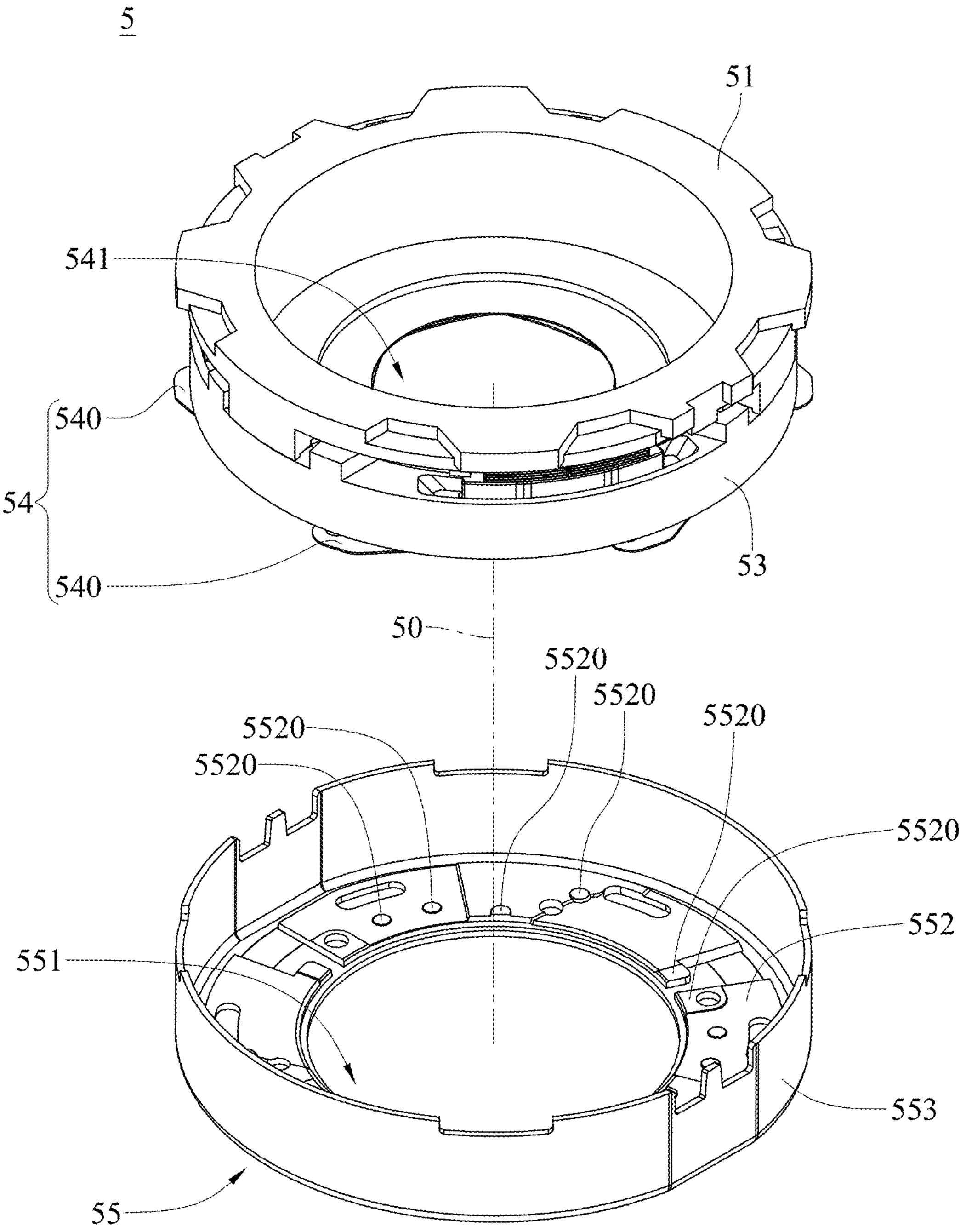
FIG. 23 is another schematic view showing the lid element being disassembled in the light-passable hole module of FIG. 21.
Figure 24:
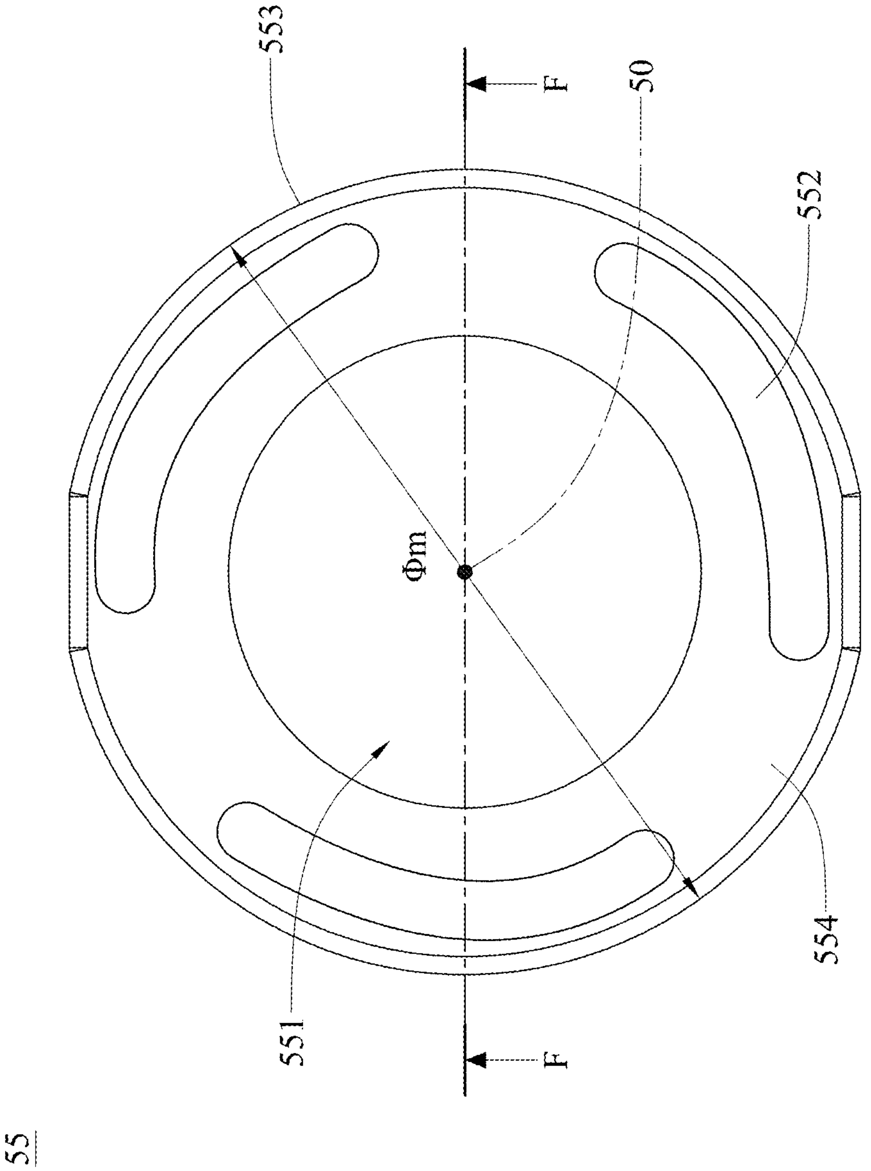
FIG. 24 is a top view of the lid element of the light-passable hole module of FIG. 21.
Figure 25:
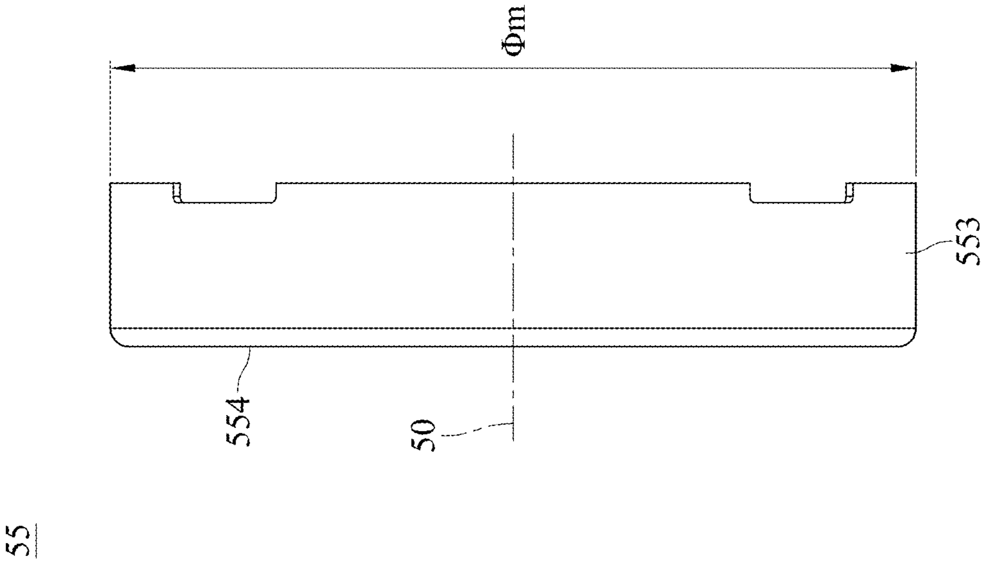
FIG. 25 is a side view of the lid element of the light-passable hole module of FIG. 21.
Figure 26:
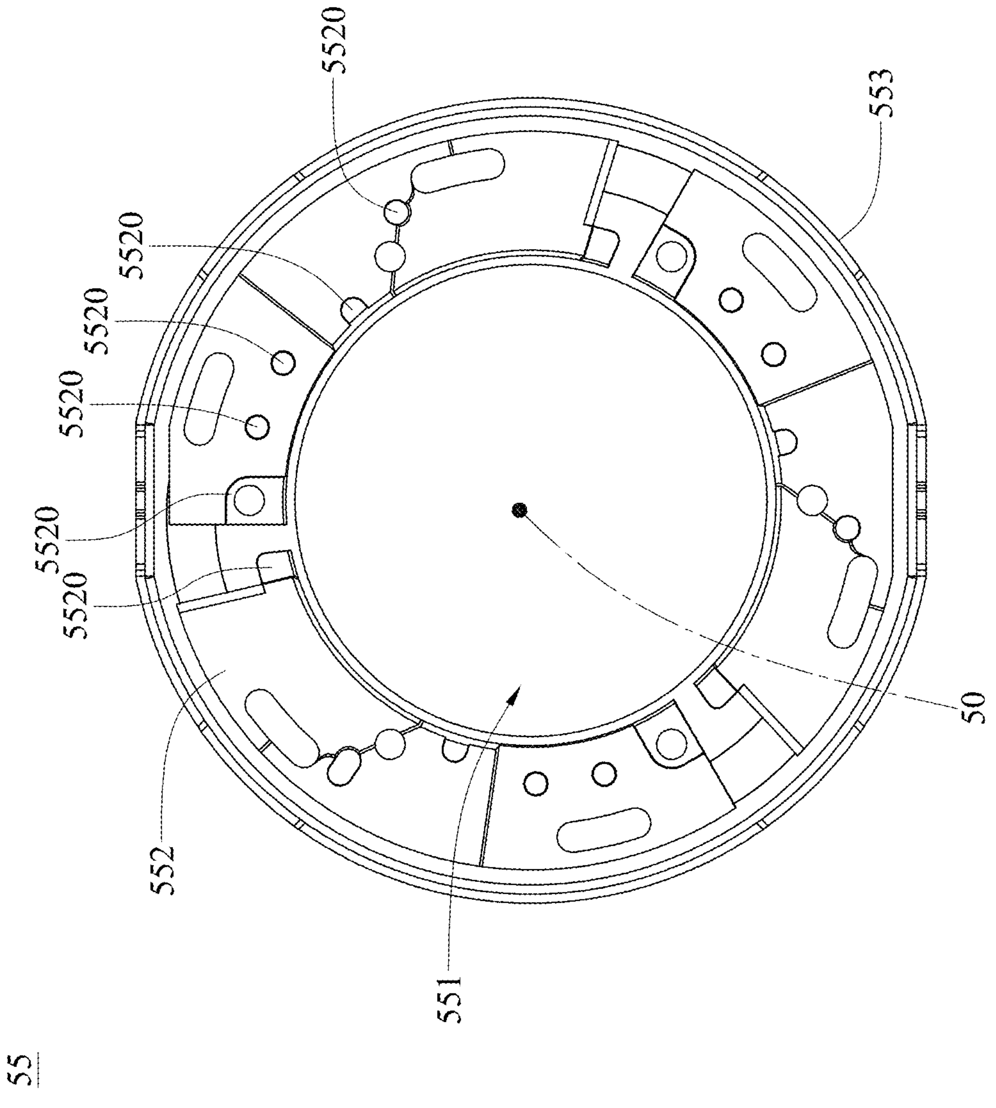
FIG. 26 is a bottom view of the lid element of the light-passable hole module of FIG. 21.
Figure 27:
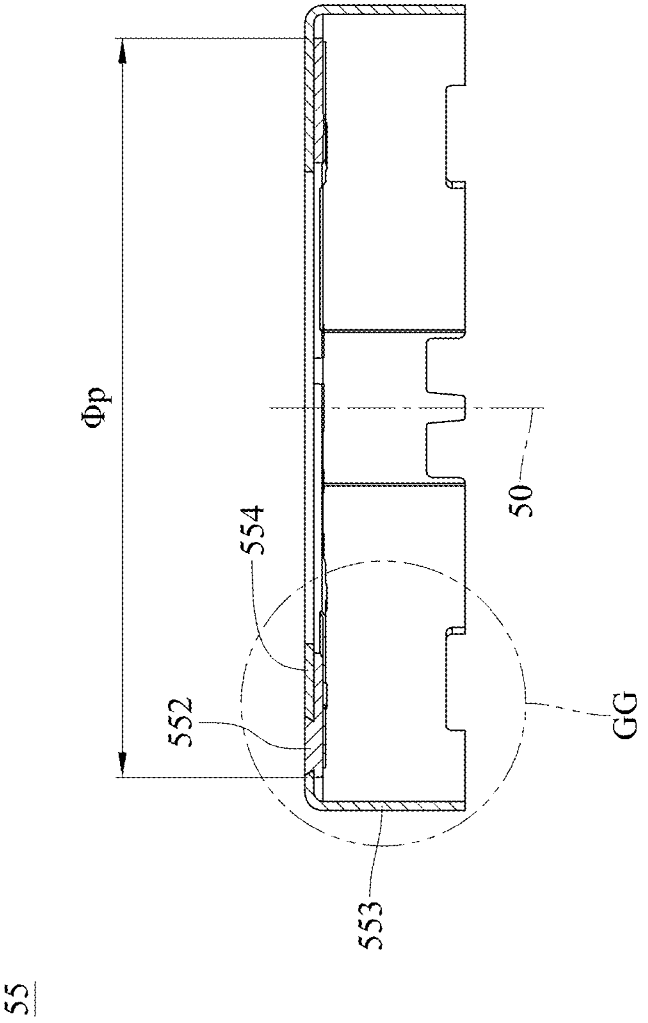
FIG. 27 is a cross-sectional view of the lid element sectioned along line F-F in the light-passable hole module of FIG. 24.
Figure 28:
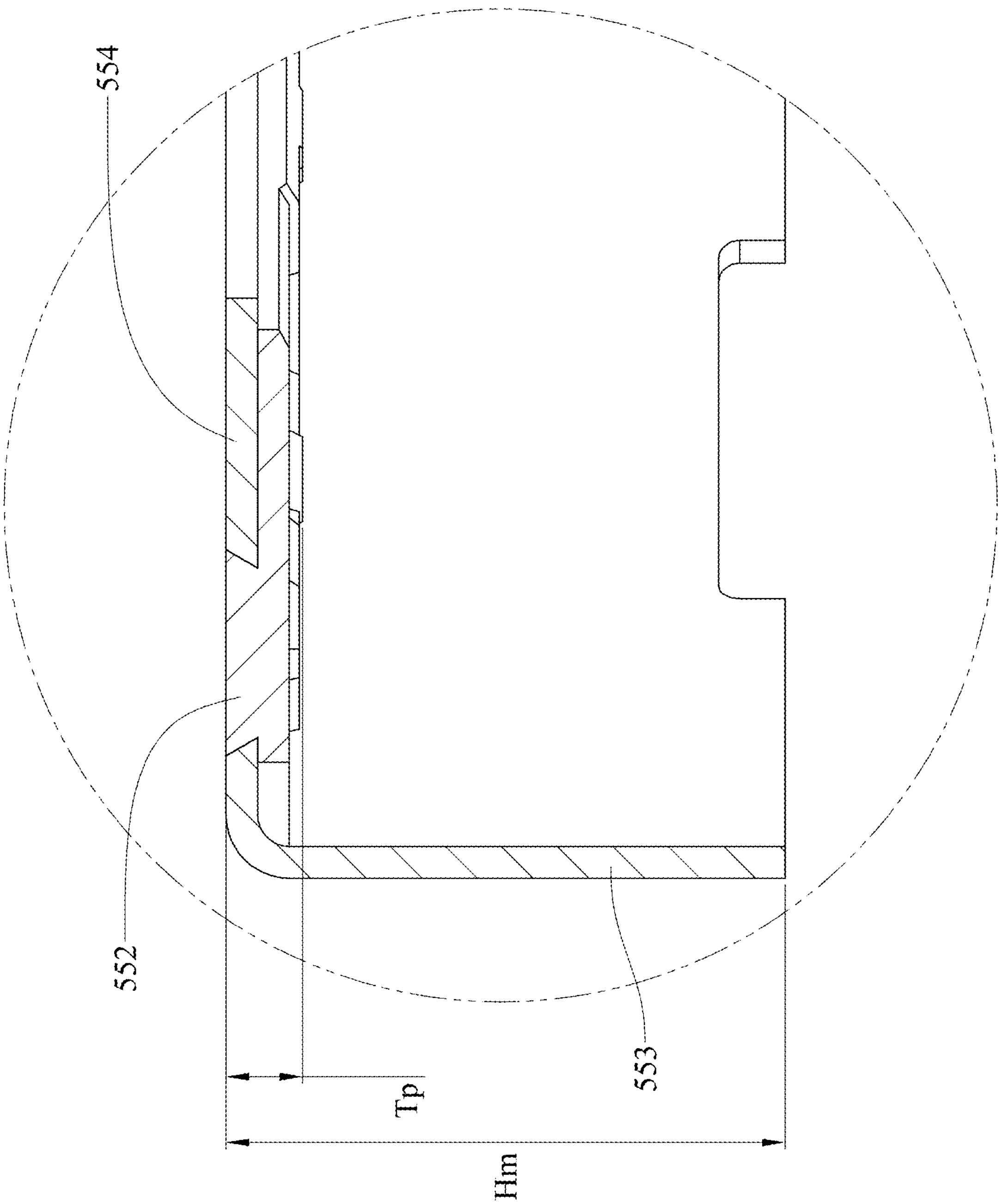
FIG. 28 is an enlarged view of GG region of the lid element of the light-passable hole module of FIG. 27.

Please refer to FIG. 21 to FIG. 28, where FIG. 21 is a perspective view of a light-passable hole module according to the 5th embodiment of the present disclosure, FIG. 22 is a schematic view showing a lid element being disassembled in the light-passable hole module of FIG. 21, FIG. 23 is another schematic view showing the lid element being disassembled in the light-passable hole module of FIG. 21, FIG. 24 is a top view of the lid element of the light-passable hole module of FIG. 21, FIG. 25 is a side view of the lid element of the light-passable hole module of FIG. 21, FIG. 26 is a bottom view of the lid element of the light-passable hole module of FIG. 21, FIG. 27 is a cross-sectional view of the lid element sectioned along line F-F in the light-passable hole module of FIG. 24, and FIG. 28 is an enlarged view of GG region of the lid element of the light-passable hole module of FIG. 27.

A light-passable hole module 5 provided in this embodiment includes, sequentially along a central axis 50, a base 51, a rotation element 53, a blade assembly 54 and a lid element 55.

The rotation element 53 is rotatable about the central axis 50. It can also be considered that the rotation element 53 is rotatable with respect to the base 51. The rotatable arrangement of the rotation element 53 may, for example, be achieved by guiding of rollable elements, which is similar to that of the rotation element 13 of the 1st embodiment and would not be repeated again.

The blade assembly 54 is located between the rotation element 53 and the lid element 55. The blade assembly 54 has a plurality of blades 540 forming a light-passable hole 541. The light-passable hole 541 has a size variable by taking the central axis 50 as a center.

The lid element 55 covers the blade assembly 54 and is immovable with respect to the base 51. The lid element 55 has a through hole 551 disposed corresponding to the light-passable hole 541.

The lid element 55 is made in one piece. In specific, the lid element 55 includes a plastic surface structure 552, a metal wall structure 553 and a metal surface structure 554.

The plastic surface structure 552 is made of plastic material, the metal wall structure 553 and the metal surface structure 554 are made of metal material, and the plastic surface structure 552, the metal wall structure 553 and the metal surface structure 554 are made by insert-molding.

The plastic surface structure 552 extends towards the through hole 551. In this embodiment, the plastic surface structure 552 is periodically disposed surrounding the through hole 551 on the outer side of the light-passable hole module 5, as shown in FIGS. 22 and 24. In this embodiment, the plastic surface structure 552 is disposed in a loop to surround the through hole 551 on the inner side of the light-passable hole module 5, as shown in FIGS. 23 and 26. In this embodiment, the plastic surface structure 552 defines the through hole 551 on the inner side of the light-passable hole module 5, as shown in FIGS. 23 and 26. In this embodiment, the plastic surface structure 552 covers at least part of the metal surface structure 554 on the inner side of the light-passable hole module 5 along a direction parallel to the central axis 50 and exposes at least part of the metal surface structure 554 on the outer side of the light-passable hole module 5 along a direction parallel to the central axis 50, as shown in FIGS. 27 and 28.

The plastic surface structure 552 faces towards one of the plurality of blades 540 and is disposed corresponding to the one blade 540. The plastic surface structure 552 is located closer to the blades 540 than the through hole 551 along a direction parallel to the central axis 50 and is disposed in sequence with the blades 540 along a direction parallel to the central axis 50.

In this embodiment, the plastic surface structure 552 has a plurality of protrusions 5520 facing towards the blades 540, as shown in FIG. 23.

The metal wall structure 553 is disposed surrounding the through hole 551 and extends from the plastic surface structure 552 on the inner side of the light-passable hole module 5 along a direction parallel to the central axis 50.

The metal surface structure 554 extends towards the through hole 551 from the metal wall structure 553. It can also be considered that the metal surface structure 554 extends towards the central axis 50 from the metal wall structure 553. In this embodiment, the metal surface structure 554 defines the through hole 551 on the outer side of the light-passable hole module 5, as shown in FIGS. 22 and 24.

When a thickness of the plastic surface structure 552 along a direction parallel to the central axis 50 is Tp, and a height of the metal wall structure 553 along a direction parallel to the central axis 50 is Hm, the following conditions are satisfied: Tp=0.363 mm; Hm=2.65 mm; and Tp/Hm=0.137, as shown in FIGS. 27 and 28.

When a maximum diameter of the plastic surface structure 552 along a direction perpendicular to the central axis 50 is $\phi$p, and a maximum diameter of the metal wall structure 553 along a direction perpendicular to the central axis 50 is $\phi$m, the following conditions are satisfied: $\phi$p=12.2 mm; $\phi$m=13.3 mm; and $\phi$p/$\phi$m=0.917, as shown in FIGS. 24, 25 and 27.

The operation of the blade assembly 54 is similar to that of the blade assembly 14 of the 1st embodiment, which may, for example, control the size of the light-passable hole 541 through the interaction between the first axial structures, the second axial structures, the first driving holes, the second driving holes, the first recess structures and the second recess structures and therefore would not be repeated again.

6th Embodiment

Figure 29:
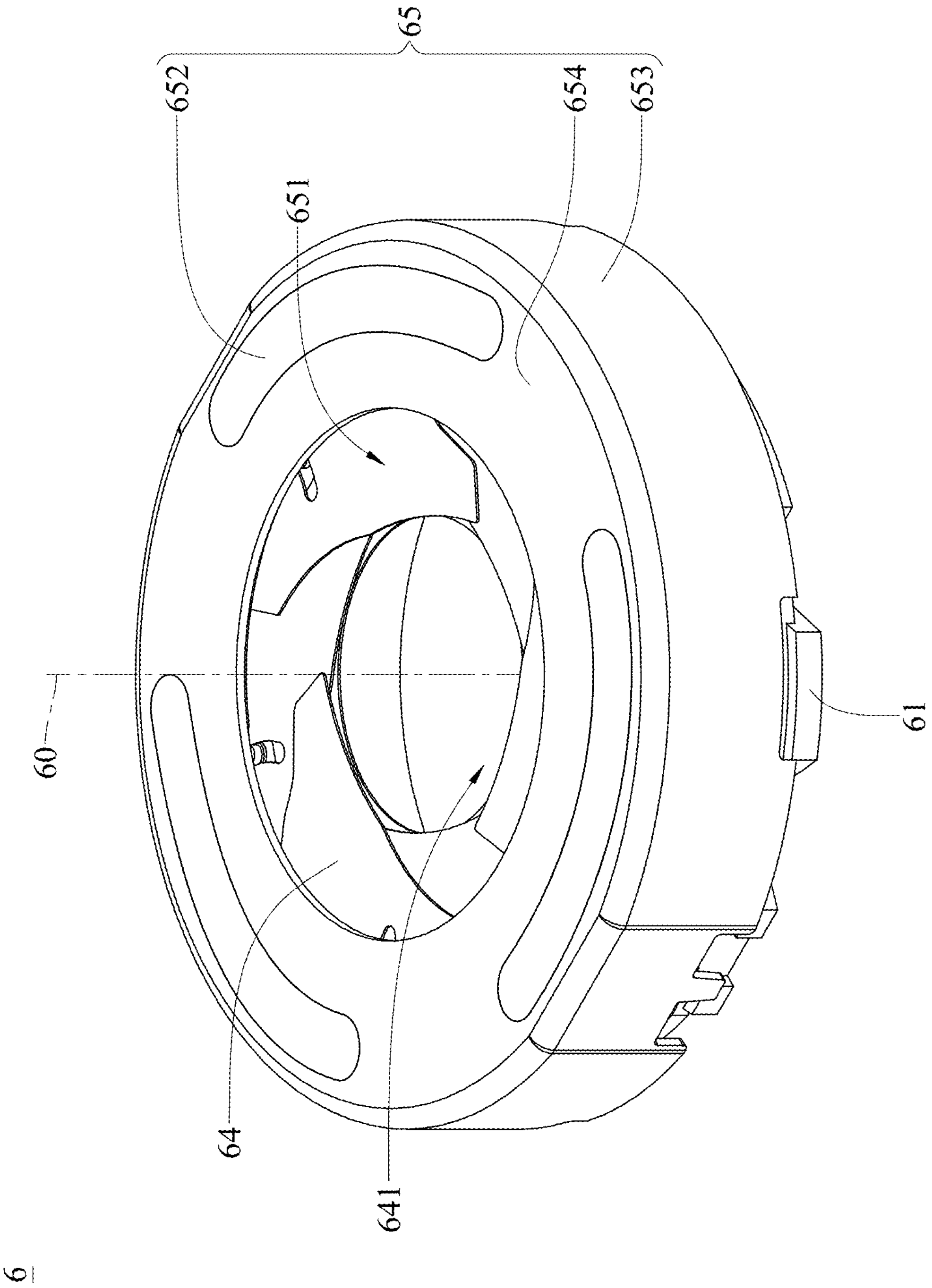
FIG. 29 is a perspective view of a light-passable hole module according to the 6th embodiment of the present disclosure.
Figure 30:
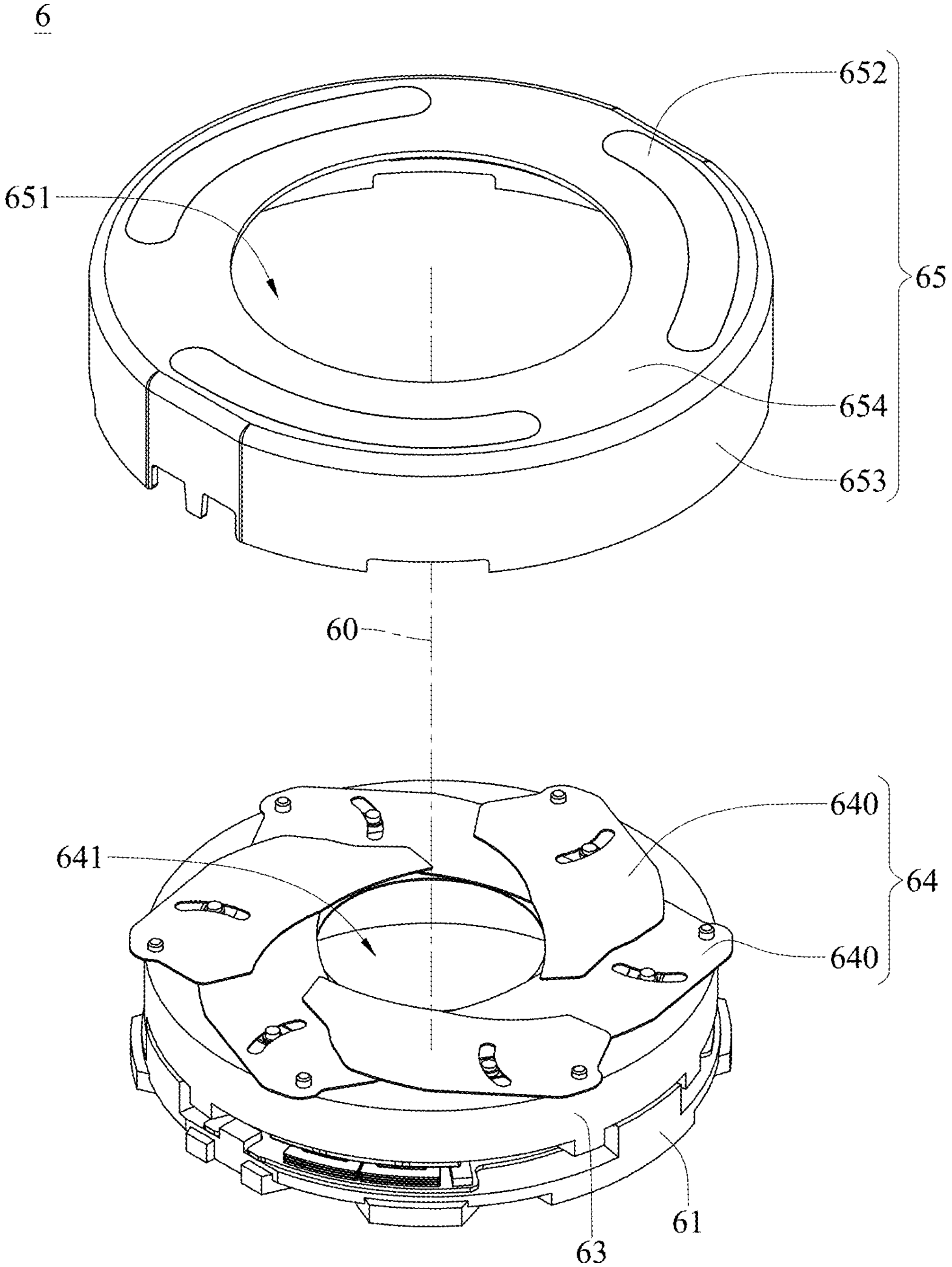
FIG. 30 is a schematic view showing a lid element being disassembled in the light-passable hole module of FIG. 29.
Figure 31:
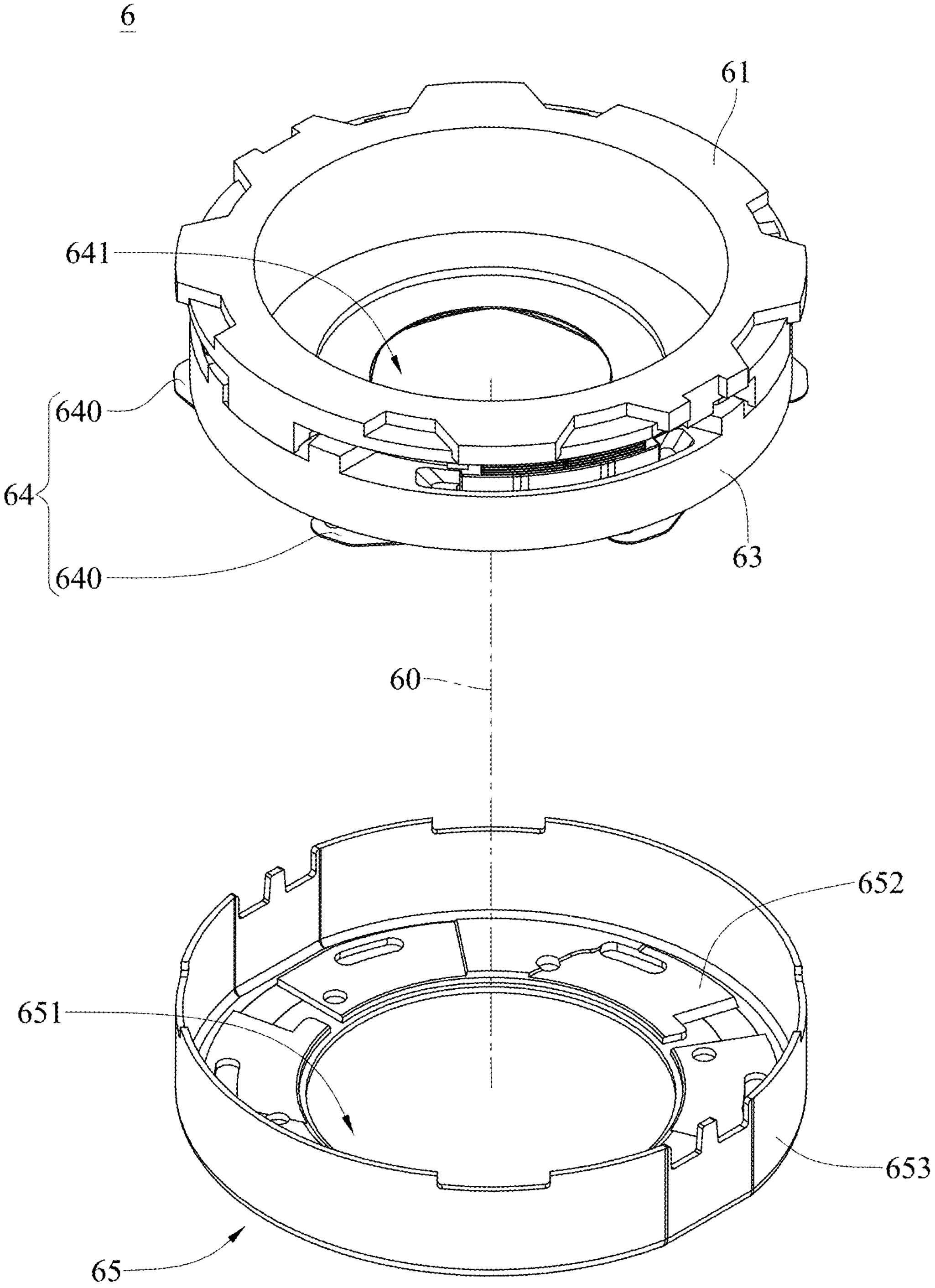
FIG. 31 is another schematic view showing the lid element being disassembled in the light-passable hole module of FIG. 29.
Figure 32:
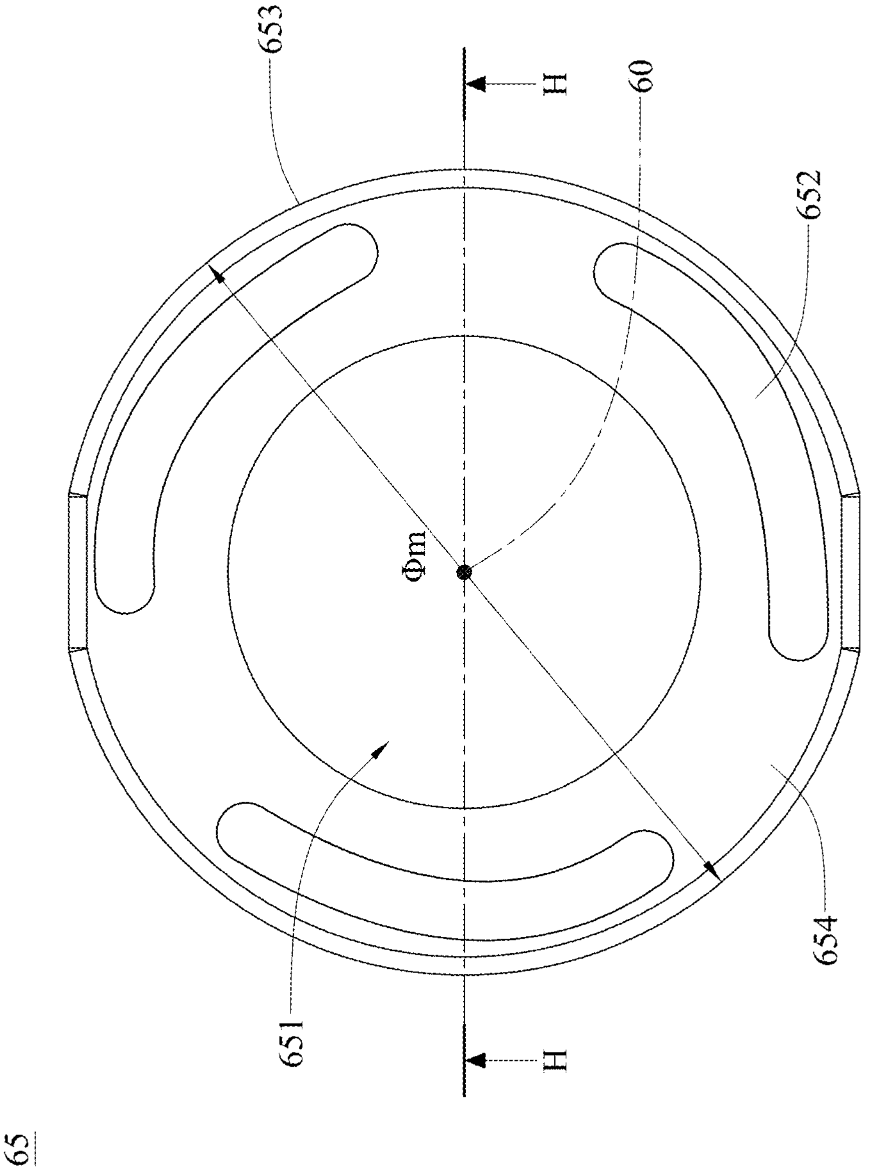
FIG. 32 is a top view of the lid element of the light-passable hole module of FIG. 29.
Figure 33:
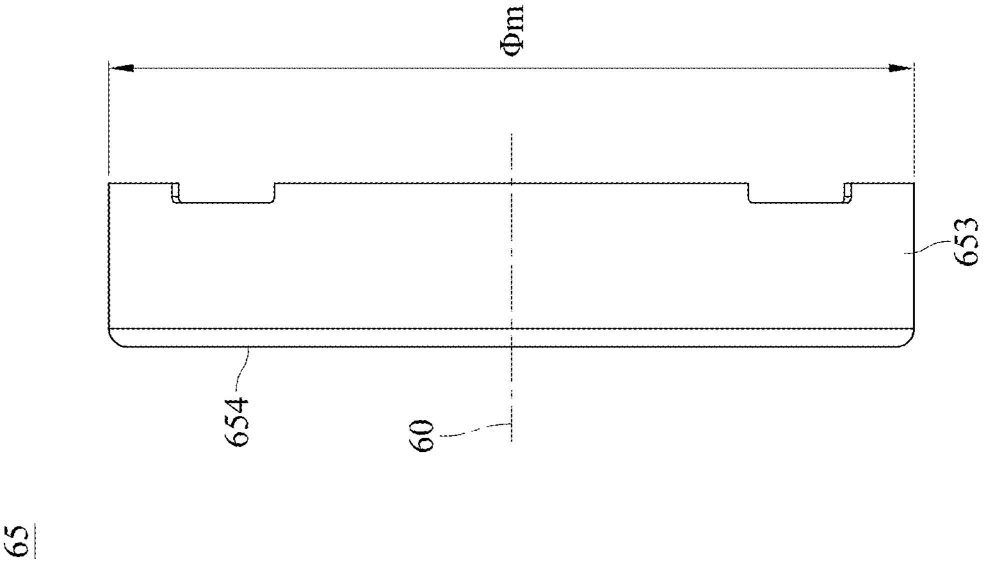
FIG. 33 is a side view of the lid element of the light-passable hole module of FIG. 29.
Figure 34:
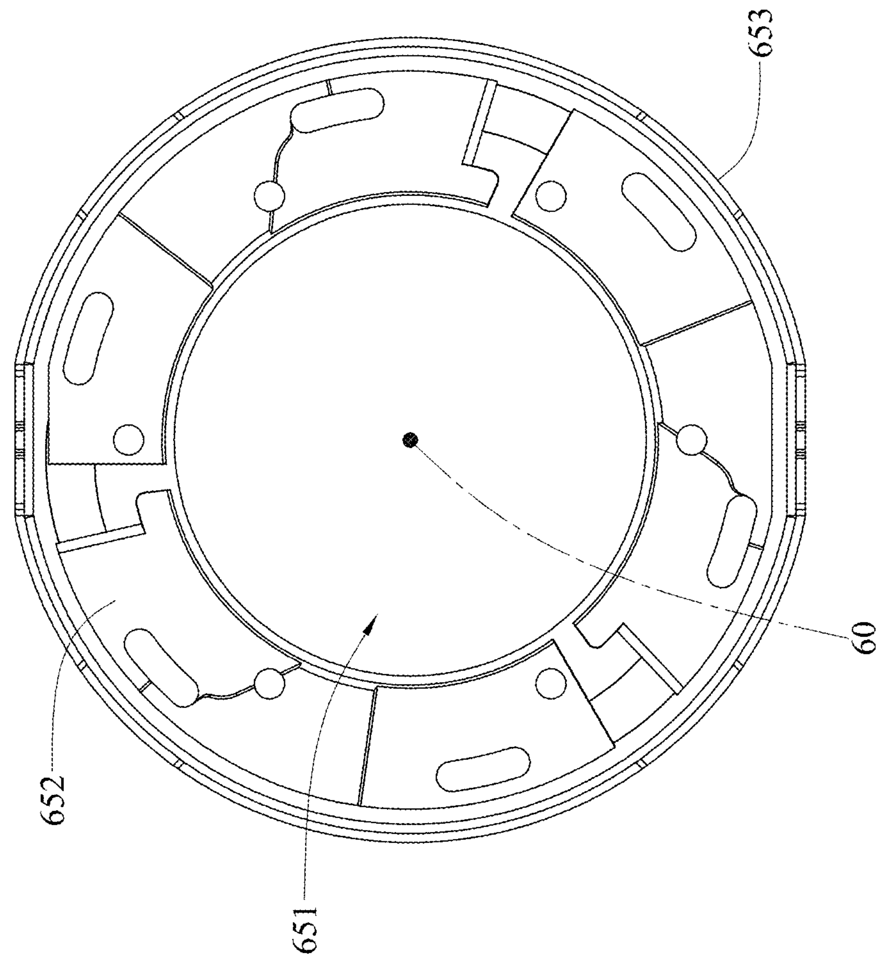
FIG. 34 is a bottom view of the lid element of the light-passable hole module of FIG. 29.
Figure 35:
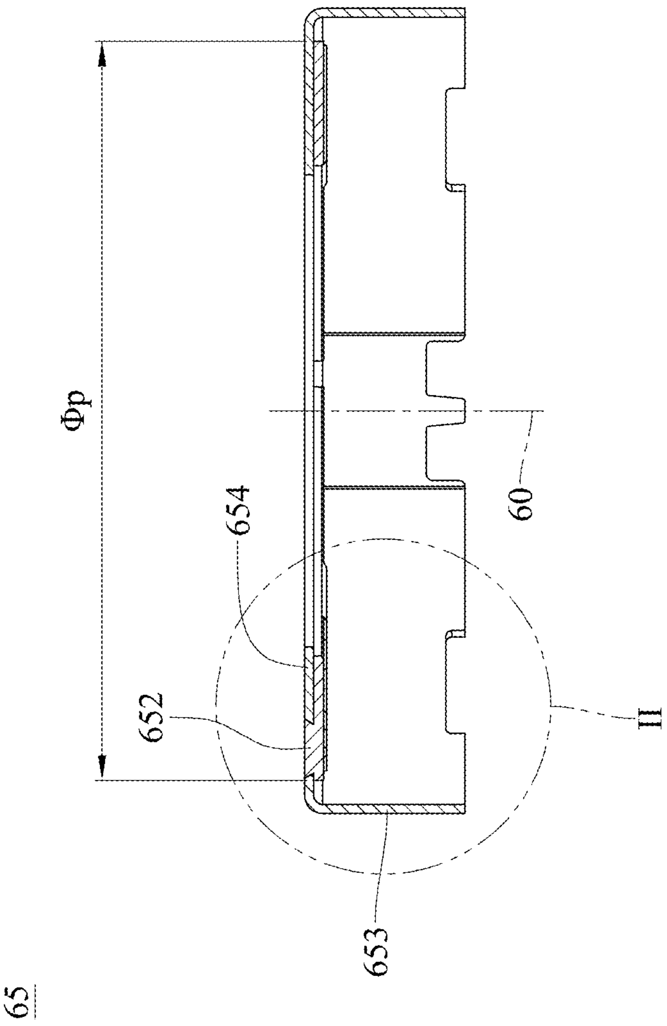
FIG. 35 is a cross-sectional view of the lid element sectioned along line H-H in the light-passable hole module of FIG. 32.
Figure 36:
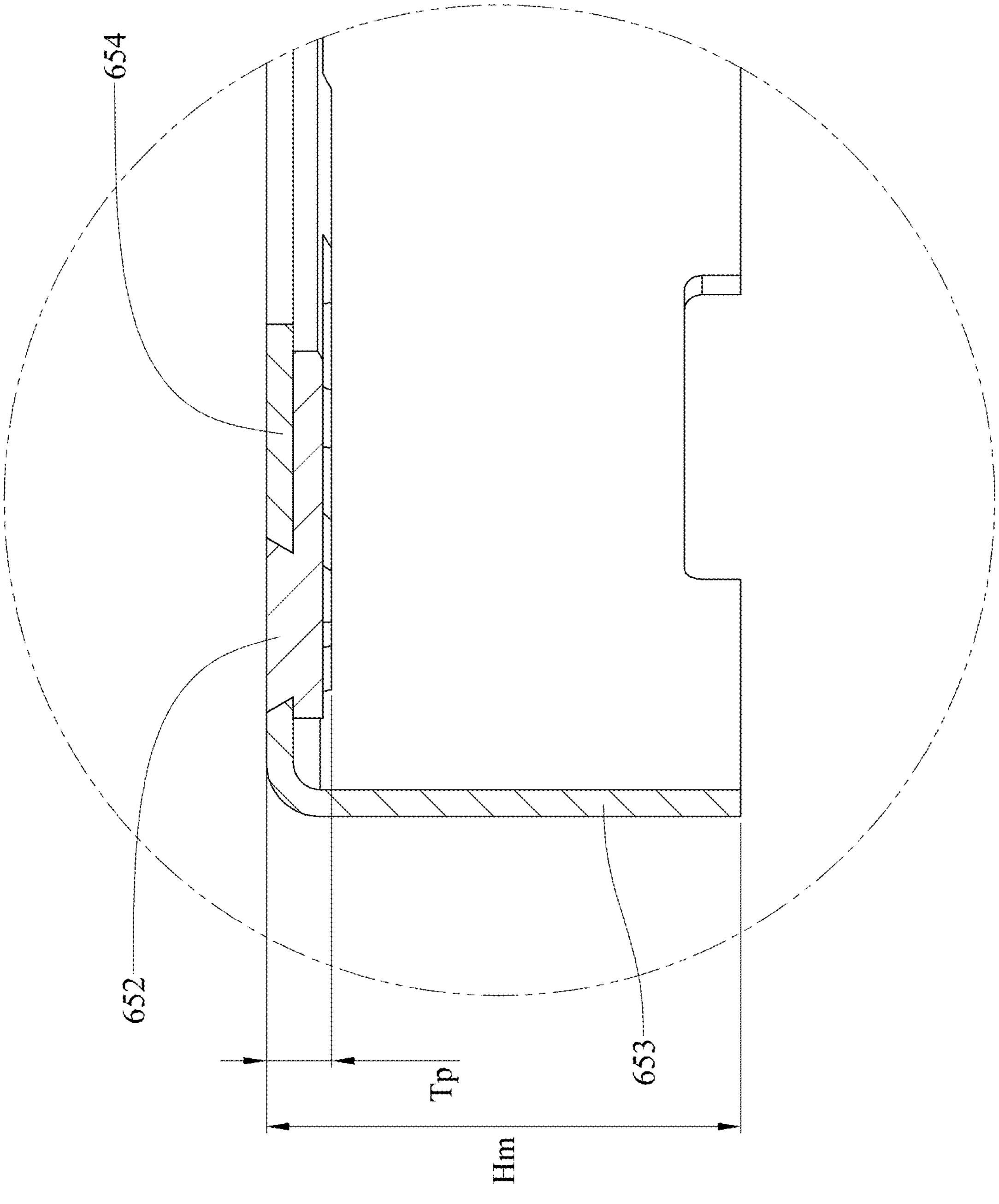
FIG. 36 is an enlarged view of II region of the lid element of the light-passable hole module of FIG. 35.

Please refer to FIG. 29 to FIG. 36, where FIG. 29 is a perspective view of a light-passable hole module according to the 6th embodiment of the present disclosure, FIG. 30 is a schematic view showing a lid element being disassembled in the light-passable hole module of FIG. 29, FIG. 31 is another schematic view showing the lid element being disassembled in the light-passable hole module of FIG. 29, FIG. 32 is a top view of the lid element of the light-passable hole module of FIG. 29, FIG. 33 is a side view of the lid element of the light-passable hole module of FIG. 29, FIG. 34 is a bottom view of the lid element of the light-passable hole module of FIG. 29, FIG. 35 is a cross-sectional view of the lid element sectioned along line H-H in the light-passable hole module of FIG. 32, and FIG. 36 is an enlarged view of II region of the lid element of the light-passable hole module of FIG. 35.

A light-passable hole module 6 provided in this embodiment includes, sequentially along a central axis 60, a base 61, a rotation element 63, a blade assembly 64 and a lid element 65.

The rotation element 63 is rotatable about the central axis 60. It can also be considered that the rotation element 63 is rotatable with respect to the base 61. The rotatable arrangement of the rotation element 63 may, for example, be achieved by guiding of rollable elements, which is similar to that of the rotation element 13 of the 1st embodiment and would not be repeated again.

The blade assembly 64 is located between the rotation element 63 and the lid element 65. The blade assembly 64 has a plurality of blades 640 forming a light-passable hole 641. The light-passable hole 641 has a size variable by taking the central axis 60 as a center.

The lid element 65 covers the blade assembly 64 and is immovable with respect to the base 61. The lid element 65 has a through hole 651 disposed corresponding to the light-passable hole 641.

The lid element 65 is made in one piece. In specific, the lid element 65 includes a plastic surface structure 652, a metal wall structure 653 and a metal surface structure 654. The plastic surface structure 652 is made of plastic material, the metal wall structure 653 and the metal surface structure 654 are made of metal material, and the plastic surface structure 652, the metal wall structure 653 and the metal surface structure 654 are made by insert-molding.

The plastic surface structure 652 extends towards the through hole 651. In this embodiment, the plastic surface structure 652 is periodically disposed surrounding the through hole 651 on the outer side of the light-passable hole module 6, as shown in FIGS. 30 and 32. In this embodiment, the plastic surface structure 652 is disposed in a loop to surround the through hole 651 on the inner side of the light-passable hole module 6, as shown in FIGS. 31 and 34. In this embodiment, the plastic surface structure 652 defines the through hole 651 on the inner side of the light-passable hole module 6, as shown in FIGS. 31 and 34. In this embodiment, the plastic surface structure 652 covers at least part of the metal surface structure 654 on the inner side of the light-passable hole module 6 along a direction parallel to the central axis 60 and exposes at least part of the metal surface structure 654 on the outer side of the light-passable hole module 6 along a direction parallel to the central axis 60, as shown in FIGS. 35 and 36.

The plastic surface structure 652 faces towards one of the plurality of blades 640 and is disposed corresponding to the one blade 640. In this embodiment, the plastic surface structure 652 is designed to have a relatively large area for facing towards the blades 640. The plastic surface structure 652 is located closer to the blades 640 than the through hole 651 along a direction parallel to the central axis 60 and is disposed in sequence with the blades 640 along a direction parallel to the central axis 60.

The metal wall structure 653 is disposed surrounding the through hole 651 and extends from the plastic surface structure 652 on the inner side of the light-passable hole module 6 along a direction parallel to the central axis 60.

The metal surface structure 654 extends towards the through hole 651 from the metal wall structure 653. It can also be considered that the metal surface structure 654 extends towards the central axis 60 from the metal wall structure 653. In this embodiment, the metal surface structure 654 defines the through hole 651 on the outer side of the light-passable hole module 6, as shown in FIGS. 30 and 32.

When a thickness of the plastic surface structure 652 along a direction parallel to the central axis 60 is Tp, and a height of the metal wall structure 653 along a direction parallel to the central axis 60 is Hm, the following conditions are satisfied: Tp=0.363 mm; Hm=2.65 mm; and Tp/Hm=0.137, as shown in FIGS. 35 and 36.

When a maximum diameter of the plastic surface structure 652 along a direction perpendicular to the central axis 60 is ϕp, and a maximum diameter of the metal wall structure 653 along a direction perpendicular to the central axis 60 is ϕm, the following conditions are satisfied: ϕp=12.2 mm; ϕm=13.3 mm; and ϕp/ϕm=0.917, as shown in FIGS. 32, 33 and 35.

The operation of the blade assembly 64 is similar to that of the blade assembly 14 of the 1st embodiment, which may, for example, control the size of the light-passable hole 641 through the interaction between the first axial structures, the second axial structures, the first driving holes, the second driving holes, the first recess structures and the second recess structures and therefore would not be repeated again.

7th Embodiment

Figure 37:
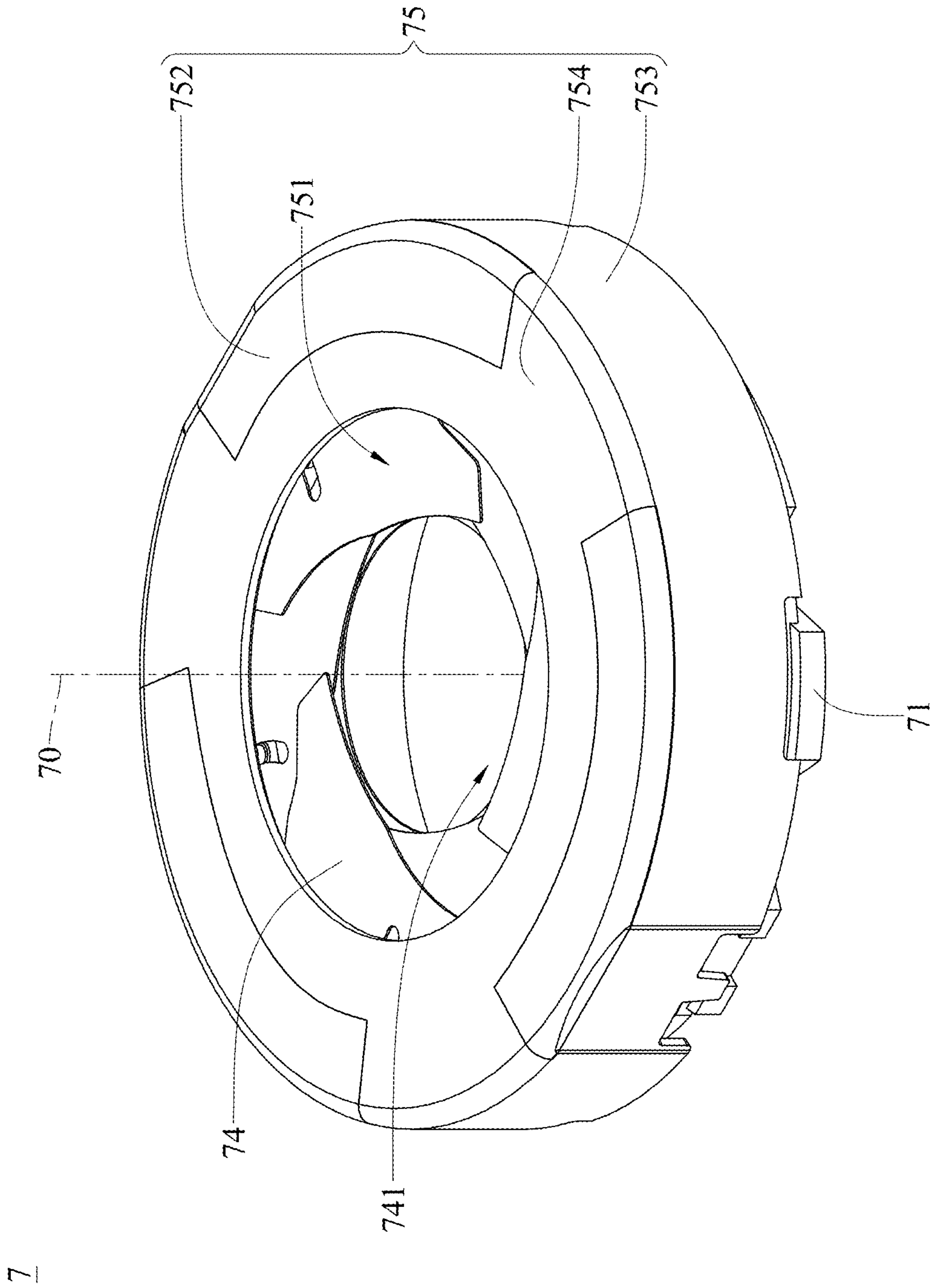
FIG. 37 is a perspective view of a light-passable hole module according to the 7th embodiment of the present disclosure.
Figure 38:
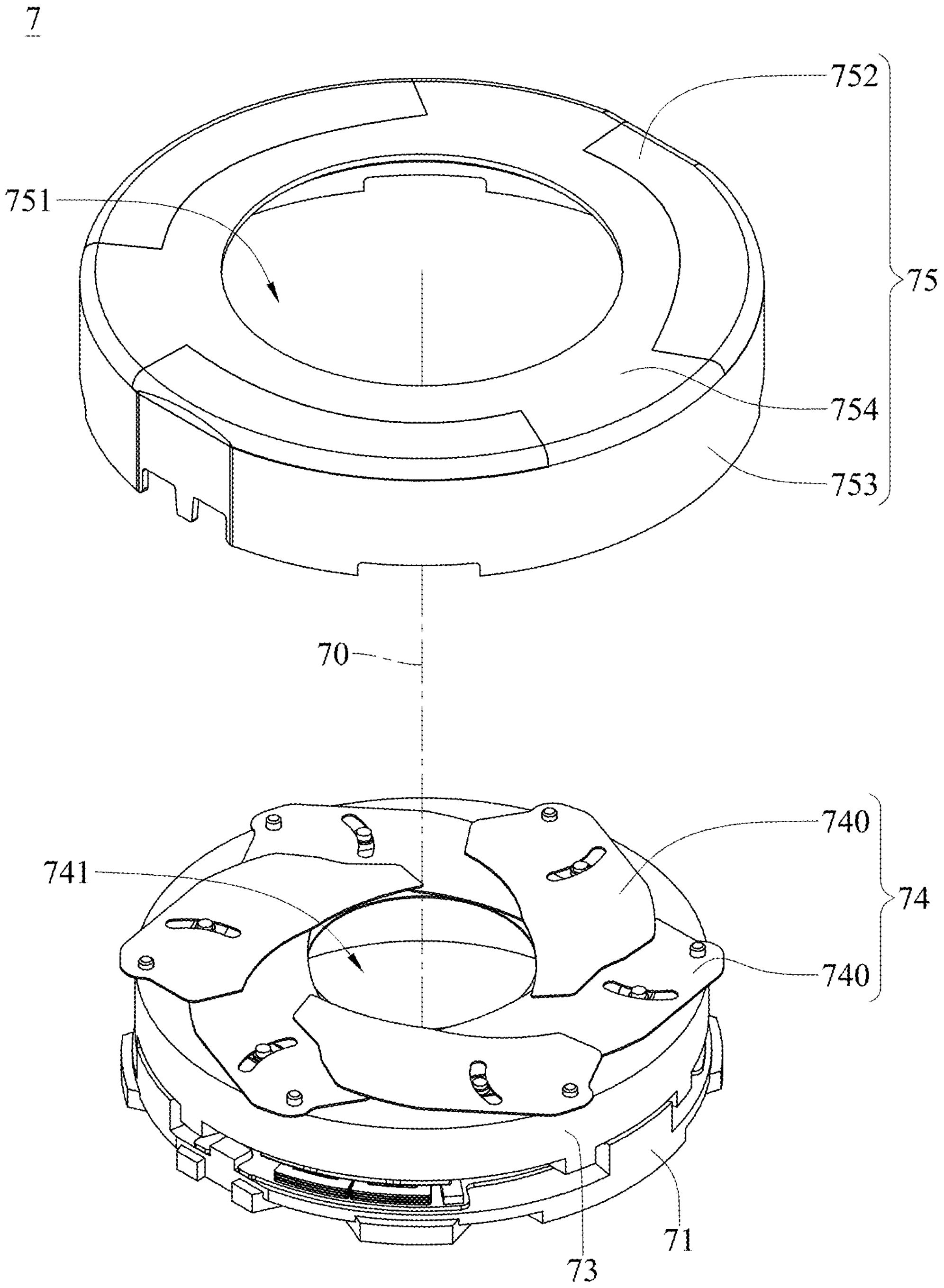
FIG. 38 is a schematic view showing a lid element being disassembled in the light-passable hole module of FIG. 37.
Figure 39:
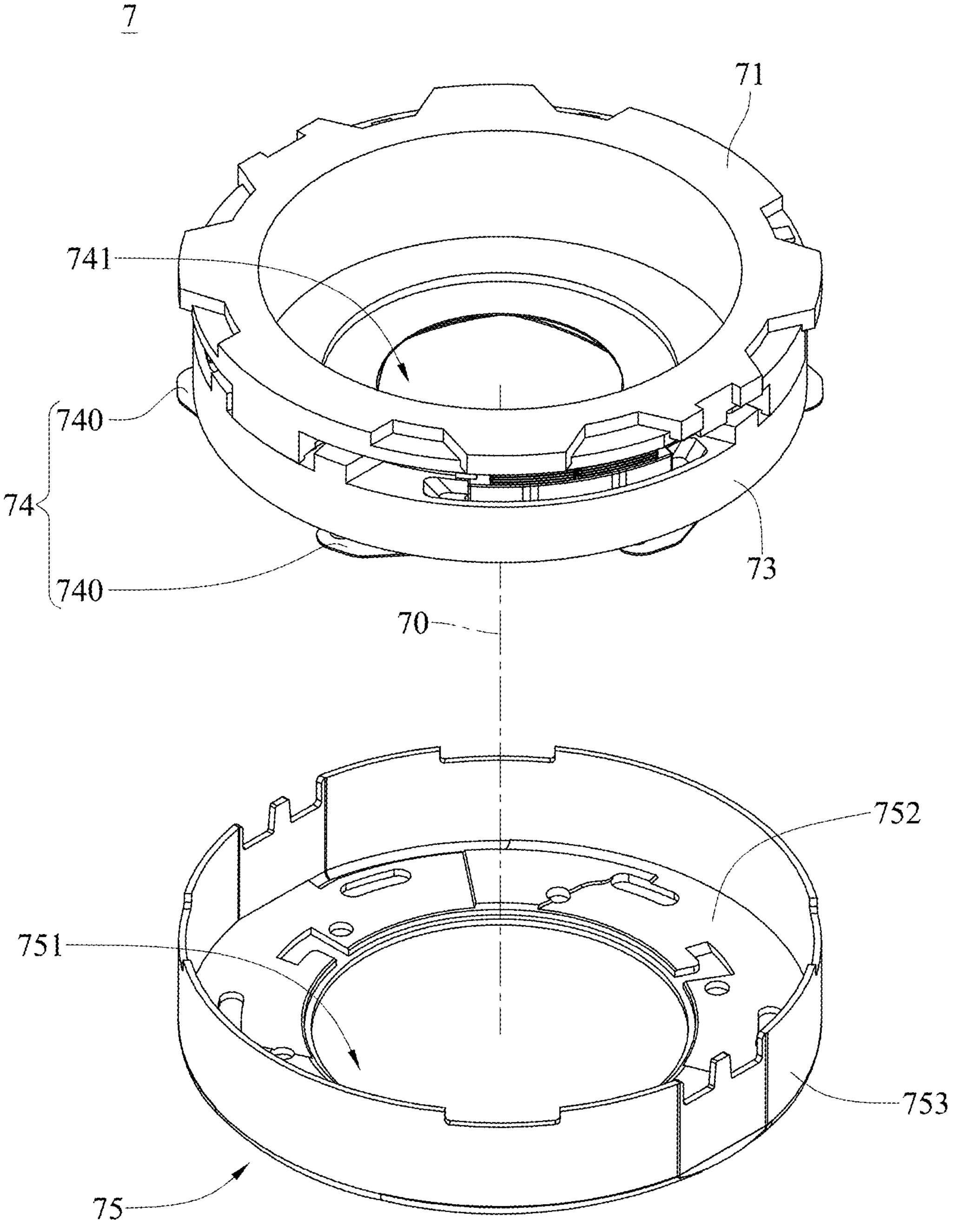
FIG. 39 is another schematic view showing the lid element being disassembled in the light-passable hole module of FIG. 37.
Figure 40:
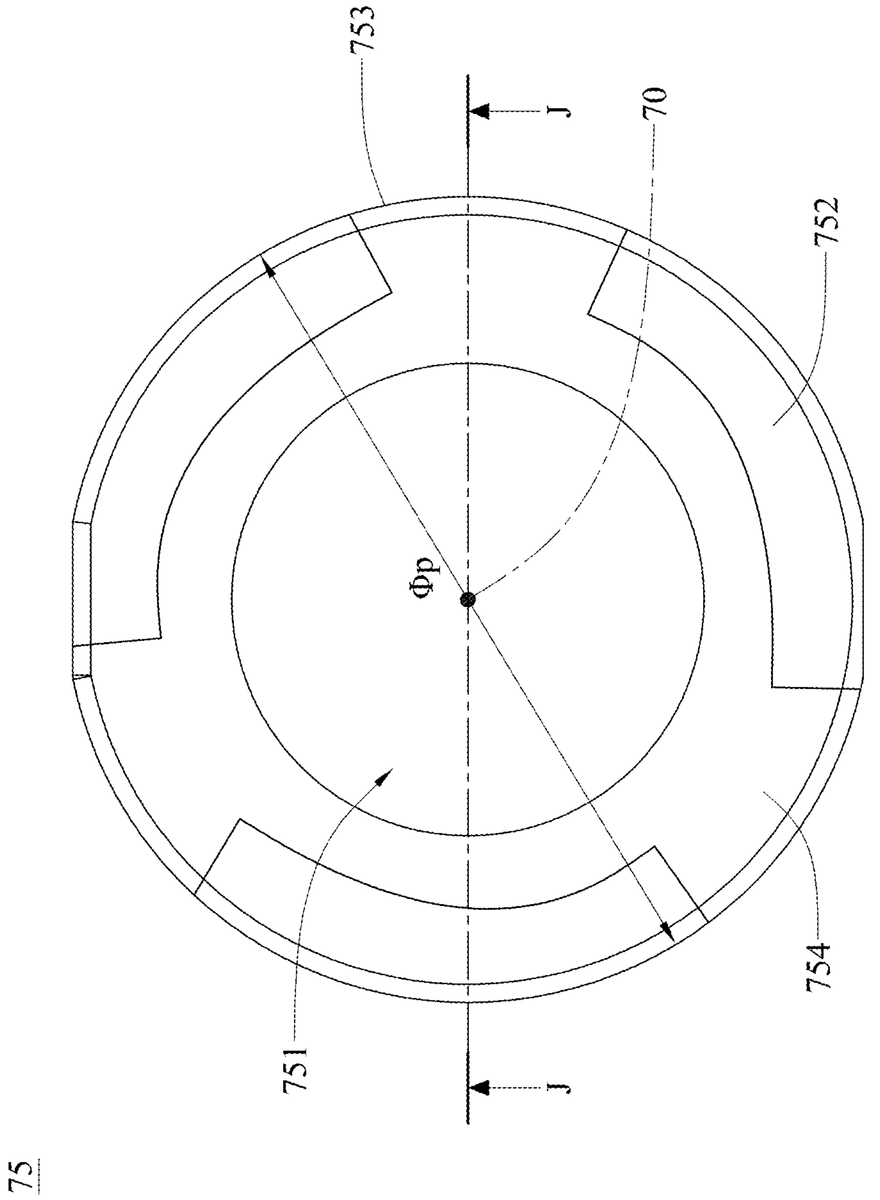
FIG. 40 is a top view of the lid element of the light-passable hole module of FIG. 37.
Figure 41:
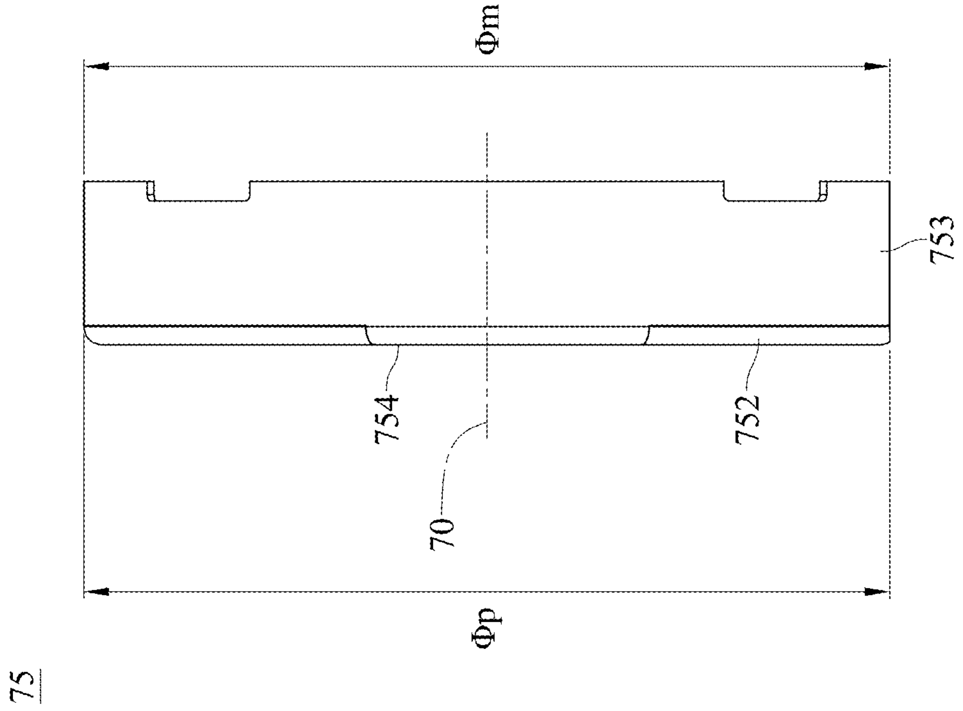
FIG. 41 is a side view of the lid element of the light-passable hole module of FIG. 37.
Figure 42:
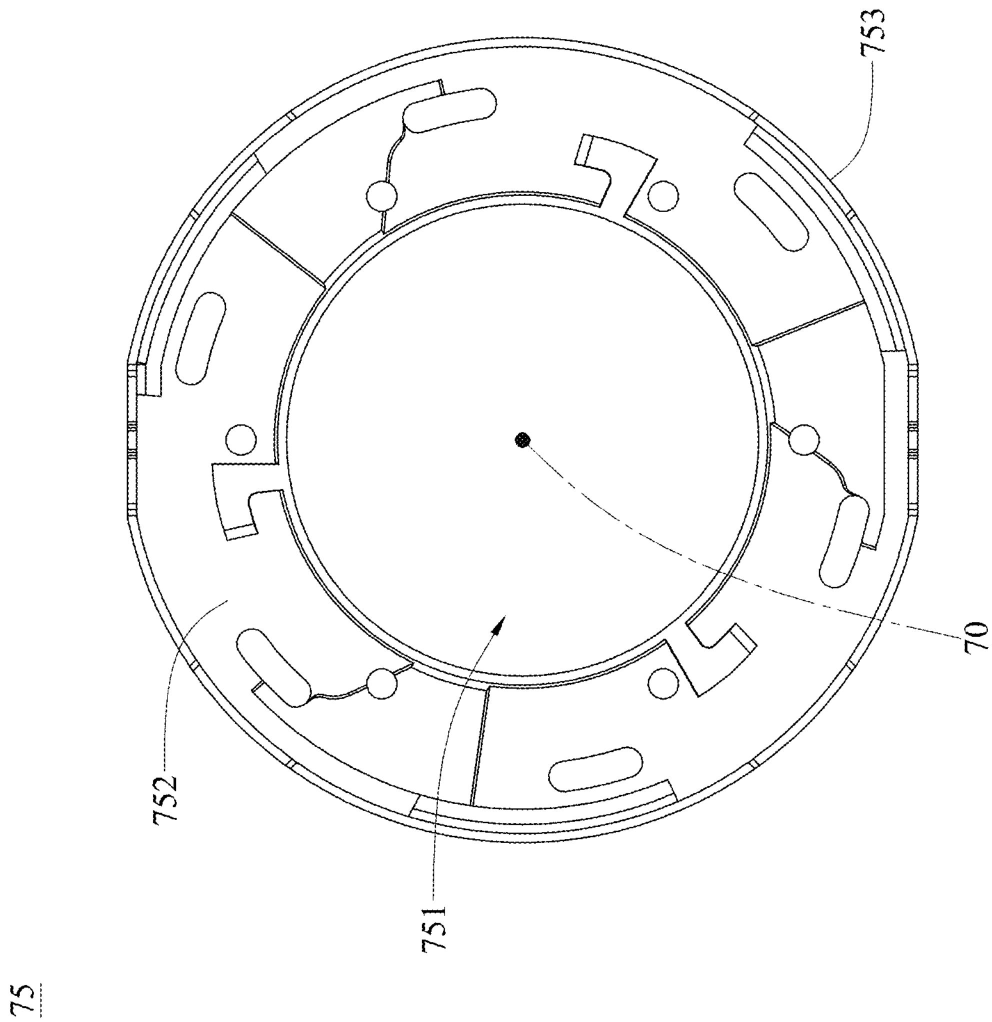
FIG. 42 is a bottom view of the lid element of the light-passable hole module of FIG. 37.
Figure 43:
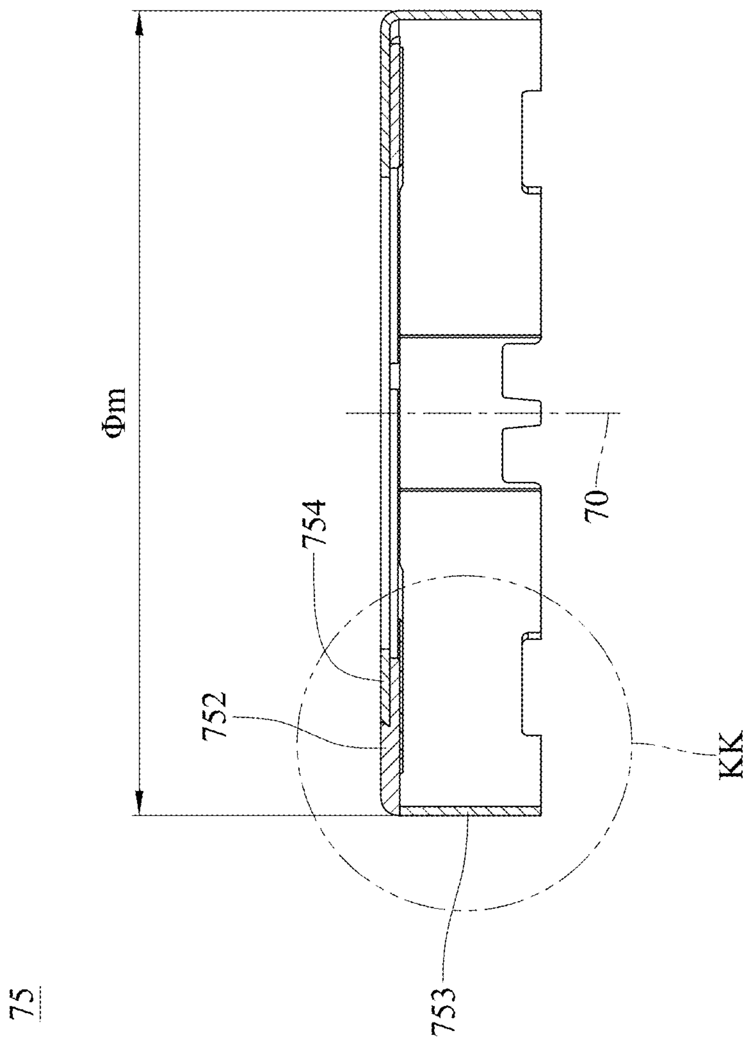
FIG. 43 is a cross-sectional view of the lid element sectioned along line J-J in the light-passable hole module of FIG. 40.
Figure 44:
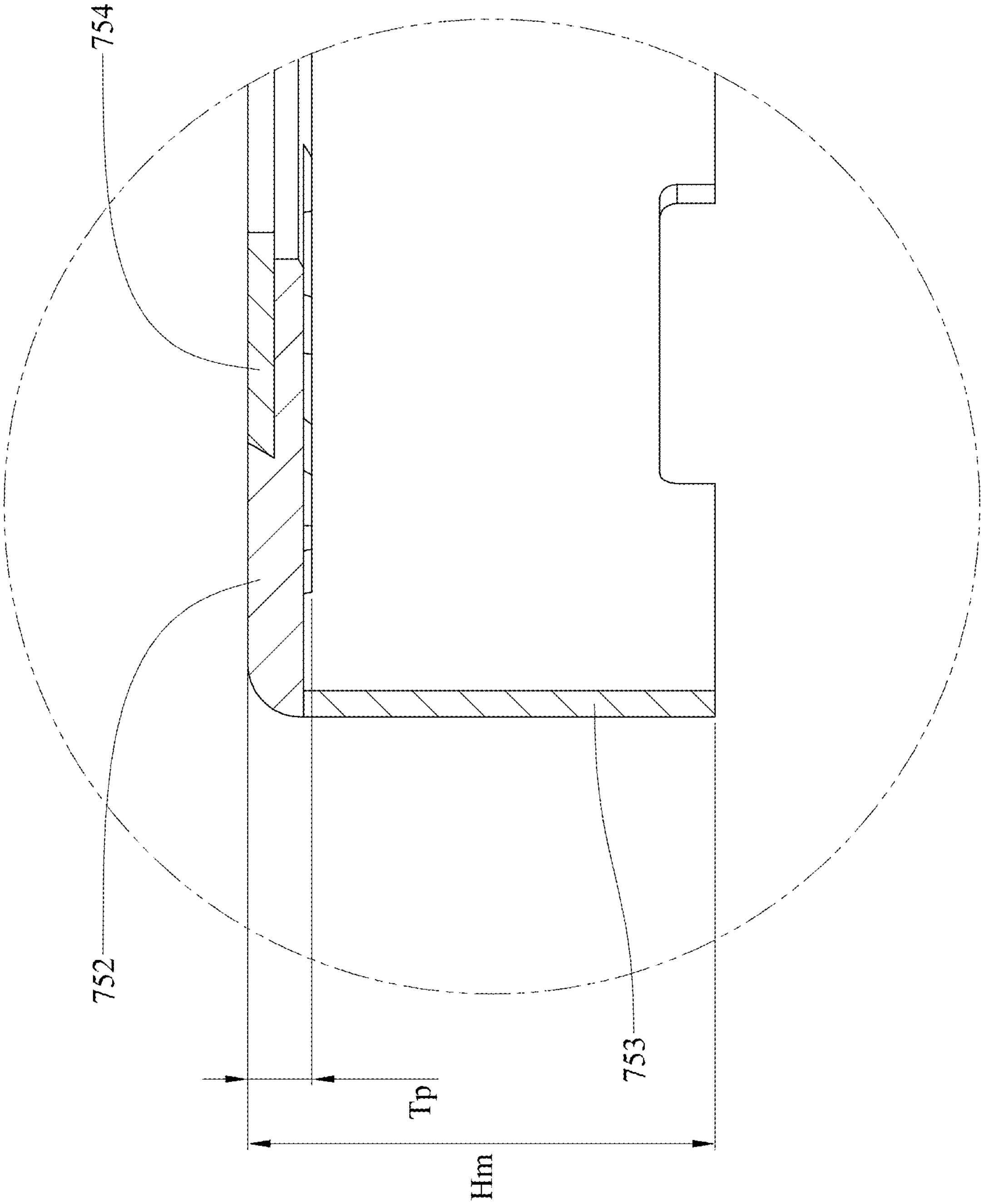
FIG. 44 is an enlarged view of KK region of the lid element of the light-passable hole module of FIG. 43.

Please refer to FIG. 37 to FIG. 44, where FIG. 37 is a perspective view of a light-passable hole module according to the 7th embodiment of the present disclosure, FIG. 38 is a schematic view showing a lid element being disassembled in the light-passable hole module of FIG. 37, FIG. 39 is another schematic view showing the lid element being disassembled in the light-passable hole module of FIG. 37, FIG. 40 is a top view of the lid element of the light-passable hole module of FIG. 37, FIG. 41 is a side view of the lid element of the light-passable hole module of FIG. 37, FIG. 42 is a bottom view of the lid element of the light-passable hole module of FIG. 37, FIG. 43 is a cross-sectional view of the lid element sectioned along line J-J in the light-passable hole module of FIG. 40, and FIG. 44 is an enlarged view of KK region of the lid element of the light-passable hole module of FIG. 43.

A light-passable hole module 7 provided in this embodiment includes, sequentially along a central axis 70, a base 71, a rotation element 73, a blade assembly 74 and a lid element 75.

The rotation element 73 is rotatable about the central axis 70. It can also be considered that the rotation element 73 is rotatable with respect to the base 71. The rotatable arrangement of the rotation element 73 may, for example, be achieved by guiding of rollable elements, which is similar to that of the rotation element 13 of the 1st embodiment and would not be repeated again.

The blade assembly 74 is located between the rotation element 73 and the lid element 75. The blade assembly 74 has a plurality of blades 740 forming a light-passable hole 741. The light-passable hole 741 has a size variable by taking the central axis 70 as a center.

The lid element 75 covers the blade assembly 74 and is immovable with respect to the base 71. The lid element 75 has a through hole 751 disposed corresponding to the light-passable hole 741.

The lid element 75 is made in one piece. In specific, the lid element 75 includes a plastic surface structure 752, a metal wall structure 753 and a metal surface structure 754. The plastic surface structure 752 is made of plastic material, the metal wall structure 753 and the metal surface structure 754 are made of metal material, and the plastic surface structure 752, the metal wall structure 753 and the metal surface structure 754 are made by insert-molding.

The plastic surface structure 752 extends towards the through hole 751. In this embodiment, the plastic surface structure 752 is periodically disposed surrounding the through hole 751 on the outer side of the light-passable hole module 7, as shown in FIGS. 38 and 40. In this embodiment, the plastic surface structure 752 is disposed in a loop to surround the through hole 751 on the inner side of the light-passable hole module 7, as shown in FIGS. 39 and 42. In this embodiment, the plastic surface structure 752 defines the through hole 751 on the inner side of the light-passable hole module 7, as shown in FIGS. 39 and 42. In this embodiment, the plastic surface structure 752 covers at least part of the metal surface structure 754 on the inner side of the light-passable hole module 7 along a direction parallel to the central axis 70 and exposes at least part of the metal surface structure 754 on the outer side of the light-passable hole module 7 along a direction parallel to the central axis 70, as shown in FIGS. 43 and 44.

The plastic surface structure 752 faces towards one of the plurality of blades 740 and is disposed corresponding to the one blade 740. In this embodiment, the plastic surface structure 752 is designed to have a relatively large area for facing towards the blades 740. The plastic surface structure 752 is located closer to the blades 740 than the through hole 751 along a direction parallel to the central axis 70 and is disposed in sequence with the blades 740 along a direction parallel to the central axis 70.

The metal wall structure 753 is disposed surrounding the through hole 751 and extends from the plastic surface structure 752 on the inner side of the light-passable hole module 7 along a direction parallel to the central axis 70. In this embodiment, the metal wall structure 753 extends from an outer edge of the plastic surface structure 752 on the outer side of the light-passable hole module 7 along a direction parallel to the central axis 70.

The metal surface structure 754 extends towards the through hole 751 from the metal wall structure 753. It can also be considered that the metal surface structure 754 extends towards the central axis 70 from the metal wall structure 753. In this embodiment, the metal surface structure 754 defines the through hole 751 on the outer side of the light-passable hole module 7, as shown in FIGS. 38 and 40.

When a thickness of the plastic surface structure 752 along a direction parallel to the central axis 70 is Tp, and a height of the metal wall structure 753 along a direction parallel to the central axis 70 is Hm, the following conditions are satisfied: Tp=0.363 mm; Hm=2.65 mm; and Tp/Hm=0.137, as shown in FIGS. 43 and 44.

When a maximum diameter of the plastic surface structure 752 along a direction perpendicular to the central axis 70 is ϕp, and a maximum diameter of the metal wall structure 753 along a direction perpendicular to the central axis 70 is ϕm, the following conditions are satisfied: ϕp=13.3 mm; ϕm=13.3 mm; and ϕp/ϕm=1, as shown in FIGS. 40, 41 and 43.

The operation of the blade assembly 74 is similar to that of the blade assembly 14 of the 1st embodiment, which may, for example, control the size of the light-passable hole 741 through the interaction between the first axial structures, the second axial structures, the first driving holes, the second driving holes, the first recess structures and the second recess structures and therefore would not be repeated again.

8th Embodiment

Figure 45:
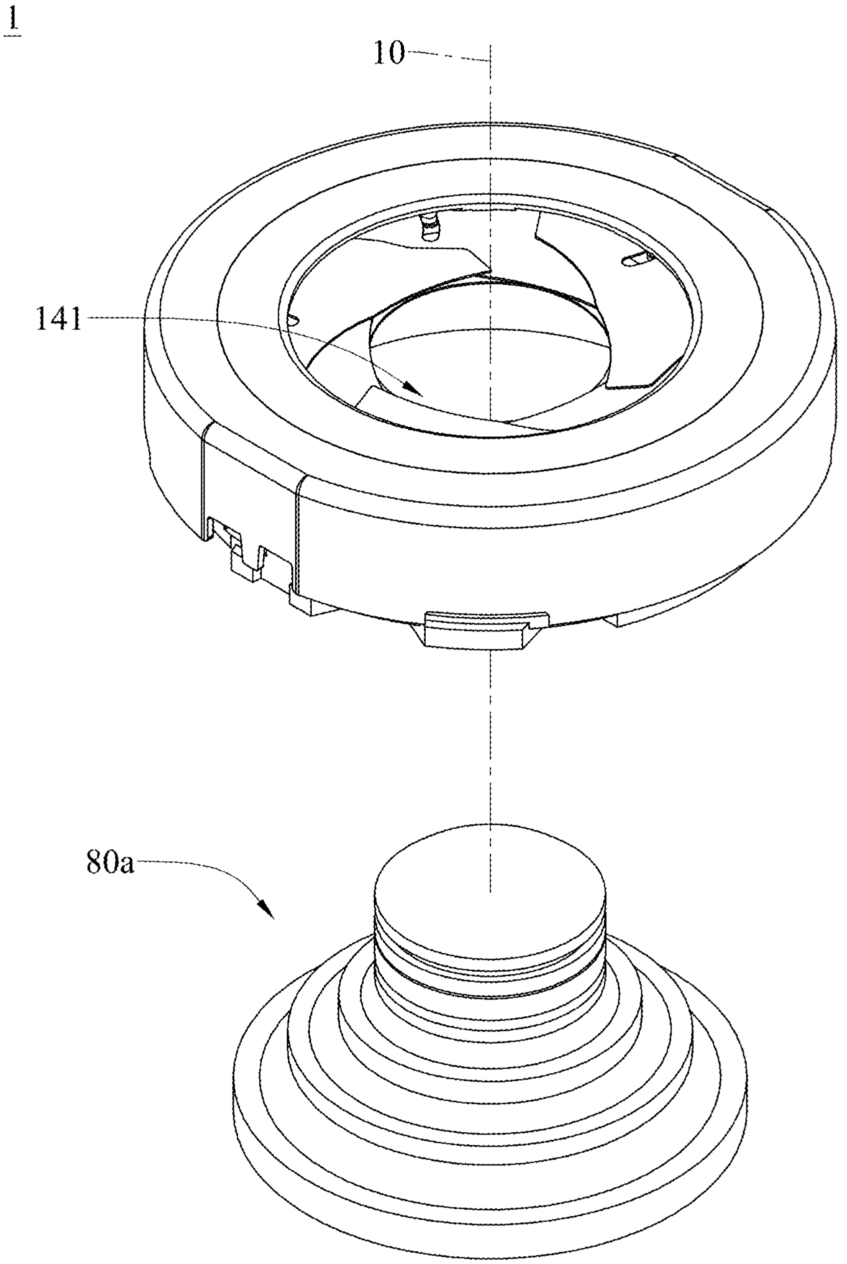
FIG. 45 is a schematic view of a camera module according to the 8th embodiment of the present disclosure.

Please refer to FIG. 45, which is a schematic view of a camera module according to the 8th embodiment of the present disclosure. Please be noted that several components of the camera module in the drawings are omitted for simplicity.

A camera module 8 provided in this embodiment includes the light-passable hole module 1 of the 1st embodiment and a lens assembly 80*a* disposed corresponding to the light-passable hole 141 along a direction parallel to the central axis 10, such that the light-passable hole 141 forms an aperture of the camera module 8. Please be noted the camera module 8 may alternatively include one of the light-passable hole modules 2-7 of the other embodiments instead of the light-passable hole module 1 of the 1st embodiment, and the present disclosure is not limited thereto. Please be noted that the total number and the lens shapes of the lens elements of the lens assembly 80*a* are not intended to restrict the present disclosure.

9th Embodiment

Figure 46:
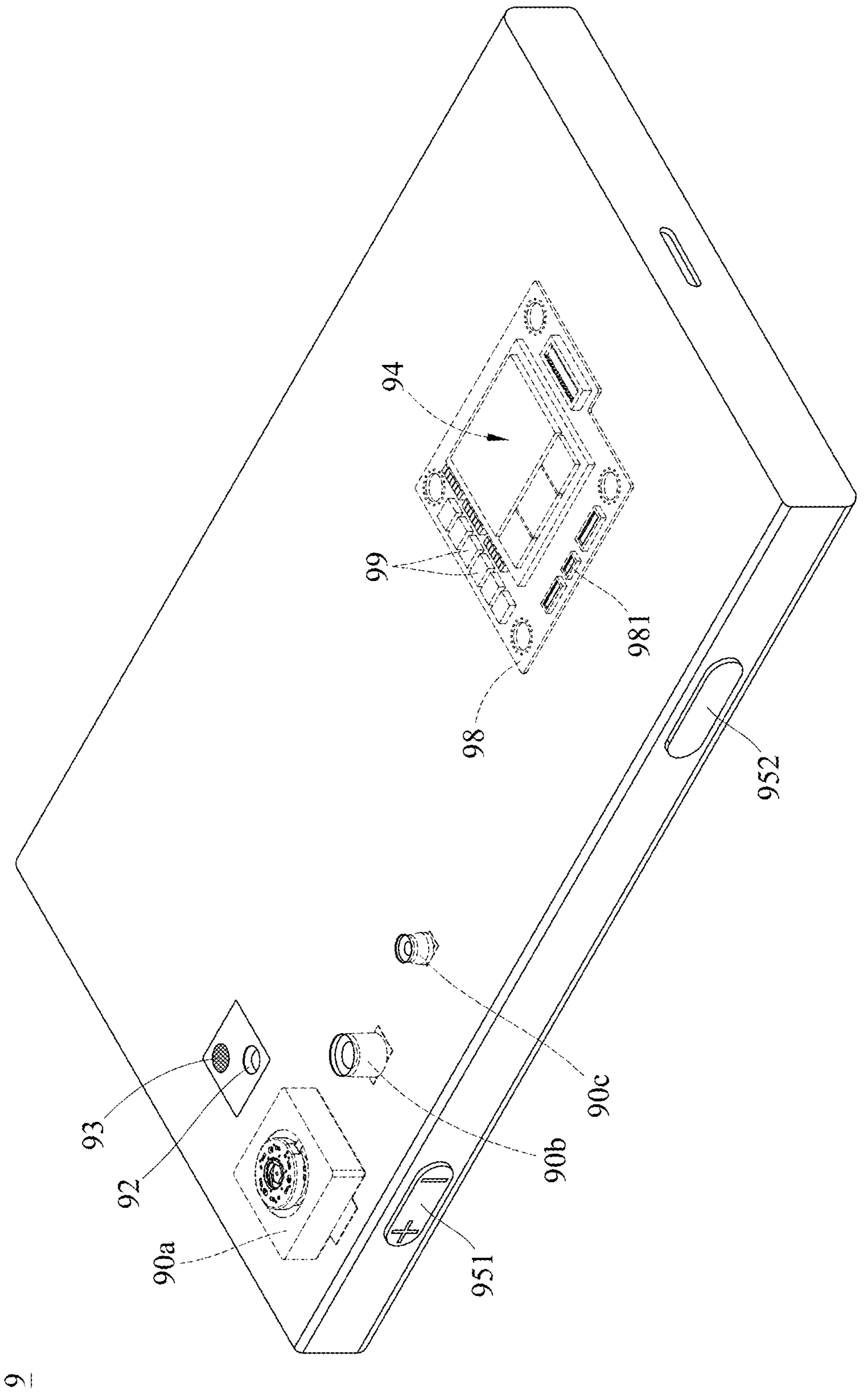
FIG. 46 is one perspective view of an electronic device according to the 9th embodiment of the present disclosure.
Figure 47:
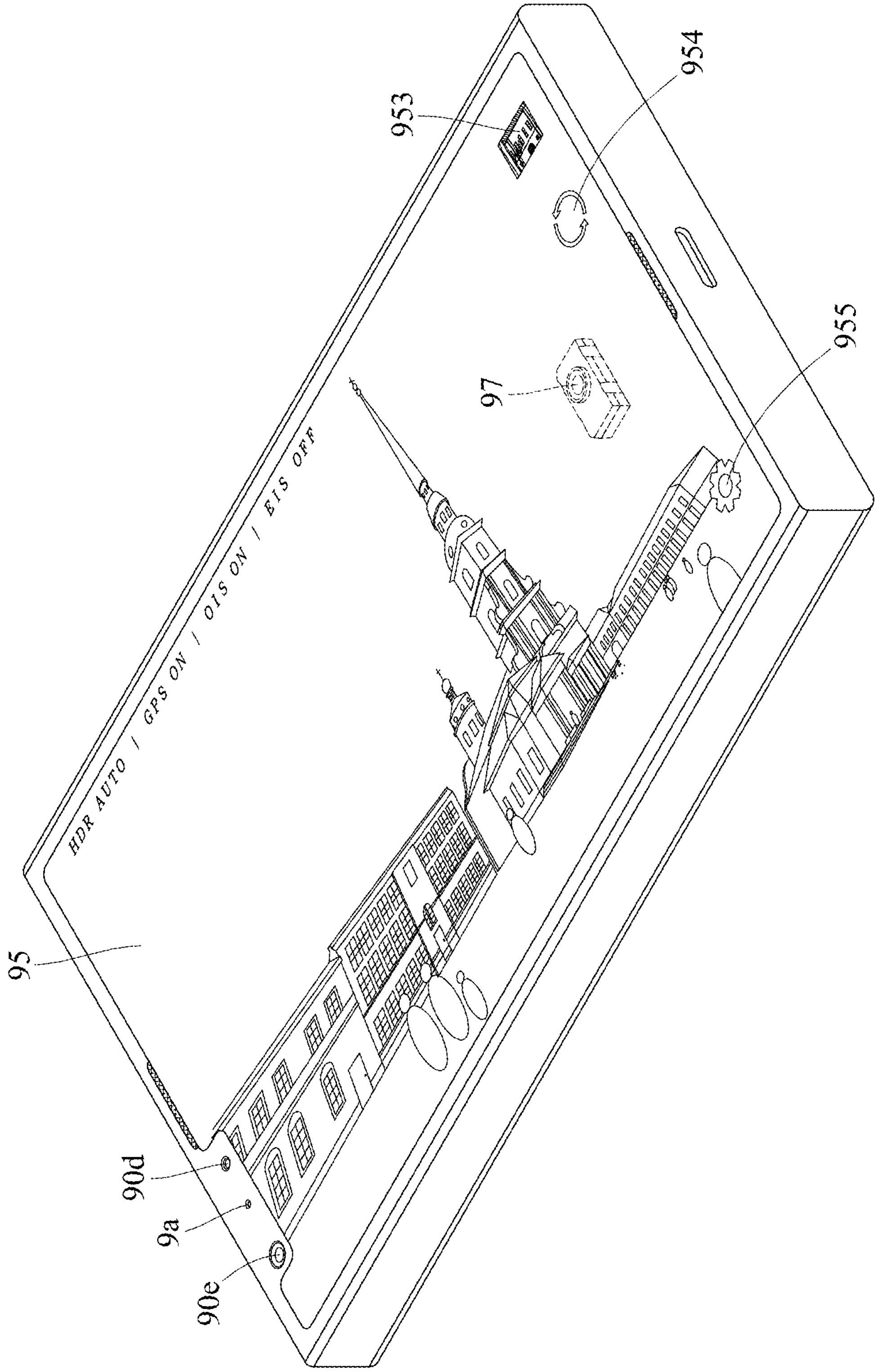
FIG. 47 is another perspective view of the electronic device in FIG. 46.
Figure 48:
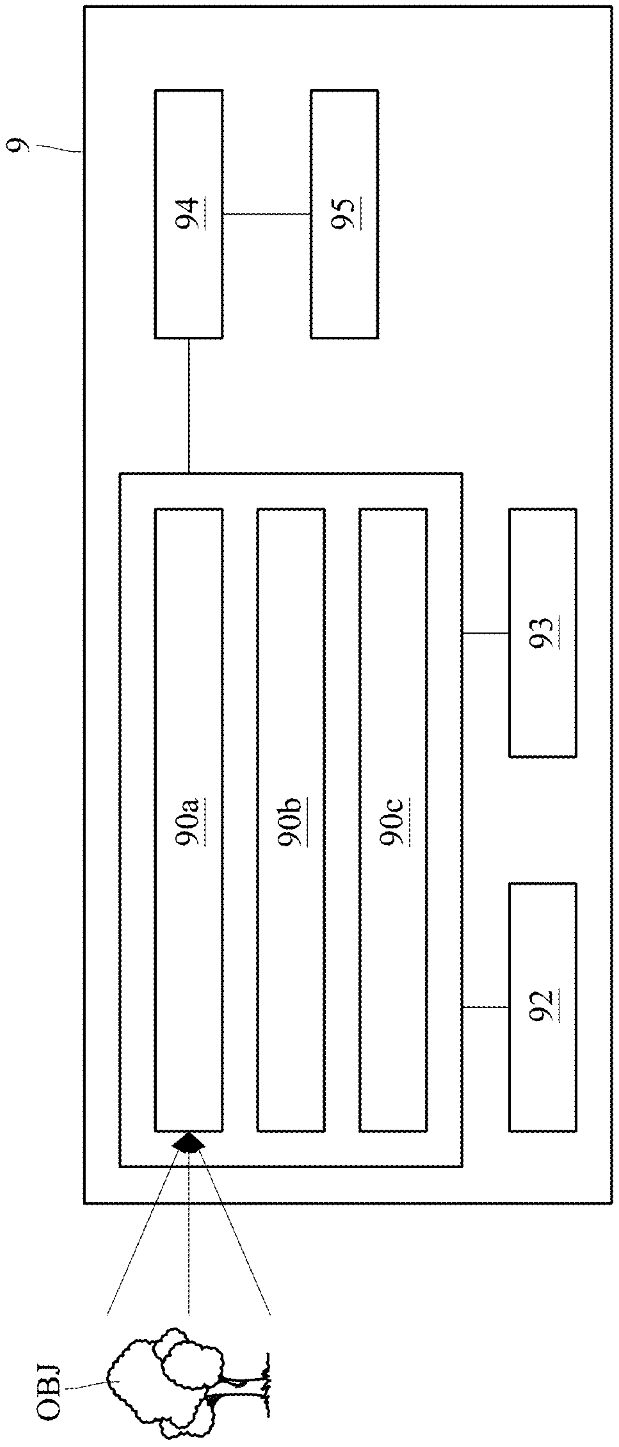
FIG. 48 is a block diagram of the electronic device in FIG. 46.

Please refer to FIG. 46 to FIG. 48, where FIG. 46 is one perspective view of an electronic device according to the 9th embodiment of the present disclosure, FIG. 47 is another perspective view of the electronic device in FIG. 46, and FIG. 48 is a block diagram of the electronic device in FIG. 46.

In this embodiment, an electronic device 9 is a mobile device such as a computer, a smartphone, a smart wearable device, a camera drone, or a driving recorder and displayer, and the present disclosure is not limited thereto. The electronic device 9 includes a camera module 90*a*, a wide-angle camera module 90*b*, a macro-photo camera module 90*c*, a compact camera module 90*d*, a ToF (time of flight) camera module 90*e*, a flash module 92, a focus assist module 93, an image signal processor (not numbered), a display module 95, an image software processor (not numbered) and a biometric identification device 97. In addition, the camera module 90*a* is, for example, the camera module 8 as disclosed in the 8th embodiment, but the present disclosure is not limited thereto. Each of the camera modules 90*b*, 90*c*, 90*d* and 90*e* may be one of the camera modules as disclosed in the above embodiments of the present disclosure.

The camera module 90*a*, the camera module 90*b* and the camera module 90*c* are disposed on the same side of the electronic device 9. The camera module 90*d*, the camera module 90*e* and the display module 95 are disposed on the opposite side of the electronic device 9. The display module 95 can be a user interface, such that the camera module 90*d* and the camera module 90*e* can be front-facing cameras of the electronic device 9 for taking selfies, but the present disclosure is not limited thereto.

Figure 49:
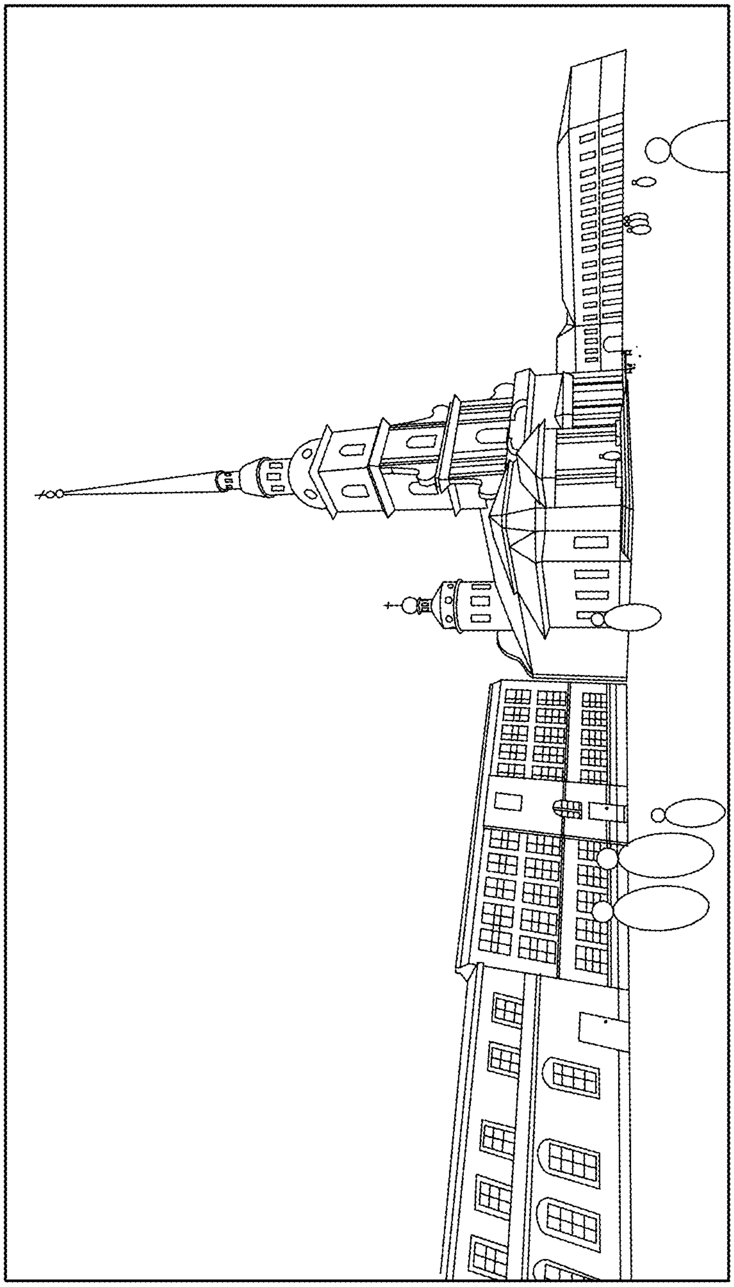
FIG. 49 shows an image captured by the electronic device using a wide-angle camera module in FIG. 46.
Figure 50:
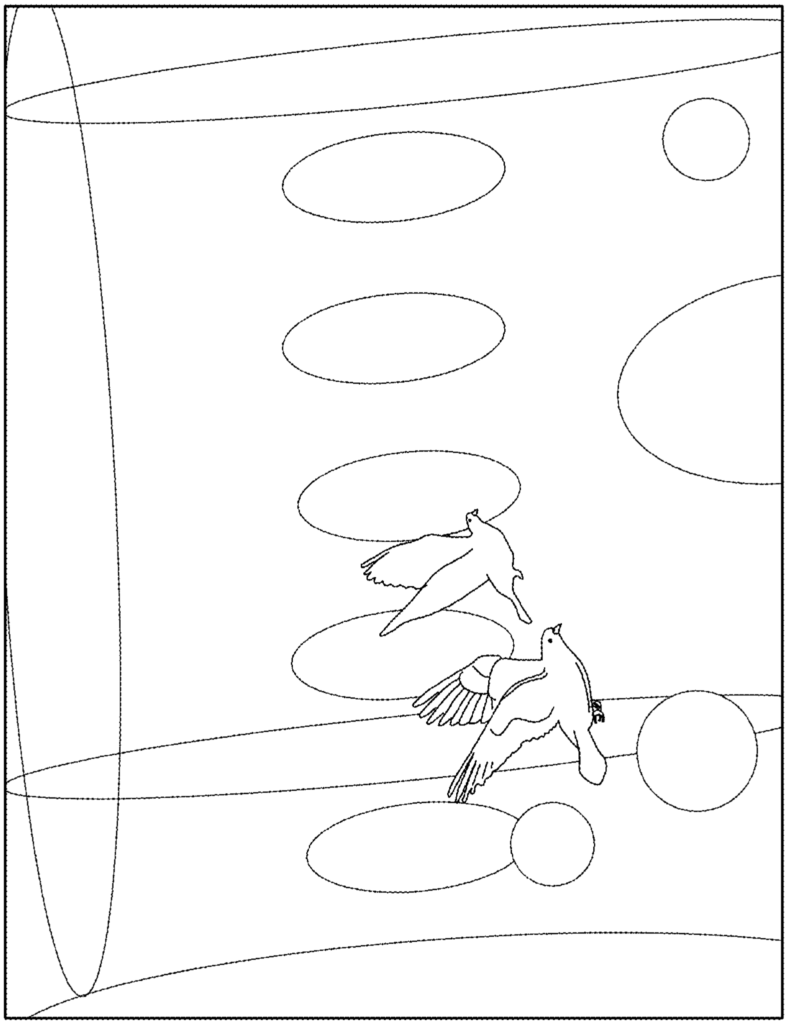
FIG. 50 shows an image captured by the electronic device using a camera module in FIG. 46 with an f-number of 1.4.
Figure 51:
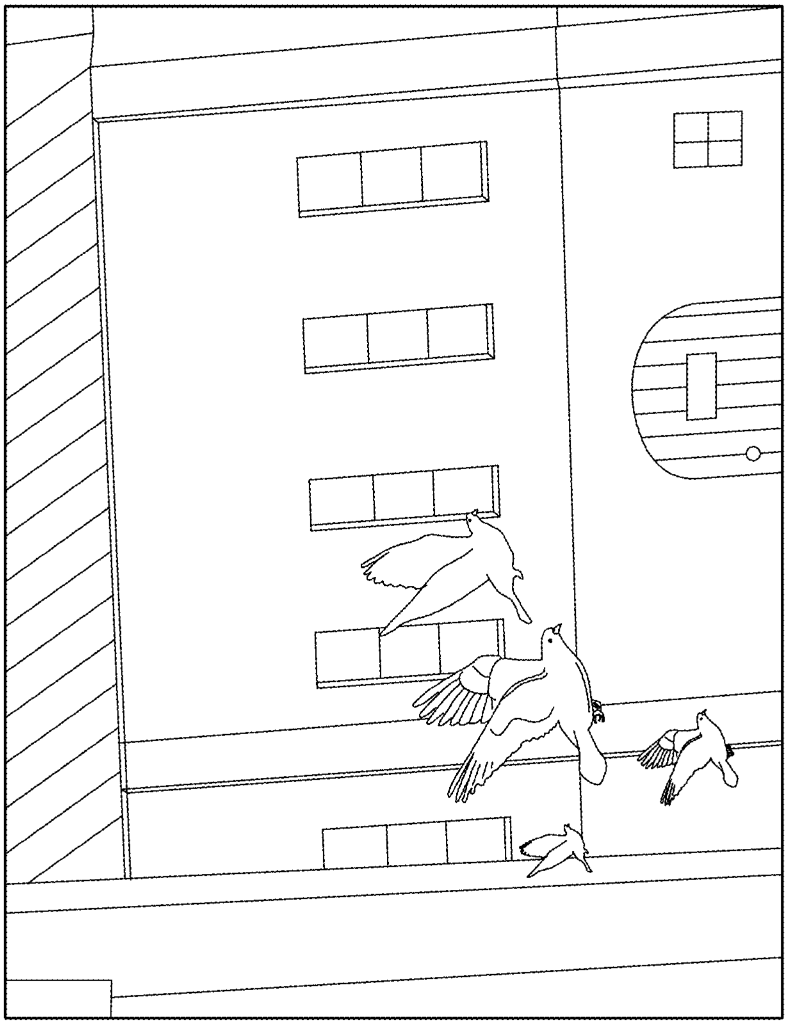
FIG. 51 shows an image captured by the electronic device using a camera module in FIG. 46 with an f-number of 5.6.

In this embodiment, the camera module 90*a*, the camera module 90*b* and the camera module 90*c* have different fields of view, such that the electronic device 9 can have various magnification ratios so as to meet the requirement of optical zoom functionality. For example, the wide-angle camera module 90*b* has a relatively large field of view, and the image captured by the wide-angle camera module 90*b* can refer to FIG. 49, which shows an image captured by the electronic device 9 with a wide-angle camera module 90*b*, and the captured image as shown in FIG. 49 includes the whole cathedral, surrounding buildings and people in front of the cathedral. The captured image as shown in FIG. 49 has a relatively large field of view and depth of view, but it often has a relatively large degree of distortion. The image captured by the camera module 90*a* with a relatively small f-number can refer to FIG. 50, and the image captured by the camera module 90*a* with a relatively large f-number can refer to FIG. 51. FIG. 50 shows an image captured by the electronic device 9 with the camera module 90*a* with an f-number of 1.4, FIG. 51 shows an image captured by the electronic device 9 with the camera module 90*a* with an f-number of 5.6, and the captured images as shown in FIG. 50 and FIG. 51 include birds flying in front of the cathedral. As shown in FIG. 50, when the light-passable hole module 1 of the camera module 90*a* provides a relatively large the light-passable hole 141, the image sensor receives more light, but the background in the image is relatively blurry. As shown in FIG. 51, when the light-passable hole module 1 of the camera module 90*a* provides a relatively small light-passable hole 141, the image sensor receives less light, but the background in the image is relatively clear. The captured images as shown in FIG. 50 and FIG. 51 have a relatively small field of view, and the camera module 90*a* can be used for shooting moving targets. For example, the auto-focus driving part can drive the lens carrier to quickly and continuously autofocus on the target, such that the captured image of the target would not be blurred due to deviation from the focusing position. When imaging, the camera module 90*a* can further perform optical zoom for imaged objects so as to obtain more remarkable images. In addition, the ToF camera module 90*e* can determine depth information of the imaged object. In this embodiment, the electronic device 9 includes multiple camera modules 90*a*, 90*b*, 90*c*, 90*d*, and 90*e*, but the present disclosure is not limited to the number and arrangement of camera modules.

When a user captures images of an object OBJ, light rays converge in the camera module 90*a*, the camera module 90*b* or the camera module 90*c* to generate images, and the flash module 92 is activated for light supplement. The focus assist module 93 detects the object distance of the imaged object OBJ to achieve fast auto focusing. The image signal processor is configured to optimize the captured image to improve image quality. The light beam emitted from the focus assist module 93 can be either conventional infrared or laser.

In addition, the light rays may converge in the camera module 90*d* or the camera module 90*e* to generate images. The electronic device 9 can include a reminder light 9*a* that can be illuminated to remind the user that the camera module 90*d* or the camera module 90*e* is working. The display module 95 can be a touch screen or collaborated with physical buttons such as a zoom button 951 and a shutter release button 952. The user is able to interact with the display module 95 and the image software processor having multiple functions to capture images and complete image processing. The image processed by the image software processor can be displayed on the display module 95. The user can replay the previously captured image through an image playback button 953 of the display module 95, can choose a suitable camera module for shooting through a camera module switching button 954 of the display module 95, and can properly adjust shooting parameters according to current shooting situations through an integrated menu button 955 of the display module 95.

Further, the electronic device 9 further includes a circuit board 98 and a plurality of electronic components 99 disposed on the circuit board 98. The camera modules 90*a*, 90*b*, 90*c*, 90*d*, and 90*e* are electrically connected to the electronic component 99 via connectors 981 on the circuit board 98. The electronic components 99 can include a signal emitting module and can transmit image(s) to other electronic device or a cloud storage via the signal emitting module. The signal emitting module can be a wireless fidelity (WiFi) module, a Bluetooth module, an infrared module, a network service module or an integrated module for transmitting various signals mentioned above, and the present disclosure is not limited thereto.

The electronic components 99 can also include a storage unit, a random access memory for storing image information, a gyroscope, and a position locator for facilitating the navigation or positioning of the electronic device 9. In this embodiment, the image signal processor, the image software processor and the random access memory are integrated into a single chip system 94, but the present disclosure is not limited thereto. In some other embodiments, the electronic components can also be integrated in the camera module or can also be disposed on one of the circuit boards. In addition, the user can use the biometric identification device 97 to turn on or unlock the electronic device 9.

The smartphone in this embodiment is only exemplary for showing the camera module of the present disclosure installed in the electronic device 9, and the present disclosure is not limited thereto. The camera module can be optionally applied to optical systems with a movable focus. Furthermore, the camera module 8 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A light-passable hole module sequentially along a central axis comprising:

a blade assembly having a plurality of blades, wherein the plurality of blades form a light-passable hole, and the light-passable hole has a size variable by taking the central axis as a center; and a lid element covering the blade assembly, wherein the lid element has a through hole disposed corresponding to the light-passable hole, the lid element comprising:

a plastic surface structure facing towards one of the plurality of blades and being disposed corresponding to the one of the plurality of blades, wherein in a direction parallel to the central axis, the plastic surface structure is located closer to the plurality of blades than the through hole and is disposed in sequence with the plurality of blades; and a metal wall structure disposed surrounding the through hole, wherein the metal wall structure extends from the plastic surface structure along a direction parallel to the central axis;

wherein a thickness of the plastic surface structure along a direction parallel to the central axis is Tp, and the following condition is satisfied:

$$0.0092\ \text{mm} < Tp \leq 0.735\ \text{mm}.$$

2. The light-passable hole module according to claim 1, wherein a height of the metal wall structure along a direction parallel to the central axis is Hm, and the following condition is satisfied:

$$0.042\ \text{mm} \leq Hm < 6.83\ \text{mm}.$$

3. The light-passable hole module according to claim 2, wherein the thickness of the plastic surface structure along the direction parallel to the central axis is Tp, the height of the metal wall structure along the direction parallel to the central axis is Hm, and the following condition is satisfied:

$$0.004 \leq Tp/Hm < 0.41.$$

4. The light-passable hole module according to claim 1, wherein the thickness of the plastic surface structure along the direction parallel to the central axis is Tp, and the following condition is satisfied:

$$0.036\ \text{mm} < Tp \leq 0.58\ \text{mm}.$$

5. The light-passable hole module according to claim 1, wherein the lid element further comprises a metal surface structure extending towards the through hole from the metal wall structure and defining the through hole.

6. The light-passable hole module according to claim 1, wherein the plastic surface structure is disposed surrounding the through hole and defines the through hole.

7. A camera module comprising:

the light-passable hole module of claim 1; and a lens assembly disposed corresponding to the light-passable hole along a direction parallel to the central axis.

8. The camera module according to claim 7, wherein the light-passable hole forms an aperture of the camera module.

9. An electronic device comprising:

the camera module of claim 7.

10. A light-passable hole module sequentially along a central axis comprising:

a blade assembly having a plurality of blades, wherein the plurality of blades form a light-passable hole, and the light-passable hole has a size variable by taking the central axis as a center; and a lid element covering the blade assembly, wherein the lid element has a through hole disposed corresponding to the light-passable hole, the lid element comprising:

a plastic surface structure facing towards one of the plurality of blades and being disposed corresponding to the one of the plurality of blades, wherein in a direction parallel to the central axis, the plastic surface structure is located closer to the plurality of blades than the through hole and is disposed in sequence with the plurality of blades; and a metal wall structure disposed surrounding the through hole, wherein the metal wall structure extends from the plastic surface structure along a direction parallel to the central axis, wherein a maximum diameter of the plastic surface structure along a direction perpendicular to the central axis is ϕp, a maximum diameter of the metal wall structure along a direction perpendicular to the central axis is ϕm, and the following condition is satisfied:

$$0.1 < \Phi p/\Phi m \leq 1.05.$$

11. The light-passable hole module according to claim 10, wherein a thickness of the plastic surface structure along a direction parallel to the central axis is Tp, and the following condition is satisfied:

$$0.036 \text{ mm} < Tp \leq 0.58 \text{ mm}.$$

12. The light-passable hole module according to claim 11, wherein a height of the metal wall structure along a direction parallel to the central axis is Hm, and the following condition is satisfied:

$$0.042 \text{ mm} \leq Hm < 6.83 \text{ mm}.$$

13. The light-passable hole module according to claim 12, wherein the thickness of the plastic surface structure along the direction parallel to the central axis is Tp, the height of the metal wall structure along the direction parallel to the central axis is Hm, and the following condition is satisfied:

$$0.004 \leq Tp/Hm < 0.41.$$

14. The light-passable hole module according to claim 10, wherein the maximum diameter of the plastic surface structure along the direction perpendicular to the central axis is ϕp, the maximum diameter of the metal wall structure along the direction perpendicular to the central axis is ϕm, and the following condition is satisfied:

$$0.15 \leq \Phi p/\Phi m < 0.975.$$

15. The light-passable hole module according to claim 10, further comprising a base immovable with respect to the lid element, wherein the base has a first axial structure, and the plurality of blades are movable within a specific range according to the first axial structure so as to control the size of the light-passable hole.

16. The light-passable hole module according to claim 15, wherein each of the plurality of blades has a first driving hole disposed corresponding to the first axial structure, and the first axial structure is disposed through the first driving holes.

17. The light-passable hole module according to claim 16, wherein the plastic surface structure has a first recess structure being recessed along a direction away from the first axial structure and being disposed corresponding to the first axial structure.

18. The light-passable hole module according to claim 10, further comprising a rotation element rotatable about the central axis, wherein the rotation element has a second axial structure coupled with the plurality of blades so as to vary the size of the light-passable hole.

19. The light-passable hole module according to claim 18, wherein each of the plurality of blades has a second driving hole disposed corresponding to the second axial structure, and the second axial structure is disposed through the second driving holes.

20. The light-passable hole module according to claim 19, wherein the plastic surface structure has a second recess structure being recessed along a direction away from the second axial structure and being disposed corresponding to the second axial structure.

21. The light-passable hole module according to claim 10, further comprising a base, a rotation element and a plurality of rollable elements, wherein the base is immovable with respect to the lid element, the rotation element is rotatable about the central axis, and the plurality of rollable elements are disposed between the base and the rotation element so as to provide a rotational degree of freedom of the rotation element.

* * * * *